(12) United States Patent
Kim et al.

(10) Patent No.: US 11,362,443 B2
(45) Date of Patent: *Jun. 14, 2022

(54) ELECTRONIC DEVICE COMPRISING ANTENNA

(71) Applicant: Samsung Electronics Co., Ltd., Gyeonggi-do (KR)

(72) Inventors: Young Ju Kim, Gyeonggi-do (KR); Jong Hyuk Kim, Gyeonggi-do (KR); Sung Chul Park, Seoul (KR)

(73) Assignee: Samsung Electronics Co., Ltd

( * ) Notice: Subject to any disclaimer, the term of this patent is extended or adjusted under 35 U.S.C. 154(b) by 19 days.

This patent is subject to a terminal disclaimer.

(21) Appl. No.: 16/901,747

(22) Filed: Jun. 15, 2020

(65) Prior Publication Data

US 2020/0313309 A1 Oct. 1, 2020

Related U.S. Application Data

(63) Continuation of application No. 16/083,776, filed as application No. PCT/KR2017/002445 on Mar. 7, 2017, now Pat. No. 10,686,259.

(30) Foreign Application Priority Data

Mar. 10, 2016 (KR) .................. 10-2016-0029055

(51) Int. Cl.
*H01Q 21/30* (2006.01)
*H01Q 1/24* (2006.01)
(Continued)

(52) U.S. Cl.
CPC .............. *H01Q 21/30* (2013.01); *H01Q 1/24* (2013.01); *H01Q 1/243* (2013.01); *H01Q 1/38* (2013.01);
(Continued)

(58) Field of Classification Search
CPC .......... H01Q 21/30; H01Q 1/38; H01Q 9/04; H01Q 5/30; H01Q 3/247; H01Q 5/307;
(Continued)

(56) References Cited

U.S. PATENT DOCUMENTS 7,242,720 B2 7/2007 Sugiyama et al.
7,933,319 B2 4/2011 Yen et al.
(Continued)

FOREIGN PATENT DOCUMENTS

EP 1 981 200 10/2008
JP 2004-151051 5/2004
(Continued)

OTHER PUBLICATIONS

PCT/ISA/210 Search Report dated Jun. 20, 2017 issued on PCT/KR2017/002445 (pp. 5).
(Continued)

*Primary Examiner* — Hai V Tran
(74) *Attorney, Agent, or Firm* — The Farrell Law Firm, P.C.

(57) ABSTRACT

Disclosed is an electronic device. The electronic device according to an embodiment includes a plurality of antennas, and a communication circuit electrically connected with the plurality of antennas. The communication circuit includes a plurality of circuits receiving a signal in a first band and is configured to simultaneously receive the signal in the first band through two or more circuits of the plurality of circuits from two or more antennas, which are positioned adjacent to each other, from among the plurality of antennas. The number of the plurality of antennas is the same as the number of plurality of circuits.

19 Claims, 34 Drawing Sheets

(51) Int. Cl.
  *H01Q 1/38* (2006.01)
  *H01Q 5/30* (2015.01)
  *H01Q 9/04* (2006.01)
  *H04M 1/02* (2006.01)
  *H04B 1/00* (2006.01)
  *H04B 7/08* (2006.01)
  *H01Q 5/307* (2015.01)
  *H01Q 3/24* (2006.01)

(52) U.S. Cl.
  CPC ............... *H01Q 3/247* (2013.01); *H01Q 5/30* (2015.01); *H01Q 5/307* (2015.01); *H01Q 9/04* (2013.01); *H04B 1/0053* (2013.01); *H04B 1/0064* (2013.01); *H04B 7/0802* (2013.01); *H04M 1/02* (2013.01)

(58) Field of Classification Search
  CPC ........ H01Q 1/243; H01Q 1/24; H04B 1/0064; H04B 1/0053; H04B 7/0802; H04M 1/02
  USPC .......................................................... 343/702
  See application file for complete search history.

(56) References Cited

U.S. PATENT DOCUMENTS

| | | | |
|---|---|---|---|
| 8,150,454 | B2 | 4/2012 | Sanders |
| 8,213,881 | B2 | 7/2012 | Yen et al. |
| 8,781,522 | B2 * | 7/2014 | Tran ................ H01Q 9/145 455/552.1 |
| 9,130,616 | B2 | 9/2015 | Taoka et al. |
| 9,172,420 | B2 * | 10/2015 | Bai .................... H04B 1/40 |
| 9,379,455 | B2 | 6/2016 | Sonnerat et al. |
| 9,635,443 | B2 | 4/2017 | Choi et al. |
| 9,735,854 | B2 * | 8/2017 | Khlat .................. H04B 1/3827 |
| 9,793,972 | B1 * | 10/2017 | Khlat .................. H04B 7/0413 |
| 9,986,533 | B2 | 5/2018 | Lee et al. |
| 10,404,219 | B2 | 9/2019 | Wallis |
| 2002/0191535 | A1 | 12/2002 | Sugiyama et al. |
| 2007/0142001 | A1 | 6/2007 | Sanders |
| 2008/0106476 | A1 | 5/2008 | Tran et al. |
| 2008/0123724 | A1 | 5/2008 | Yen et al. |
| 2008/0125050 | A1 | 5/2008 | Yen et al. |
| 2009/0305690 | A1 | 12/2009 | Yuda et al. |
| 2010/0120466 | A1 | 5/2010 | Li |
| 2011/0013719 | A1 | 1/2011 | Taoka et al. |
| 2014/0003300 | A1 * | 1/2014 | Weissman ............ H04B 1/0064 370/273 |
| 2014/0087670 | A1 | 3/2014 | Bai |
| 2014/0145897 | A1 | 5/2014 | Sonnerat et al. |
| 2014/0227982 | A1 | 8/2014 | Granger-Jones |
| 2014/0376417 | A1 | 12/2014 | Khlat |
| 2015/0215901 | A1 | 7/2015 | Lee et al. |
| 2015/0230009 | A1 | 8/2015 | Choi et al. |
| 2016/0134016 | A1 | 5/2016 | Hsu |
| 2016/0380681 | A1 * | 12/2016 | Sahota ...................... H04B 1/44 375/267 |

FOREIGN PATENT DOCUMENTS

| | | |
|---|---|---|
| JP | 2005-217590 | 8/2005 |
| KR | 1020100097187 | 9/2010 |
| KR | 1020100108062 | 10/2010 |
| KR | 1020110122227 | 11/2011 |
| KR | 1020150090790 | 8/2015 |

OTHER PUBLICATIONS

PCT/ISA/237 Written Opinion dated Jun. 20, 2017 issued on PCT/KR2017/002445 (pp. 5).
European Search Report dated Jan. 4, 2019 issued in counterpart application No. 17763540.6-1220, 8 pages.
Korean Office Action dated Feb. 12, 2022 issued in counterpart application No. 10-2016-0029055, 17 pages.
European Search Report dated Mar. 23, 2022 issued in counterpart application No. 21212944.9-1216, 3 pages.

* cited by examiner

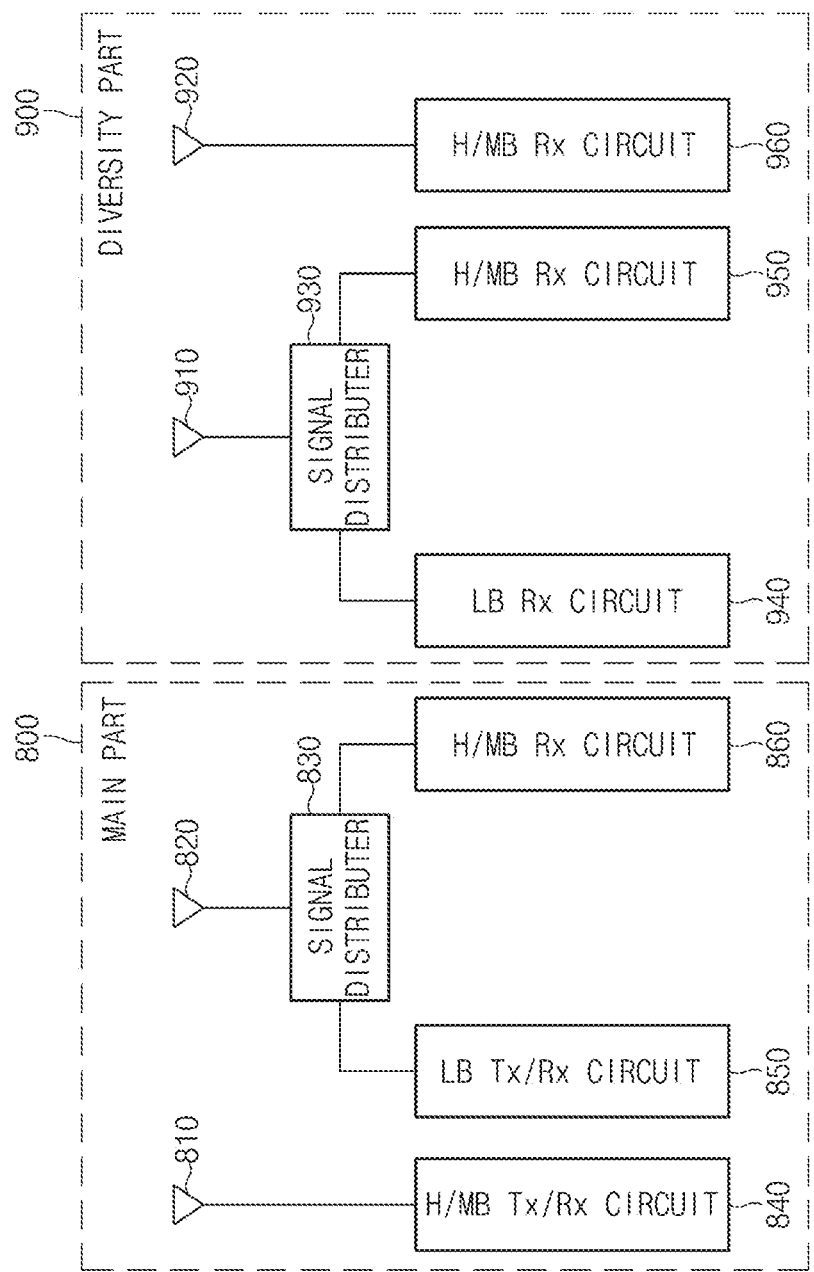

ELECTRONIC DEVICE COMPRISING ANTENNA

PRIORITY

This application is a Continuation of U.S. patent application Ser. No. 16/083,776, which was filed with the U.S. Patent and Trademark Office on Sep. 10, 2018, as a National Phase Entry of PCT International Application No. PCT/KR2017/002445, which was filed on Mar. 7, 2017, and claims priority to Korean Patent Application No. 10-2016-0029055, which was filed on Mar. 10, 2016, the content of each of which is incorporated herein by reference.

BACKGROUND

1. Field

Embodiments disclosed in the present disclosure relate to a technology for transmitting/receiving signals in the same frequency band at the same time by using a plurality of antennas.

2. Description of the Related Art

With developments of information communication technologies, network devices such as a base station and the like are installed throughout the country. The electronic device transmits/receives data to/from another electronic device over a network, thus allowing a user to utilize the network freely anywhere in the country.

The electronic device may use the network through at least one antenna included in the electronic device. The electronic device may include a plurality of antennas. The electronic device may transmit/receive a signal by using a main antenna of a plurality of antennas, and may receive a signal by using a diversity antenna of the plurality of antennas.

In an electronic device including a main part including one or more antennas and a diversity part including one or more antennas, two signals in the same frequency band may be simultaneously received through the main part and the diversity part, respectively. However, since the connection between an antenna and an RF circuit is not free, two or more antennas included in the main part and two or more antennas included in the diversity part may not be connected with the RF circuit which may transmit or receive signals in the same frequency band at the same time. Accordingly, the electronic device may be difficult to receive signals in the same frequency band at the same time through the two or more antennas of the main part or the two or more antennas of the diversity part.

Accordingly, various embodiments disclosed in the present disclosure may provide an electronic device including a circuit which may transmit or receive signals in the same frequency band at the same time by using a plurality of antennas included in the electronic device and a method thereof.

SUMMARY

The present disclosure has been made to address at least the above problems and/or disadvantages and to provide at least the advantages described below.

According to an aspect of the present disclosure, a portable electronic device is provided that includes a plurality of antennas including a first antenna, a second antenna, a third antenna and a fourth antenna; and communication circuitry including a first receiving (RX) circuit, a second RX circuit, a third RX circuit and a transmitting and receiving (TX/RX) circuit, the first RX circuit configured to receive a first signal in a first specified frequency band via the first antenna, the second RX circuit configured to receive the first signal via the second antenna, the third RX circuit configured to receive the first signal via the third antenna, the TX/RX circuit configured to receive the first signal via the fourth antenna, the receiving of the first signal to be performed using the first RX circuit, the second RX circuit, the third RX circuit and the TX/RX circuit concurrently at least temporarily, and the TX/RX circuit further configured to transmit a second signal in the first specified frequency or a second specified frequency band different from the first specified frequency band at least temporarily while the receiving of the first signal is performed or terminated.

According to another aspect of the present disclosure, an electronic device is provided that includes an external housing including a first portion, a second portion adjacent to the first portion, a third portion further away from the first portion than the second portion, and a fourth portion adjacent to the third portion; a first antenna radiator forming at least a portion of the first portion and/or formed within the housing to be adjacent to the first portion; a second antenna radiator forming at least a portion of the second portion and/or formed within the housing to be adjacent to the second portion; a third antenna radiator forming at least a portion of the third portion and/or formed within the housing to be adjacent to the third portion; a fourth antenna radiator forming at least a portion of the fourth portion and/or formed within the housing to be adjacent to the fourth portion; at least one communication circuitry configured to support a frequency in a first band and a frequency in a second band lower than the first band; a first electrical path configured to electrically connect the at least one communication circuitry and the first antenna radiator and to receive a first signal having the frequency in the first band; a second electrical path configured to electrically connect the at least one communication circuitry and the second antenna radiator and to simultaneously or selectively receive a second signal having the frequency in the first band or the second band; a third electrical path configured to electrically connect the at least one communication circuitry and the third antenna radiator and to simultaneously or selectively receive a third signal having the frequency in the first band or the second band; a fourth electrical path configured to electrically connect the at least one communication circuitry and the fourth antenna radiator and to receive a fourth signal having the frequency in the first band; and a control circuit configured to receive the signal in the first band through at least two of the first to fourth antenna radiators at least temporarily simultaneously by controlling at least one of the first to fourth electrical paths.

According to a further aspect of the present disclosure, an electronic device is provided that includes a plurality of antennas, a communication circuitry electrically connected with the plurality of antennas, and a communication processor. The communication circuitry includes a plurality of circuits receiving a signal in a first band and is configured to simultaneously receive the signal in the first band through two or more circuits of the plurality of circuits from two or more antennas, which are positioned adjacent to each other, from among the plurality of antennas, and the communication processor is configured to control the communication circuitry such that the communication circuitry simultaneously receives the signal in the first band from the plurality of antennas, and to control the communication circuitry so as to receive the signal in the first band through one or more antennas of the plurality of antennas based on at least one of a received signal quality, a transmit power, or a reflection loss of each of the plurality of antennas.

According to various embodiments disclosed in the present disclosure, an electronic device may include a plurality of circuits which are simultaneously connected with respective antennas and may transmit or receive signals in the same band, thus simultaneously transmitting or receiving signals in the same bands through all the antennas included in the electronic device.

For another example, a path through which each of the plurality of antennas is connected with a communication circuit may be variously changed by using a signal distributer or a switching circuit which connects the plurality of antennas and the communication circuit.

For another example, power consumption of the plurality of antennas may be reduced by selecting an antenna to be used from the plurality of antennas based on performance of each of the plurality of antennas.

For another example, the securing of communication performance and the reduction of power consumption may be simultaneously accomplished by determining the number of antennas to be used for communication based on a signal strength of an antenna in use.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B are block diagrams illustrating a configuration of an antenna and an RF circuit included in an electronic device according to an embodiment;

DETAILED DESCRIPTION

Figure 1A:
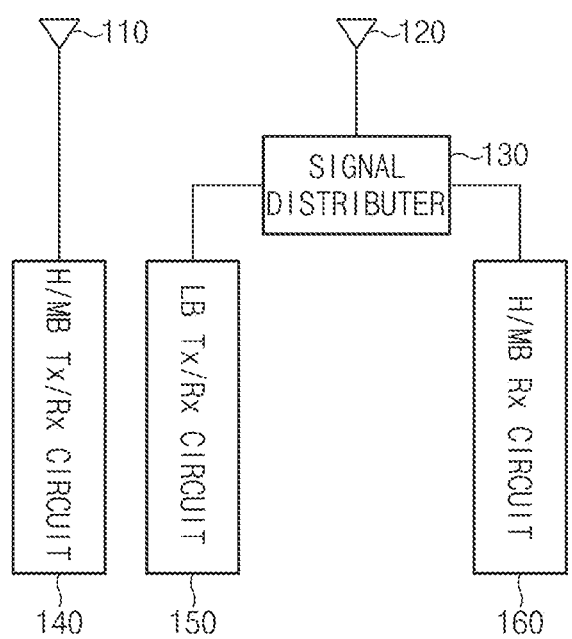
FIGS. 1A and 1B are block diagrams illustrating a configuration of an antenna and a radio frequency (RF) circuit included in an electronic device according to an embodiment.

Hereinafter, an embodiment of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MM), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

Figure 1B:
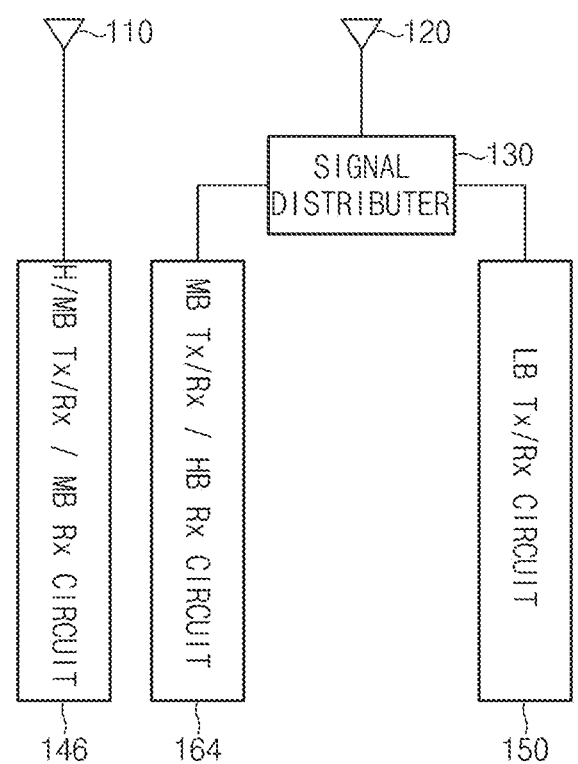

FIGS. 1A and 1B are block diagrams illustrating a configuration of an antenna and a radio frequency (RF) circuit included in an electronic device according to an embodiment.

Referring to FIG. 1A, an electronic device may include a first antenna 110, a second antenna 120, a signal distributer 130, a high band and middle band signal transmitter/receiver (Tx/Rx) circuit (hereinafter referred to as an "H/MB transmitter/receiver circuit") 140, a low band signal transmitter/receiver circuit (hereinafter referred to as a "LB transmitter/receiver circuit") 150, and a high band and middle band signal receiver (Rx) circuit (hereinafter referred to as a "H/MB receiver circuit") 160.

The electronic device according to an embodiment may receive a high band signal or a middle band signal at the same time through two antennas.

For example, the electronic device may include a plurality of antennas (the first antenna 110 and the second antenna 120). A signal received by the second antenna 120 may be transmitted to the LB transmitter/receiver circuit 150 or the H/MB receiver circuit 160 through the signal distributer 130 depending on a band of the signal.

According to an embodiment, the first antenna 110 may receive a signal from the outside or may radiate a signal transmitted within the electronic device. The first antenna 110 may receive or radiate, for example, the high band signal or the middle band signal. For example, the middle band may be a band ranging from approximately 1.7 GHz to approximately 2.1 GHz, and the high band may be a band ranging from approximately 2.3 GHz to approximately 2.7 GHz. The first antenna 110 may be electrically connected with the H/MB transmitter/receiver circuit 140. The first antenna 110 may be electrically connected with the H/MB transmitter/receiver circuit 140 through a first electrical path. The first electrical path may be configured to transmit the high band signal and the middle band signal. The first antenna 110 may transmit a signal received from the outside to the H/MB transmitter/receiver circuit 140. For another example, the first antenna 110 may radiate a signal transmitted from the H/MB transmitter/receiver circuit 140 to the outside.

According to an embodiment, the second antenna 120 may receive a signal from the outside or may radiate a signal transmitted within the electronic device. The second antenna 120 may receive or radiate, for example, the high band signal, the middle band signal, or a low band signal. For example, the low band may be a band ranging from approximately 600 MHz to approximately 900 MHz. The second antenna 120 may be electrically connected with the LB transmitter/receiver circuit 150 or the H/MB receiver circuit 160 through the signal distributer 130. For example, the second antenna 120 may be electrically connected with the LB transmitter/receiver circuit 150 or the H/MB receiver circuit 160 through a second electrical path. The second electrical path may be configured to transmit the high band signal, the middle band signal, and the low band signal. The second electrical path may simultaneously or selectively transmit the high band signal, the middle band signal, and the low band signal. The second electrical path may be changed by the signal distributer 130. For example, depending on an operation of the signal distributer 130, the second antenna 120 may be electrically connected with the LB transmitter/receiver circuit 150 through the second electrical path or may be connected with the H/MB receiver circuit 160 through the second electrical path. The LB transmitter/receiver circuit 150 or the H/MB receiver circuit 160 may be electrically connected with the second antenna 120 through the second electrical path. For example, the second antenna 120 may transmit the low band signal received from the outside to the LB transmitter/receiver circuit 150, and may radiate a signal transmitted from the LB transmitter/receiver circuit 150 to the outside. For another example, the second antenna 120 may transmit the high band signal or the middle band signal received from the outside to the H/MB receiver circuit 160. The second antenna 120 may be positioned at a location adjacent to the first antenna 110.

According to an embodiment, when electrically connected with the first antenna 110, the H/MB transmitter/receiver circuit 140 may transmit or receive at least a part of a signal through the first antenna 110. For example, the H/MB transmitter/receiver circuit 140 may transmit or receive the high band signal (a first band signal) or the middle band signal (a third band signal) to or from the first antenna 110. For another example, the H/MB transmitter/receiver circuit 140 may amplify and filter a signal transmitted from a transceiver (e.g., a transceiver 1720 of FIG. 17A) and may transmit the amplified and filtered signal to the first antenna 110. The H/MB transmitter/receiver circuit 140 may filter and amplify or may filter a signal transmitted from the first antenna 110 and may transmit a result of the filtering and amplifying to the transceiver (e.g., the transceiver 1720 of FIG. 17A).

According to an embodiment, when electrically connected with the second antenna 120 through the signal distributer 130, the LB transmitter/receiver circuit 150 may transmit or receive at least a part of a signal through the second antenna 120. For example, the LB transmitter/receiver circuit 150 may transmit or receive the low band signal (a second band signal) to or from the second antenna 120. The LB transmitter/receiver circuit 150 may filter or amplify a signal transmitted from the transceiver (e.g., the transceiver 1720 of FIG. 17A) and may transmit a result of the filtering or amplifying to the second antenna 120.

According to an embodiment, when electrically connected with the second antenna 120 through the signal distributer 130, the H/MB receiver circuit 160 may receive at least a part of a signal through the second antenna 120. For example, the H/MB receiver circuit 160 may receive the high band signal or the middle band signal from the second antenna 120. The H/MB receiver circuit 160 may filter or amplify a signal transmitted from the second antenna 120 and may transmit a result of the filtering or amplifying to the transceiver (e.g., the transceiver 1720 of FIG. 17A) or a communication processor (e.g., a communication processor 1730 of FIG. 17A).

According to an embodiment, the electronic device may include two circuits (the H/MB transmitter/receiver circuit 140 and the H/MB receiver circuit 160) which are simultaneously connected with two respective antennas (e.g., the first antenna 110 and the second antenna 120) and may receive the high band signal or the middle band signal.

According to an embodiment, the signal distributer 130 may selectively or simultaneously connect the second antenna 120 with the LB transmitter/receiver circuit 150 or the H/MB receiver circuit 160. For example, the signal distributer 130 may transmit the low band signal of the signal transmitted from the second antenna 120 to the LB transmitter/receiver circuit 150 and may transmit the middle band signal and the high band signal thereof to the H/MB receiver circuit 160. The signal distributer 130 may include, for example, a switch, a diplexer, a duplexer, or the like. The switch may selectively connect the second antenna 120 with the LB transmitter/receiver circuit 150 or the H/MB receiver circuit 160. The diplexer or the duplexer may simultaneously connect the second antenna 120 with the LB transmitter/receiver circuit 150 or the H/MB receiver circuit 160. For example, in the case where the signal distributer 130 includes the diplexer, the signal distributer 130 may separate the low band signal and the high band/middle band signal. The signal distributer 130 may separate a signal and may transmit the separated signal to an appropriate circuit of the LB transmitter/receiver circuit 150 or the H/MB receiver circuit 160.

According to an embodiment, the H/MB transmitter/receiver circuit 140, the LB transmitter/receiver circuit 150, and the H/MB receiver circuit 160 may be implemented in one communication circuit included in the electronic device. For example, the communication circuit may receive at least a part of the high band signal and/or the middle band signal at the same time through a plurality of antennas included in the electronic device. For example, in the case where the high band signal and/or the middle band signal is received by the second antenna 120, the signal distributer 130 may allow the signal received by the second antenna 120 to be transmitted to the H/MB receiver circuit 160. For example, in the case where the H/MB transmitter/receiver circuit 140 is electrically connected with the first antenna 110 and the H/MB receiver circuit 160 is electrically connected with the second antenna 120 adjacent to the first antenna 110, the communication circuit may be configured to simultaneously receive at least a part of the high band signal and/or the middle band signal received by the first antenna 110 and the second antenna 120 by using the H/MB transmitter/receiver circuit 140 and the H/MB receiver circuit 160.

Referring to FIG. 1B, an electronic device may include the first antenna 110, the second antenna 120, the signal distributer 130, a high band signal transmitter/receiver and middle band signal receiver circuit (hereinafter referred to as an "HB transmitter/receiver/MB receiver circuit") 146, the LB transmitter/receiver circuit 150, and a middle band signal transmitter/receiver and high band signal receiver circuit (hereinafter referred to as a "MB transmitter/receiver/HB receiver circuit") 164.

The electronic device according to an embodiment may receive the high band signal and/or the middle band signal at the same time through two antennas. A signal received by the second antenna 120 may be transmitted to the MB transmitter/receiver/HB receiver circuit 164 or the LB transmitter/receiver circuit 150 through the signal distributer 130 through the signal distributer 130 depending on a band of the signal. According to an embodiment, the electronic device may include the HB transmitter/receiver/MB receiver circuit 146 in which an HB transmitter/receiver circuit and an MB receiver circuit are combined. The HB transmitter/receiver/MB receiver circuit 146 may be electrically connected with the first antenna 110. When electrically connected with the first antenna 110, the HB transmitter/receiver/MB receiver circuit 146 may transmit or receive at least a part of a signal through the first antenna 110. For example, the HB transmitter/receiver/MB receiver circuit 146 may transmit the high band signal to the first antenna 110, and may receive the high band signal and the middle band signal from the first antenna 110. The HB transmitter/receiver circuit or the MB receiver circuit included in the HB transmitter/receiver/MB receiver circuit 146 may be selectively or simultaneously connected with the first antenna 110.

According to an embodiment, the electronic device may include the MB transmitter/receiver/HB receiver circuit 164 in which an MB transmitter/receiver circuit and an HB receiver circuit are combined. The MB transmitter/receiver/HB receiver circuit 164 may be electrically connected with the second antenna 120 through the signal distributer 130. When electrically connected with the second antenna 120, the MB transmitter/receiver/HB receiver circuit 164 may transmit or receive at least a part of a signal through the second antenna 120. For example, the MB transmitter/receiver/HB receiver circuit 164 may transmit the middle band signal to the second antenna 120, and may receive the high band signal and the middle band signal from the second antenna 120. The MB transmitter/receiver circuit or the HB receiver circuit included in the MB transmitter/receiver/HB receiver circuit 164 may be selectively or simultaneously connected with the second antenna 120.

According to an embodiment, the electronic device may include a module in which two or more circuits such as the H/MB transmitter/receiver circuit 140, the H/MB receiver circuit 160, the HB transmitter/receiver/MB receiver circuit 146, the MB transmitter/receiver/HB receiver circuit 164, or the like are combined. FIGS. 1A and 1B show the H/MB transmitter/receiver circuit 140, the H/MB receiver circuit 160, the HB transmitter/receiver/MB receiver circuit 146, and the MB transmitter/receiver/HB receiver circuit 164, but the electronic device may include various types of modules in which two or more circuits such as an HB transmitter/receiver circuit, an MB transmitter/receiver circuit, an LB transmitter/receiver circuit, an HB receiver circuit, an MB receiver circuit, or an LB receiver circuit are combined.

According to an embodiment, the HB transmitter/receiver/MB receiver circuit 146, the LB transmitter/receiver circuit 150, and the MB transmitter/receiver/HB receiver circuit 164 may be implemented in one communication circuit included in the electronic device. For example, the communication circuit may receive at least a part of the high band signal and/or the middle band signal at the same time through a plurality of antennas included in the electronic device. For example, in the case where the high band signal and/or the middle band signal is received by the second antenna 120, the signal distributer 130 may allow the signal received by the second antenna 120 to be transmitted to the MB transmitter/receiver/HB receiver circuit 164. In the case where the HB transmitter/receiver/MB receiver circuit 146 is electrically connected with the first antenna 110 and the MB transmitter/receiver/HB receiver circuit 164 is electrically connected with the second antenna 120 adjacent to the first antenna 110, the communication circuit may be configured to simultaneously receive at least a part of the high band signal and/or the middle band signal received by the first antenna 110 and the second antenna 120 by using the HB transmitter/receiver/MB receiver circuit 146 and the MB transmitter/receiver/HB receiver circuit 164.

Figure 2:
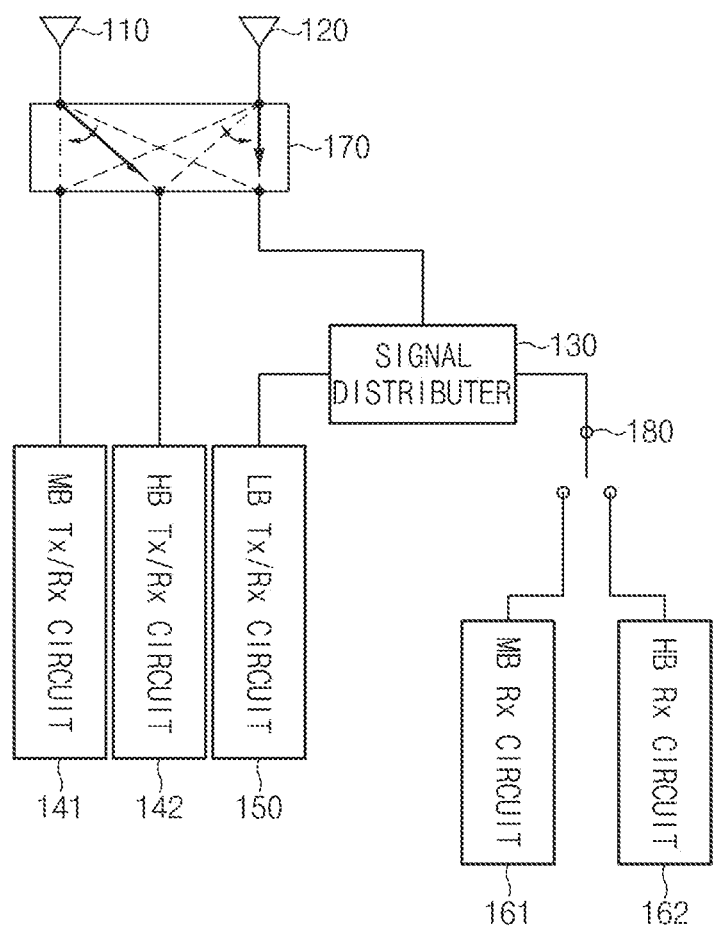
FIG. 2 is a block diagram illustrating a configuration of an antenna and an RF circuit included in an electronic device according to an embodiment.

FIG. 2 is a block diagram illustrating a configuration of an antenna and an RF circuit included in an electronic device according to an embodiment.

Referring to FIG. 2, an electronic device may include a middle band signal transmitter/receiver circuit (hereinafter referred to as an "MB transmitter/receiver circuit") 141, a high band signal transmitter/receiver circuit (hereinafter referred to as an HB transmitter/receiver circuit") 142 and may include a middle band signal receiver circuit (hereinafter referred to as an "MB receiver circuit") 161 and a high band signal receiver circuit (hereinafter referred to as an "HB receiver circuit") 162. The electronic device may further include a switching circuit 170 and a switch 180.

The electronic device according to an embodiment may receive the high band signal or the middle band signal at the same time through two antennas. For example, a signal received by the first antenna 110 and/or the second antenna 120 may be transmitted to the MB transmitter/receiver circuit 141, the HB transmitter/receiver circuit 142, the LB transmitter/receiver circuit 150, the MB receiver circuit 161, or the HB receiver circuit 162 through the switching circuit 170, the signal distributer 130, and/or the switch 180 depending on a band of the signal.

According to an embodiment, the first antenna 110 may be connected with the MB transmitter/receiver circuit 141, the HB transmitter/receiver circuit 142, or the signal distributer 130 through a first electrical path. The first electrical path may be configured to transmit the high band signal, the middle band signal, and the low band signal. The first electrical path may be changed by the switching circuit 170, the signal distributer 130, or the switch 180.

According to an embodiment, the second antenna 120 may be connected with the MB transmitter/receiver circuit 141, the HB transmitter/receiver circuit 142, or the signal distributer 130 through a second electrical path. The second electrical path may be configured to transmit the high band signal, the middle band signal, and the low band signal. The second electrical path may simultaneously or selectively transmit the high band signal, the middle band signal, and the low band signal. The second electrical path may be changed by the switching circuit 170, the signal distributer 130, or the switch 180.

For example, the MB transmitter/receiver circuit 141 may be electrically connected with the first antenna 110 or the second antenna 120 selectively through the switching circuit 170. For example, in the case where the MB transmitter/receiver circuit 141 is connected with the first antenna 110 or the second antenna 120, the MB transmitter/receiver circuit 141 may transmit the middle band signal to the first antenna 110 or the second antenna 120 or may receive the middle band signal from the first antenna 110 or the second antenna 120.

For example, the HB transmitter/receiver circuit 142 may be electrically connected with the first antenna 110 or the second antenna 120 selectively through the switching circuit 170. In the case where the HB transmitter/receiver circuit 142 is connected with the first antenna 110 or the second antenna 120, the HB transmitter/receiver circuit 142 may transmit the high band signal to the first antenna 110 or the second antenna 120 or may receive the high band signal from the first antenna 110 or the second antenna 120.

For example, the MB receiver circuit 161 may be electrically connected with the signal distributer 130 through the switch 180. In the case where the MB receiver circuit 161 is connected with the first antenna 110 or the second antenna 120, the MB receiver circuit 161 may receive the middle band signal from the first antenna 110 or the second antenna 120.

For example, the HB receiver circuit 162 may be electrically connected with the signal distributer 130 through the switch 180. In the case where the HB receiver circuit 162 is connected with the first antenna 110 or the second antenna 120, the HB receiver circuit 162 may receive the high band signal from the first antenna 110 or the second antenna 120.

According to an embodiment, the MB receiver circuit 161 and the HB receiver circuit 162 may be selectively connected with the signal distributer 130 depending on an operation of the switch 180. The switch 180 may be replaced with a diplexer. In this case, the MB receiver circuit 161 and the HB receiver circuit 162 may be simultaneously connected with the signal distributer 130. According to an embodiment, the signal distributer 130 may be selectively connected with the first antenna 110 or the second antenna 120 through the switching circuit 170. The signal distributer 130 may be electrically connected with the LB transmitter/receiver circuit 150 or the switch 180. The signal distributer 130 may be selectively connected with the MB receiver circuit 161 or the HB receiver circuit 162 through the switch 180. For example, in the case where the low band signal is received from the second antenna 120, the signal distributer 130 may transmit the low band signal to the LB transmitter/receiver circuit 150. For another example, in the case where the high band signal or the middle band signal is received from the first antenna 110 or the second antenna 120, the signal distributer 130 may transmit the high band signal or the middle band signal to the HB receiver circuit 162 or the MB receiver circuit 161 through the switch 180, respectively.

The switch 180 may define a connection relationship between the signal distributer 130 and the MB receiver circuit 161 or the HB receiver circuit 162. The switch 180 may selectively connect the signal distributer 130 with the HB receiver circuit 162 or the MB receiver circuit 161. The switch 180 may connect, for example, the signal distributer 130 and the MB receiver circuit 161, and may connect the signal distributer 130 and the HB receiver circuit 162. In the case where the high band signal is input to the signal distributer 130 through the first antenna 110 or the second antenna 120, the switch 180 may connect the signal distributer 130 and the HB receiver circuit 162. In the case where the middle band signal is input to the signal distributer 130 through the first antenna 110 or the second antenna 120, the switch 180 may connect the signal distributer 130 and the MB receiver circuit 161. The operation of the switch 180 may be controlled by, for example, a control circuit for controlling an electrical path or a communication processor (e.g., the communication processor 1730 of FIG. 17A).

According to an embodiment, the switching circuit 170 may be electrically connected with the first antenna 110 or the second antenna 120 and the MB transmitter/receiver circuit 141, the HB transmitter/receiver circuit 142, and/or the signal distributer 130. The switching circuit 170 may define a connection between the first antenna 110 and the second antenna 120 and the MB transmitter/receiver circuit 141, the HB transmitter/receiver circuit 142, and the signal distributer 130. The switching circuit 170 may connect the first antenna 110 and the second antenna 120 with different components. For example, the switching circuit 170 may selectively connect the first antenna 110 with the MB transmitter/receiver circuit 141, the HB transmitter/receiver circuit 142, and/or the signal distributer 130. For another example, the switching circuit 170 may selectively connect the second antenna 120 with a component, which is not electrically connected with the first antenna 110, from among the MB transmitter/receiver circuit 141, the HB transmitter/receiver circuit 142, and/or the signal distributer 130. For another example, in the case where the low band signal is transmitted through the second antenna 120 or in the case where the low band signal is transmitted through the LB transmitter/receiver circuit 150, the switching circuit 170 may connect the second antenna 120 with the signal distributer 130. In this case, the first antenna 110 may be connected with the MB transmitter/receiver circuit 141 or the HB transmitter/receiver circuit 142. The operation of the switching circuit 170 may be controlled by, for example, a control circuit for controlling an electrical path or a communication processor (e.g., the communication processor 1730 of FIG. 17A).

According to an embodiment, the electronic device may include two circuits (the HB transmitter/receiver circuit 142 and the HB receiver circuit 162) which are simultaneously connected with two respective antennas (e.g., the first antenna 110 and the second antenna 120) and may receive the high band signal at the same time. For another example, the electronic device may include two circuits (the MB transmitter/receiver circuit 141 and the MB receiver circuit 161) which are simultaneously connected with two respective antennas (e.g., the first antenna 110 and the second antenna 120) and may receive the middle band signal at the same time.

According to an embodiment, the MB transmitter/receiver circuit 141, the HB transmitter/receiver circuit 142, the LB transmitter/receiver circuit 150, the MB receiver circuit 161, and the HB receiver circuit 162 may be implemented in one communication circuit included in the electronic device. The communication circuit may receive at least a part of the high band signal or the middle band signal at the same time through a plurality of antennas included in the electronic device. For example, in the case where the middle band signal is received by the first antenna 110 and the second antenna 120, the switching circuit 170 may allow the middle band signal received by the first antenna 110 (or the second antenna 120) to be transmitted to the MB transmitter/receiver circuit 141. For another example, the switching circuit 170 may allow the middle band signal received by the second antenna 120 (or the first antenna 110) to be transmitted to the signal distributer 130, and the signal distributer 130 and the switch 180 may allow the middle band signal to be transmitted to the MB receiver circuit 161. For another example, in the case where the high band signal is received by the first antenna 110 and the second antenna 120, the switching circuit 170 may allow the high band signal received by the first antenna 110 (or the second antenna 120) to be transmitted to the HB transmitter/receiver circuit 142. For another example, the switching circuit 170 may allow the high band signal received by the second antenna 120 (or the first antenna 110) to be transmitted to the signal distributer 130, and the signal distributer 130 and the switch 180 may allow the high band signal to be transmitted to the HB receiver circuit 162. In the case where the high band (or middle band) signal is simultaneously received by the first antenna 110 and the second antenna 120 adjacent to the first antenna 110, the communication circuit may be configured to simultaneously receive at least a part of the high band (or middle band) signal received by the first antenna 110 and the second antenna 120 by using the HB transmitter/receiver circuit 142 and the HB receiver circuit 162 (or the MB transmitter/receiver circuit 141 and the MB receiver circuit 161).

Figure 3:
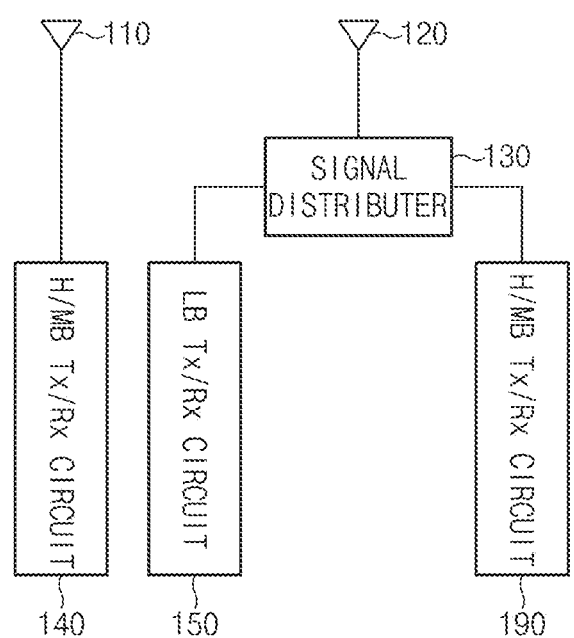
FIG. 3 is a block diagram illustrating a configuration of an antenna and an RF circuit included in an electronic device according to an embodiment.

FIG. 3 is a block diagram illustrating a configuration of an antenna and an RF circuit included in an electronic device according to an embodiment.

Referring to FIG. 3, an electronic device may include the first antenna 110, the second antenna 120, the signal distributer 130, the H/MB transmitter/receiver circuit 140, the LB transmitter/receiver circuit 150, and an H/MB transmitter/receiver circuit 190.

The electronic device according to an embodiment may transmit or receive the high band signal or the middle band signal at the same time through two antennas. For example, a signal received by the first antenna 110 may be transmitted to the H/MB transmitter/receiver circuit 140; at the same time, a signal received by the second antenna 120 may be transmitted to the LB transmitter/receiver circuit 150 or the H/MB transmitter/receiver circuit 190 through the signal distributer 130 depending on a band of the signal. For another example, a signal generated by the H/MB transmitter/receiver circuit 140 may be radiated through the first antenna 110; at the same time, a signal generated by the LB transmitter/receiver circuit 150 or the H/MB transmitter/receiver circuit 190 may be radiated through the second antenna 120.

According to an embodiment, the H/MB transmitter/receiver circuit 190 may be electrically connected with the second antenna 120 through the signal distributer 130. The H/MB transmitter/receiver circuit 190 may receive the high band signal or the middle band signal from the second antenna 120 and may transmit the high band signal or the middle band signal to the second antenna 120.

The electronic device according to an embodiment may include two circuits (the H/MB transmitter/receiver circuit 140 and the H/MB transmitter/receiver circuit 190) which are simultaneously connected with two respective antennas (e.g., the first antenna 110 and the second antenna 120) and may receive or transmit the high band signal or the middle band signal.

According to an embodiment, the H/MB transmitter/receiver circuit 140, the LB transmitter/receiver circuit 150, and the H/MB transmitter/receiver circuit 190 may be implemented in one communication circuit included in the electronic device. For example, the communication circuit may be configured to simultaneously receive the high band signal and the middle band signal from two antennas (the first antenna 110 and the second antenna 120) by using two receiver circuits (the H/MB transmitter/receiver circuit 140 and the H/MB transmitter/receiver circuit 190), and to simultaneously transmit the high band signal and the middle band signal through the two antennas by using two transmitter circuits (e.g., the H/MB transmitter/receiver circuit 140 and the H/MB transmitter/receiver circuit 190).

According to an embodiment, the H/MB transmitter/receiver circuit 140, the LB transmitter/receiver circuit 150, and the H/MB transmitter/receiver circuit 190 may be implemented in one communication circuit included in the electronic device. The communication circuit may receive or radiate the high band signal and/or the middle band signal at the same time through a plurality of antennas included in the electronic device. For example, in the case where the high band signal and/or the middle band signal is received by the second antenna 120, the signal distributer 130 may allow the signal received by the second antenna 120 to be transmitted to the H/MB transmitter/receiver circuit 190. In the case where the H/MB transmitter/receiver circuit 140 is electrically connected with the first antenna 110 and the H/MB transmitter/receiver circuit 190 is electrically connected with the second antenna 120 adjacent to the first antenna 110, the communication circuit may be configured to simultaneously receive at least a part of the high band signal or the middle band signal received by the first antenna 110 and the second antenna 120 by using the H/MB transmitter/receiver circuit 140 and the H/MB transmitter/receiver circuit 190. For another example, the communication circuit may be configured to simultaneously radiate at least a part of the high band signal or the middle band signal generated by the H/MB transmitter/receiver circuit 140 and the H/MB transmitter/receiver circuit 190 by using the first antenna 110 and the second antenna 120.

Figure 4:
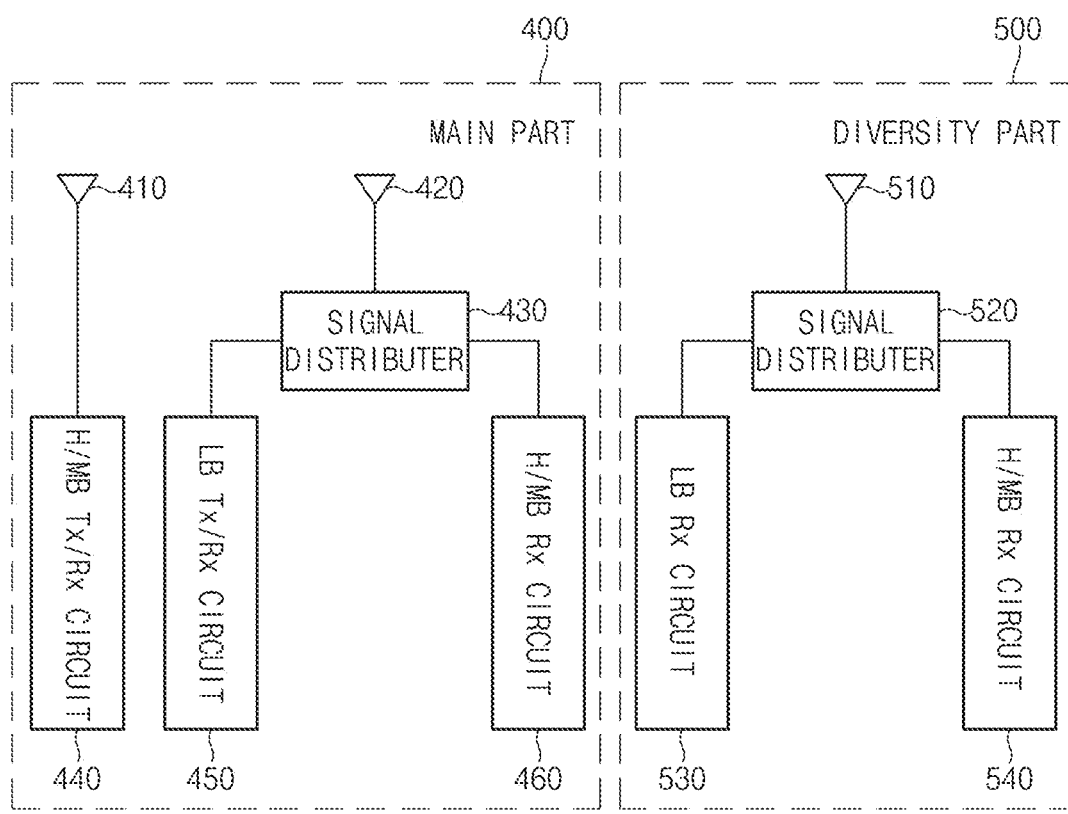
FIG. 4 is a block diagram illustrating a configuration of an antenna and an RF circuit included in an electronic device according to an embodiment.

FIG. 4 is a block diagram illustrating a configuration of an antenna and an RF circuit included in an electronic device according to an embodiment.

Referring to FIG. 4, an electronic device may include a main part 400 which includes a first antenna 410, a second antenna 420, a signal distributer 430, an H/MB transmitter/receiver circuit 440, an LB transmitter/receiver circuit 450, and an H/MB receiver circuit 460, and a diversity part 500 which includes a third antenna 510, a signal distributer 520, an LB receiver circuit 530, and an H/MB receiver circuit 540.

The electronic device according to an embodiment may receive the high band signal or the middle band signal at the same time through three antennas. For example, a signal received by the first antenna 410 may be transmitted to the H/MB transmitter/receiver circuit 440; at the same time, a signal received by the second antenna 420 may be transmitted to the H/MB receiver circuit 460 through the signal distributer 430; at the same time, a signal received by the third antenna 510 may be transmitted to the H/MB receiver circuit 540 through the signal distributer 520. According to an embodiment, the main part 400 may be configured to transmit or receive a signal to or from the outside through the first antenna 410 and the second antenna 420. According to an embodiment, the first antenna 410, the second antenna 420, the signal distributer 430, the H/MB transmitter/receiver circuit 440, the LB transmitter/receiver circuit 450, and the H/MB receiver circuit 460 included in the main part 400 may be the same as the first antenna 110, the second antenna 120, the signal distributer 130, the H/MB transmitter/receiver circuit 140, the LB transmitter/receiver circuit 150, and the H/MB receiver circuit 160 illustrated in FIG. 1. The first antenna 410 and the second antenna 420 may be positioned at locations adjacent to each other.

According to an embodiment, the diversity part 500 may be configured to receive a signal from the outside through the third antenna 510. The third antenna 510 may receive a signal from the outside. The third antenna 510 may receive, for example, the high band signal, the middle band signal, or the low band signal. The LB receiver circuit 530 or the H/MB receiver circuit 540 may be electrically connected with the third antenna 510 through a third electrical path. The third electrical path may be configured to transmit the high band signal, the middle band signal, and the low band signal. The third electrical path may simultaneously or selectively transmit the high band signal, the middle band signal, and the low band signal. The third electrical path may be changed by the signal distributer 520. The third antenna 510 may be electrically connected with the LB receiver circuit 530 or the H/MB receiver circuit 540 through the signal distributer 520. The third antenna 510 may transmit the low band signal received from the outside to the LB receiver circuit 530. For another example, the third antenna 510 may transmit the high band signal or the middle band signal received from the outside to the H/MB receiver circuit 540. A distance between the third antenna 510 and the first antenna 410 and a distance between the third antenna 510 and the second antenna 420 may be longer than a distance between the first antenna 410 and the second antenna 420. For example, the third antenna 510 may be positioned at an upper end of the electronic device, and the first antenna 410 and the second antenna 420 may be positioned at a lower end of the electronic device.

According to an embodiment, the LB receiver circuit 530 may be electrically connected with the third antenna 510 through the signal distributer 520. The LB receiver circuit 530 may receive the low band signal from the third antenna 510.

According to an embodiment, the H/MB receiver circuit 540 may be electrically connected with the third antenna 510 through the signal distributer 520. The H/MB receiver circuit 540 may receive the high band signal or the middle band signal from the third antenna 510.

According to an embodiment, the signal distributer 520 may selectively or simultaneously connect the third antenna 510 with the LB receiver circuit 530 or the H/MB receiver circuit 540. For example, the signal distributer 520 may transmit the low band signal of the signal transmitted from the third antenna 510 to the LB receiver circuit 530 and may transmit the middle band signal and the high band signal thereof to the H/MB receiver circuit 540. The signal distributer 520 may include, for example, a switch, a diplexer, a duplexer, or the like. The switch may selectively connect the third antenna 510 with the LB receiver circuit 530 or the H/MB receiver circuit 540. The diplexer or the duplexer may simultaneously connect the third antenna 510 with the LB receiver circuit 530 or the H/MB receiver circuit 540. In the case where the signal distributer 520 includes the diplexer, the signal distributer 520 may separate the low band signal and the high band/middle band signal. The signal distributer 520 may separate a signal and may transmit the separated signal to a circuit, which is suitable for receiving the separated signal, from among the LB receiver circuit 530 or the H/MB receiver circuit 540.

According to an embodiment, the electronic device may include three circuits (the H/MB transmitter/receiver circuit 440, the H/MB receiver circuit 460, and the H/MB receiver circuit 540) which are simultaneously connected with three respective antennas (e.g., the first antenna 410, the second antenna 420, and the third antenna 510) of two antennas of the main part 400 and one antenna of the diversity part 500 and may receive the high band signal at the same time.

According to an embodiment, the H/MB transmitter/receiver circuit 440, the LB transmitter/receiver circuit 450, and the H/MB receiver circuit 460 may be implemented in a first communication circuit included in the main part 400. For another example, the LB receiver circuit 530 and the H/MB receiver circuit 540 may be implemented in a second communication circuit included in the diversity part 500. A communication circuit may receive the high band signal and/or the middle band signal at the same time through a plurality of antennas included in the electronic device. For example, in the case where the high band signal and/or the middle band signal is received by the second antenna 420, the signal distributer 430 may allow the signal received by the second antenna 420 to be transmitted to the H/MB receiver circuit 460; in the case where the high band signal and/or the middle band signal is received by the third antenna 510, the signal distributer 520 may allow the signal received by the third antenna 510 to be transmitted to the H/MB receiver circuit 540. In the case where the H/MB transmitter/receiver circuit 440 is connected with the first antenna 410, the H/MB receiver circuit 460 is connected with the second antenna 420, and the H/MB receiver circuit 540 is connected with the third antenna 510, the communication circuit may be configured to simultaneously receive at least a part of the high band signal or the middle band signal received by the first antenna 410, the second antenna 420, and the third antenna 510 by using the H/MB transmitter/receiver circuit 440, the H/MB receiver circuit 460, and the H/MB receiver circuit 540.

Figure 5:
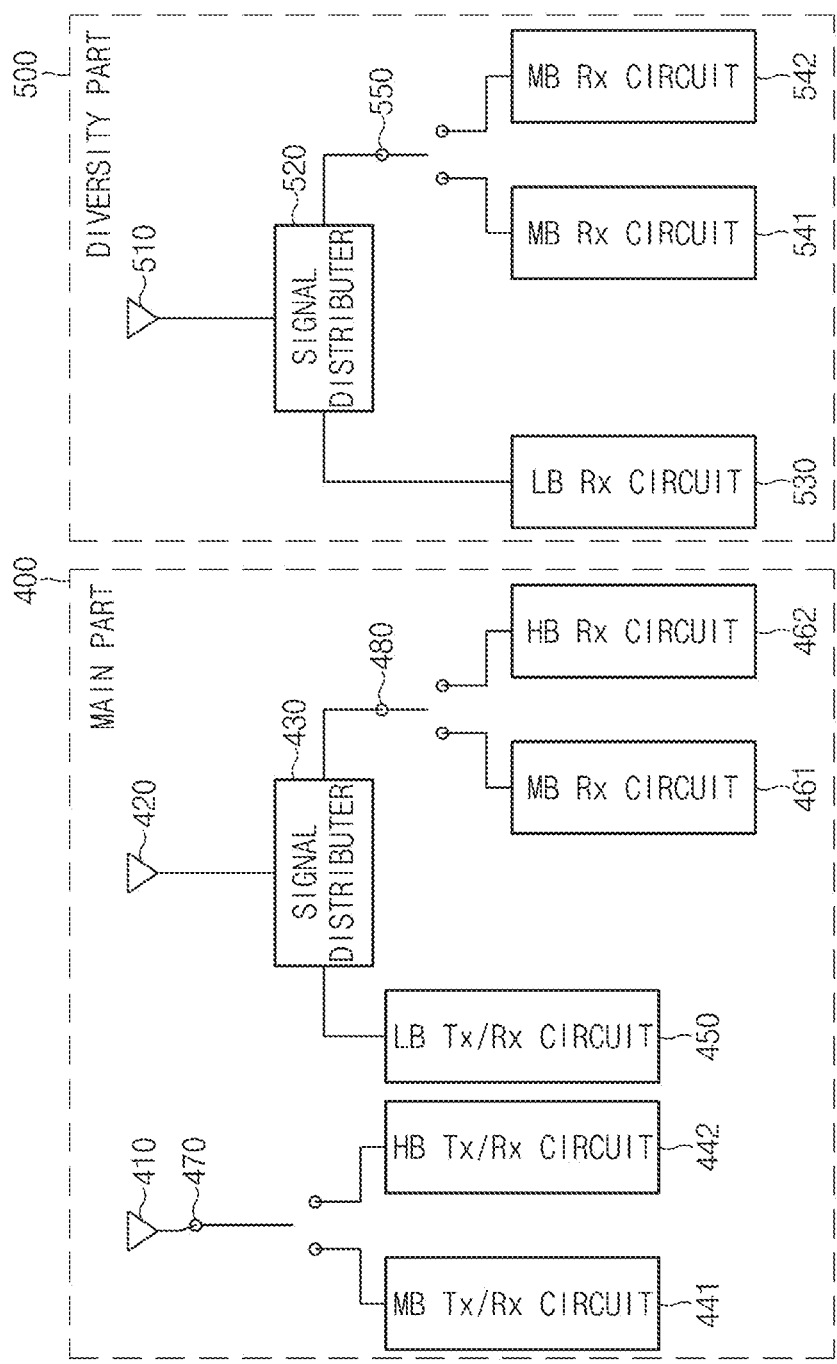
FIG. 5 is a block diagram illustrating a configuration of an antenna and an RF circuit included in an electronic device according to an embodiment.

FIG. 5 is a block diagram illustrating a configuration of an antenna and an RF circuit included in an electronic device according to an embodiment.

Referring to FIG. 5, an electronic device may include the main part 400 which includes the first antenna 410, the second antenna 420, the signal distributer 430, an MB transmitter/receiver circuit 441, an HB transmitter/receiver circuit 442, an LB transmitter/receiver circuit 450, an MB receiver circuit 461, an HB receiver circuit 462, a first switch 470, and a second switch 480. The electronic device may include the diversity part 500 which includes the third antenna 510, the signal distributer 520, the LB receiver circuit 530, an MB receiver circuit 541, an HB receiver circuit 542, and a third switch 550.

The electronic device according to an embodiment may receive the high band signal or the middle band signal at the same time through three antennas. For example, a signal received by the first antenna 410 may be transmitted to the MB transmitter/receiver circuit 441 or the HB transmitter/receiver circuit 442, a signal received by the second antenna 420 may be transmitted to the MB receiver circuit 461 or the HB receiver circuit 462 through the signal distributer 430 and the second switch 480, and a signal received by the third antenna 510 may be transmitted to the MB receiver circuit 541 or the HB receiver circuit 542 through the signal distributer 520 and the third switch 550.

According to an embodiment, the first antenna 410, the second antenna 420, the signal distributer 430, the MB transmitter/receiver circuit 441, the HB transmitter/receiver circuit 442, the LB transmitter/receiver circuit 450, the MB receiver circuit 461, the HB receiver circuit 462, and the second switch 480 included in the main part 400 may be the same as the first antenna 110, the second antenna 120, the signal distributer 130, the MB transmitter/receiver circuit 141, the HB transmitter/receiver circuit 142, the LB transmitter/receiver circuit 150, the MB receiver circuit 161, the HB receiver circuit 162, and the switch 180 illustrated in FIG. 2.

According to an embodiment, the first switch 470 may define a connection of the first antenna 410 with the MB transmitter/receiver circuit 441 and the HB transmitter/receiver circuit 442. The first switch 470 may connect, for example, the first antenna 410 and the MB transmitter/receiver circuit 441, and may connect the first antenna 410 and the HB transmitter/receiver circuit 442. The operation of the first switch 470 may be controlled by, for example, a control circuit, a transceiver (e.g., the transceiver 1720 of FIG. 17A), or a communication processor (e.g., the communication processor 1730 of FIG. 17A).

According to an embodiment, the LB receiver circuit 530, the MB receiver circuit 541, or the HB receiver circuit 542 may be electrically connected with the third antenna 510 of the diversity part 500 through the third electrical path. The third electrical path may be changed by the signal distributer 520 or the third switch 550.

According to an embodiment, the MB receiver circuit 541 may be electrically connected with the signal distributer 520 through the third switch 550. The MB receiver circuit 541 may receive the middle band signal from the third antenna 510.

According to an embodiment, the HB receiver circuit 542 may be electrically connected with the signal distributer 520 through the third switch 550. The HB receiver circuit 542 may receive the high band signal from the third antenna 510.

According to an embodiment, the third switch 550 may define a connection of the signal distributer 520 with the MB receiver circuit 541 or the HB receiver circuit 542. The third switch 550 may connect, for example, the signal distributer 520 and the MB receiver circuit 541, and may connect the signal distributer 520 and the HB receiver circuit 542. The operation of the third switch 550 may be controlled by, for example, a control circuit, a transceiver (e.g., the transceiver 1720 of FIG. 17A), or a communication processor (e.g., the communication processor 1730 of FIG. 17A).

According to an embodiment, the electronic device may include three circuits (the HB transmitter/receiver circuit 442, the HB receiver circuit 462, and the HB receiver circuit 542) which are simultaneously connected with three respective antennas (e.g., the first antenna 410, the second antenna 420, and the third antenna 510), for example, two antennas of the main part 400 and one antenna of the diversity part 500 and may receive the high band signal at the same time. For another example, the electronic device may include three circuits (the MB transmitter/receiver circuit 441, the MB receiver circuit 461, and the MB receiver circuit 541) which are simultaneously connected with three respective antennas and may receive the middle band signal at the same time.

According to an embodiment, the MB transmitter/receiver circuit 441, the HB transmitter/receiver circuit 442, the LB transmitter/receiver circuit 450, the MB receiver circuit 461, and the HB receiver circuit 462 may be implemented in a first communication circuit included in the main part 400. For another example, the LB receiver circuit 530, the MB receiver circuit 541, and the HB receiver circuit 542 may be implemented in a second communication circuit included in the diversity part 500. A communication circuit may receive the high band signal or the middle band signal at the same time through a plurality of antennas included in the electronic device. For example, in the case where the middle band signal (or the high band signal) is received by the first antenna 410, the first switch 470 may allow the signal received by the first antenna 410 to be transmitted to the MB transmitter/receiver circuit 441 (or the HB transmitter/receiver circuit 442). In the case where the middle band signal (or the high band signal) is received by the second antenna 420, the second switch 480 may allow the signal received by the second antenna 420 to be transmitted to the MB receiver circuit 461 (or the HB receiver circuit 462). In the case where the middle band signal (or the high band signal) is received by the third antenna 510, the signal distributer 520 and the third switch 550 may allow the signal received by the third antenna 510 to be transmitted to the MB receiver circuit 541 (or the HB receiver circuit 542). In the case where the MB transmitter/receiver circuit 441 (or the HB transmitter/receiver circuit 442) is connected with the first antenna 410, the MB receiver circuit 461 (or the HB receiver circuit 462) is connected with the second antenna 420, and the MB receiver circuit 541 (or the HB receiver circuit 542) is connected with the third antenna 510, the communication circuit may be configured to simultaneously receive the middle band signals (or the high band signals) from the first antenna 410, the second antenna 420, and the third antenna 510. For another example, the first communication circuit and the second communication circuit may be implemented with one integrated module depending on the implementation of the present disclosure.

Figure 6:
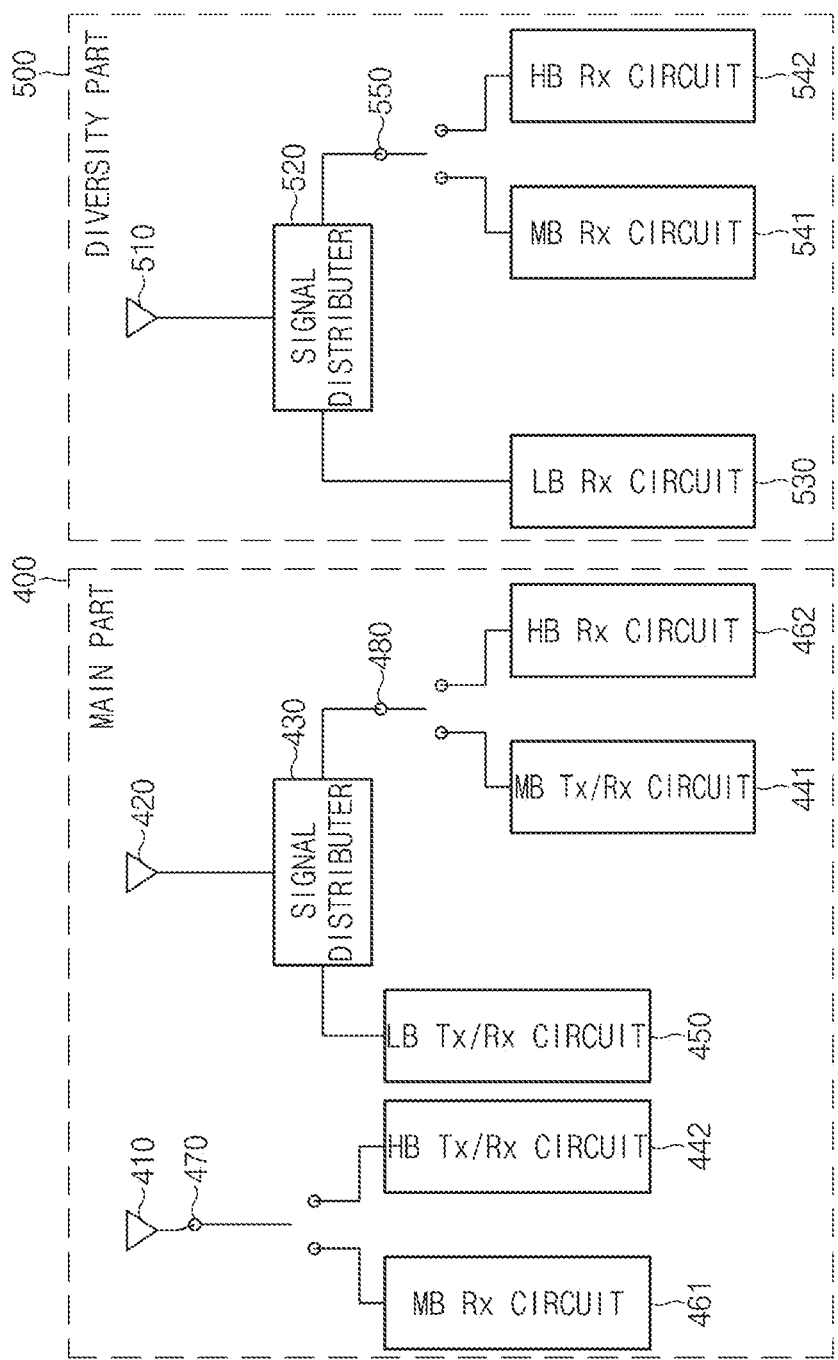
FIG. 6 is a block diagram illustrating a configuration of an antenna and an RF circuit included in an electronic device according to an embodiment.

FIG. 6 is a block diagram illustrating a configuration of an antenna and an RF circuit included in an electronic device according to an embodiment.

Referring to FIG. 6, an electronic device of FIG. 6 may be configured such that the MB receiver circuit 461 is connected with the first switch 470 and such that the MB transmitter/receiver circuit 441 is connected with the second switch 480.

The electronic device according to an embodiment may receive the high band signal or the middle band signal at the same time through three antennas. For example, a signal received by the first antenna 410 may be transmitted to the MB receiver circuit 461 or the HB transmitter/receiver circuit 442; at the same time, a signal received by the second antenna 420 may be transmitted to the MB transmitter/receiver circuit 441 or the HB receiver circuit 462 through the signal distributer 430 and the second switch 480; at the same time, a signal received by the third antenna 510 may be transmitted to the MB receiver circuit 541 or the HB receiver circuit 542 through the signal distributer 520 and the third switch 550.

According to an embodiment, the MB receiver circuit 461 may be electrically connected with the first antenna 410 through the first switch 470. The MB receiver circuit 461 may receive the middle band signal from the first antenna 410.

According to an embodiment, the first switch 470 may define a connection of the first antenna 410 with the MB receiver circuit 461 and the HB transmitter/receiver circuit 442. The first switch 470 may connect, for example, the first antenna 410 and the MB receiver circuit 461, and may connect the first antenna 410 and the HB transmitter/receiver circuit 442.

According to an embodiment, the MB transmitter/receiver circuit 441 may be electrically connected with the signal distributer 430 through the second switch 480. The MB transmitter/receiver circuit 441 may receive the middle band signal from the second antenna 420 and may transmit the middle band signal to the second antenna 420.

According to an embodiment, the second switch 480 may define a connection of the second antenna 420 with the MB transmitter/receiver circuit 441 and the HB receiver circuit 462. The second switch 480 480 may connect, for example, the second antenna 420 and the MB transmitter/receiver circuit 441, and may connect the second antenna 420 and the HB receiver circuit 462.

According to an embodiment, the MB receiver circuit 461, the HB transmitter/receiver circuit 442, the LB transmitter/receiver circuit 450, the MB transmitter/receiver circuit 441, and the HB receiver circuit 462 may be implemented in a first communication circuit included in the main part 400. For another example, the LB receiver circuit 530, the MB receiver circuit 541, and the HB receiver circuit 542 may be implemented in a second communication circuit included in the diversity part 500. A communication circuit may receive the high band signal or the middle band signal at the same time through a plurality of antennas included in the electronic device. For example, in the case where the middle band signal (or the high band signal) is received by the first antenna 410, the first switch 470 may allow the signal received by the first antenna 410 to be transmitted to the MB receiver circuit 461 (or the HB transmitter/receiver circuit 442). In the case where the middle band signal (or the high band signal) is received by the second antenna 420, the signal distributer 430 and the second switch 480 may allow the signal received by the second antenna 420 to be transmitted to the MB transmitter/receiver circuit 441 (or the HB receiver circuit 462). In the case where the middle band signal (or the high band signal) is received by the third antenna 510, the signal distributer 520 and the third switch 550 may allow the signal received by the third antenna 510 to be transmitted to the MB receiver circuit 541 (or the HB receiver circuit 542). In the case where the MB receiver circuit 461 (or the HB transmitter/receiver circuit 442) is connected with the first antenna 410, the MB transmitter/receiver circuit 441 (or the HB receiver circuit 462) is connected with the second antenna 420, and the MB receiver circuit 541 (or the HB receiver circuit 542) is connected with the third antenna 510, the communication circuit may be configured to simultaneously receive the middle band signals (or the high band signals) from the first antenna 410, the second antenna 420, and the third antenna 510.

Figure 7:
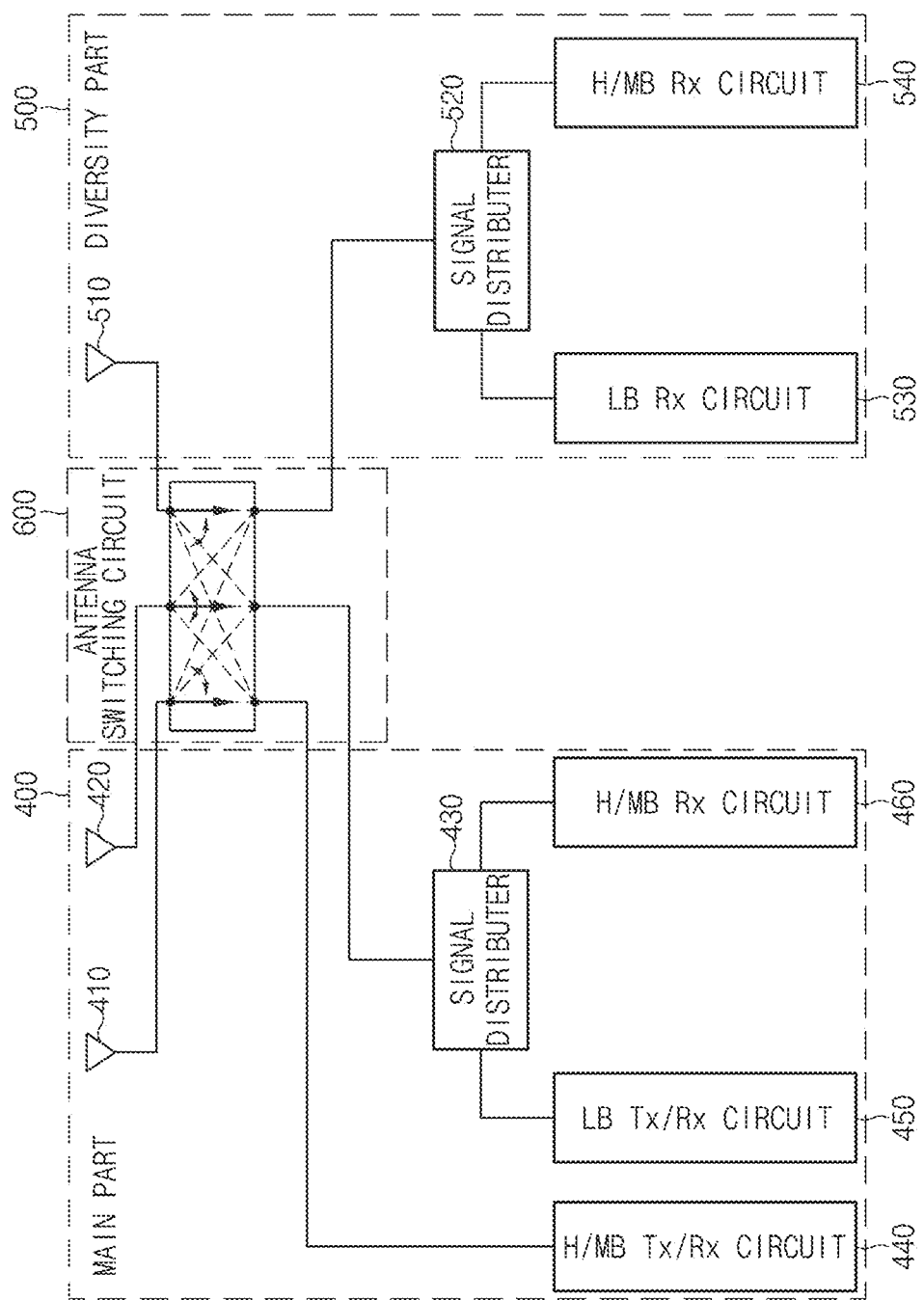
FIG. 7 is a block diagram illustrating a configuration of an antenna and an RF circuit included in an electronic device according to an embodiment.

FIG. 7 is a block diagram illustrating a configuration of an antenna and an RF circuit included in an electronic device according to an embodiment.

Referring to FIG. 7, an electronic device may include the main part 400, the diversity part 500, and a switching circuit 600. For example, the main part 400 may include the first antenna 410, the second antenna 420, the signal distributer 430, the H/MB transmitter/receiver circuit 440, the LB transmitter/receiver circuit 450, and the H/MB receiver circuit 460, and the diversity part 500 may include the third antenna 510, the signal distributer 520, the LB receiver circuit 530, and the H/MB receiver circuit 540.

The electronic device according to an embodiment may receive the high band signal or the middle band signal at the same time through three antennas. For example, a signal received by the first antenna 410, the second antenna 420, and the third antenna 510 may be transmitted to the H/MB transmitter/receiver circuit 440, the signal distributer 430, or the signal distributer 520 through the switching circuit 600. The signal distributer 430 may transmit the transmitted signal to the H/MB receiver circuit 460, and the signal distributer 520 may transmit the transmitted signal to the H/MB receiver circuit 540.

According to an embodiment, the switching circuit 600 may define a connection of a communication circuit with the first antenna 410, the second antenna 420, and the third antenna 510. For example, the switching circuit 600 may electrically connect the first antenna 410 with the H/MB transmitter/receiver circuit 440, the signal distributer 430, or the signal distributer 520. For example, the switching circuit 600 may electrically connect the second antenna 420 with a component, which is not connected with the first antenna 410, from among the H/MB transmitter/receiver circuit 440, the signal distributer 430, or the signal distributer 520. For example, the switching circuit 600 may electrically connect the third antenna 510 with a component, which is not connected with the first antenna 410 and the second antenna 420, from among the H/MB transmitter/receiver circuit 440, the signal distributer 430, or the signal distributer 520. The operation of the switching circuit 600 may be controlled by, for example, a control circuit, a transceiver (e.g., the transceiver 1720 of FIG. 17A), or a communication processor (e.g., the communication processor 1730 of FIG. 17A).

According to an embodiment, the H/MB transmitter/receiver circuit 440, the LB transmitter/receiver circuit 450, and the H/MB receiver circuit 460 may be implemented in a first communication circuit included in the main part 400. For another example, the LB receiver circuit 530 and the H/MB receiver circuit 540 may be implemented in a second communication circuit included in the diversity part 500. A communication circuit may receive the high band signal and/or the middle band signal at the same time through a plurality of antennas included in the electronic device. For example, in the case where the high band signal and/or the middle band signal is received by the first antenna 410, the second antenna 420, and the third antenna 510, the switching circuit 600, the signal distributer 430, and the signal distributer 520 may allow the signal received by the first antenna 410, the second antenna 420, and the third antenna 510 to be transmitted to the H/MB transmitter/receiver circuit 440, the H/MB receiver circuit 460, and the H/MB receiver circuit 540. In the case where the first antenna 410, the second antenna 420, and the third antenna 510 are respectively connected with the H/MB transmitter/receiver circuit 440, the H/MB receiver circuit 460, and the H/MB receiver circuit 540, the communication circuit may be configured to simultaneously receive at least a part of the high band signal and/or the middle band signal received by the first antenna 410, the second antenna 420, and the third antenna 510 by using the H/MB transmitter/receiver circuit 440, the H/MB receiver circuit 460, and the H/MB receiver circuit 540.

Figure 8B:
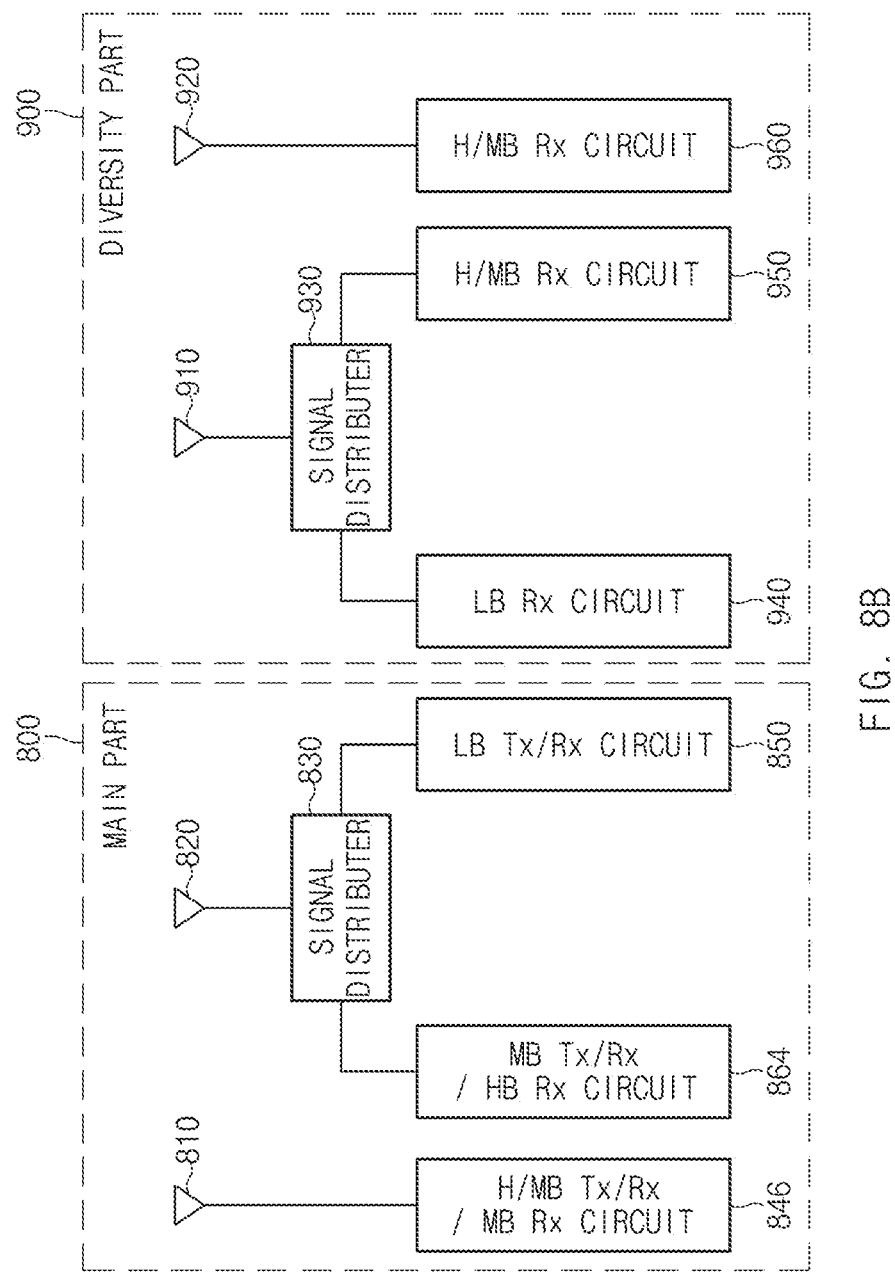

FIGS. 8A and 8B are block diagrams illustrating a configuration of an antenna and an RF circuit included in an electronic device according to an embodiment.

Referring to FIG. 8A, an electronic device may include a main part 800 which includes a first antenna 810, a second antenna 820, a signal distributer 830, an H/MB transmitter/receiver circuit 840, an LB transmitter/receiver circuit 850, and an H/MB receiver circuit 860, and a diversity part 900 which includes a third antenna 910, a fourth antenna 920, a signal distributer 930, an LB receiver circuit 940, an H/MB receiver circuit 950, and an H/MB receiver circuit 960.

The electronic device according to an embodiment may receive the high band signal or the middle band signal at the same time through four antennas. For example, a signal received by the first antenna 810 may be transmitted to the H/MB transmitter/receiver circuit 840. A signal received by the second antenna 820 may be transmitted to the LB transmitter/receiver circuit 850 or the H/MB receiver circuit 860 through the signal distributer 830 depending on a band of the signal. A signal received by the third antenna 910 may be transmitted to the LB receiver circuit 940 or the H/MB receiver circuit 950 through the signal distributer 930 depending on a band of the signal. A signal received by the fourth antenna 920 may be transmitted to the H/MB receiver circuit 960.

According to an embodiment, the main part 800 may be configured to receive or transmit a signal from or to the outside through the first antenna 810 and the second antenna 820. The first antenna 810, the second antenna 820, the signal distributer 430, the H/MB transmitter/receiver circuit 840, the LB transmitter/receiver circuit 850, and the H/MB receiver circuit 860 included in the main part 800 may be the same as the first antenna 410, the second antenna 420, the signal distributer 430, the H/MB transmitter/receiver circuit 440, the LB transmitter/receiver circuit 450, and the H/MB receiver circuit 460 illustrated in FIG. 4.

According to an embodiment, the H/MB transmitter/receiver circuit 840 may be electrically connected with the first antenna 810 through a first electrical path. The first electrical path may be configured to transmit the high band signal and the middle band signal. The first electrical path may be connected with a first port of a first communication circuit which transmits/receives the high band signal and the middle band signal. The first port may be electrically connected with, for example, the H/MB transmitter/receiver circuit 840.

According to an embodiment, the LB transmitter/receiver circuit 850 or the H/MB receiver circuit 860 may be electrically connected with the second antenna 820 through a second electrical path. The second electrical path may be configured to transmit the high band signal, the middle band signal, and the low band signal. The second electrical path may simultaneously or selectively transmit the high band signal, the middle band signal, and the low band signal. The second electrical path may be changed by the signal distributer 830. For example, depending on an operation of the signal distributer 830, the second antenna 820 may be electrically connected with the LB transmitter/receiver circuit 850 through the second electrical path or may be connected with the H/MB receiver circuit 860 through the second electrical path. The second electrical path may be connected with a second port of the first communication circuit which transmits/receives the low band signal. The second port may be electrically connected with, for example, the LB transmitter/receiver circuit 850.

According to an embodiment, the diversity part 900 may be configured to receive a signal from the outside through the third antenna 910 and the fourth antenna 920. The third antenna 910, the signal distributer 930, the LB receiver circuit 940, and the H/MB receiver circuit 950 included in the diversity part 900 may be the same as the third antenna 510, the signal distributer 520, the LB receiver circuit 530, and the H/MB receiver circuit 540 illustrated in FIG. 4.

According to an embodiment, the fourth antenna 920 may receive a signal from the outside. The fourth antenna 920 may receive, for example, the high band signal or the middle band signal. The fourth antenna 920 may be electrically connected with the H/MB receiver circuit 960. The fourth antenna 920 may transmit the high band signal or the middle band signal received from the outside to the H/MB receiver circuit 960. The fourth antenna 920 may be positioned adjacent to the third antenna 910. For another example, a distance between the fourth antenna 920 and the first antenna 810 and a distance between the fourth antenna 920 and the second antenna 820 may be longer than a distance between the first antenna 810 and the second antenna 820. For example, the third antenna 910 and the fourth antenna 920 may be positioned at an upper end of the electronic device, and the first antenna 810 and the second antenna 820 may be positioned at a lower end of the electronic device.

According to an embodiment, the H/MB receiver circuit 960 may be electrically connected with the fourth antenna 920. The H/MB receiver circuit 960 may receive the high band signal or the middle band signal from the fourth antenna 920.

According to an embodiment, the LB receiver circuit 940 or the H/MB receiver circuit 950 may be electrically connected with the third antenna 910 through a third electrical path. The third electrical path may be configured to transmit the high band signal, the middle band signal, and the low band signal. The third electrical path may simultaneously or selectively transmit the high band signal, the middle band signal, and the low band signal. The third electrical path may be changed by the signal distributer 930. For example, depending on an operation of the signal distributer 930, the third antenna 910 may be electrically connected with the LB receiver circuit 940 through the third electrical path or may be connected with the H/MB receiver circuit 950 through the third electrical path. The third electrical path may be connected with a second port of a second communication circuit. The second port may be connected with, for example, the LB receiver circuit 940. According to an embodiment, the H/MB receiver circuit 960 may be electrically connected with the fourth antenna 920 through a fourth electrical path. The fourth electrical path may be configured to transmit the high band signal and the middle band signal. The fourth electrical path may be connected with a first port of the second communication circuit which receives the high band signal and the middle band signal. The first port may be connected with, for example, the H/MB receiver circuit 960.

According to an embodiment, the electronic device may include four circuits (the H/MB transmitter/receiver circuit 840, the H/MB receiver circuit 860, the H/MB receiver circuit 950, and the H/MB receiver circuit 960) which are simultaneously connected with two antennas of the main part 800 and two antennas of the diversity part 900, that is, four respective antennas (e.g., the first antenna 810, the second antenna 820, the third antenna 910, and the fourth antenna 920) and may receive the high band signal or the middle band signal at the same time.

According to an embodiment, the H/MB transmitter/receiver circuit 840, the LB transmitter/receiver circuit 850, and the H/MB receiver circuit 860 may be implemented in the first communication circuit included in the main part 800. For another example, the LB receiver circuit 940, the H/MB receiver circuit 950, and the H/MB receiver circuit 960 may be implemented in the second communication circuit included in the diversity part 900. The first communication circuit and the second communication circuit may be configured to simultaneously receive the high band signal and/or the middle band signal from four antennas (the first antenna 810, the second antenna 820, the third antenna 910, and the fourth antenna 920) by using four receiver circuits (the H/MB transmitter/receiver circuit 840, the H/MB receiver circuit 860, the H/MB receiver circuit 950, and the H/MB receiver circuit 960). For example, in the case where the high band signal and/or the middle band signal is received by the second antenna 820, the signal distributer 830 may allow the signal received by the second antenna 820 to be transmitted to the H/MB receiver circuit 860. In the case where the high band signal and/or the middle band signal is received by the third antenna 910, the signal distributer 930 may allow the signal received by the third antenna 910 to be transmitted to the H/MB receiver circuit 950. Also, the first communication circuit and the second communication circuit may be implemented with one integrated module depending on the implementation of the present disclosure.

Referring to FIG. 8B, an electronic device may include the main part 800 which includes the first antenna 810, the second antenna 820, the signal distributer 830, an HB transmitter/receiver/MB receiver circuit 846, the LB transmitter/receiver circuit 850, and an MB transmitter/receiver/HB receiver circuit 864, and the diversity part 900 which includes the third antenna 910, the fourth antenna 920, the signal distributer 930, the LB receiver circuit 940, the H/MB receiver circuit 950, and the H/MB receiver circuit 960.

The electronic device according to an embodiment may receive the high band signal or the middle band signal at the same time through four antennas. For example, a signal received by the first antenna 810 may be transmitted to the HB transmitter/receiver/MB receiver circuit 846. A signal received by the second antenna 820 may be transmitted to the LB transmitter/receiver circuit 850 or the MB transmitter/receiver/HB receiver circuit 864 through the signal distributer 830 depending on a band of the signal. A signal received by the third antenna 910 may be transmitted to the LB receiver circuit 940 or the H/MB receiver circuit 950 through the signal distributer 930 depending on a band of the signal. A signal received by the fourth antenna 920 may be transmitted to the H/MB receiver circuit 960.

According to an embodiment, the electronic device may include the HB transmitter/receiver/MB receiver circuit 846 in which an HB transmitter/receiver circuit and an MB receiver circuit are combined. The HB transmitter/receiver/MB receiver circuit 846 may be electrically connected with the first antenna 810. The HB transmitter/receiver/MB receiver circuit 846 may transmit the high band signal to the first antenna 810, and may receive the high band signal and the middle band signal from the first antenna 810. The HB transmitter/receiver circuit or the MB receiver circuit included in the HB transmitter/receiver/MB receiver circuit 846 may be selectively or simultaneously connected with the first antenna 810.

According to an embodiment, the electronic device may include the MB transmitter/receiver/HB receiver circuit 864 in which an MB transmitter/receiver circuit and an HB receiver circuit are combined. The MB transmitter/receiver/HB receiver circuit 864 may be electrically connected with the second antenna 820 through the signal distributer 830. The MB transmitter/receiver/HB receiver circuit 864 may transmit the middle band signal to the second antenna 820, and may receive the high band signal and the middle band signal from the second antenna 820. The MB transmitter/receiver circuit or the HB receiver circuit included in the MB transmitter/receiver/HB receiver circuit 864 may be selectively or simultaneously connected with the second antenna 820.

According to an embodiment, the electronic device may include a module in which two or more circuits such as the H/MB transmitter/receiver circuit 840, the H/MB receiver circuit 860, the HB transmitter/receiver/MB receiver circuit 846, the MB transmitter/receiver/HB receiver circuit 864, or the like are combined. FIGS. 8A and 8B show the H/MB transmitter/receiver circuit 840, the H/MB receiver circuit 860, the HB transmitter/receiver/MB receiver circuit 846, and the MB transmitter/receiver/HB receiver circuit 864, but the electronic device may include various types of modules in which two or more circuits such as an HB transmitter/receiver circuit, an MB transmitter/receiver circuit, an LB transmitter/receiver circuit, an HB receiver circuit, an MB receiver circuit, or an LB receiver circuit are combined.

Figure 9:
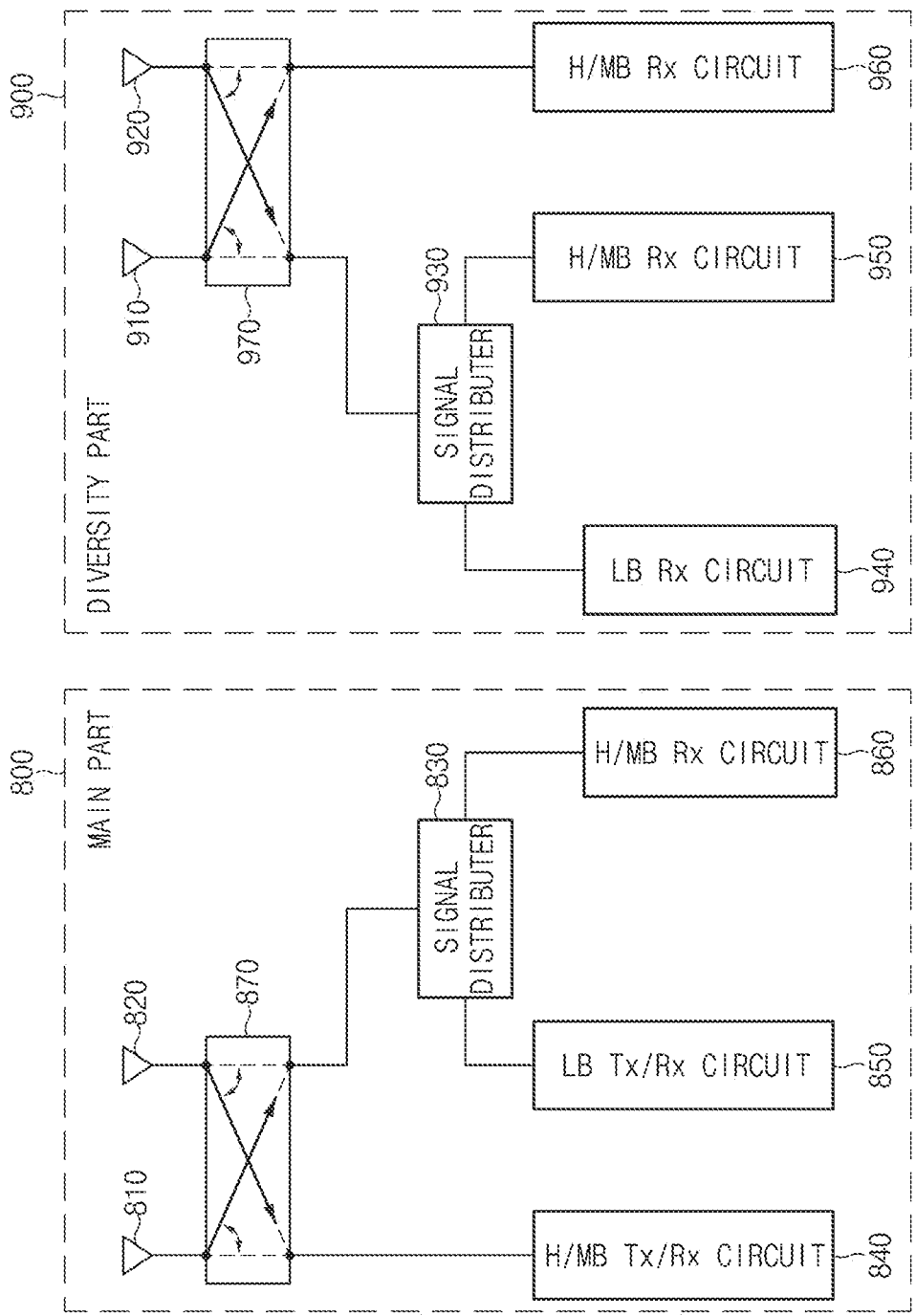
FIG. 9 is a block diagram illustrating a configuration of an antenna and an RF circuit included in an electronic device according to an embodiment.

FIG. 9 is a block diagram illustrating a configuration of an antenna and an RF circuit included in an electronic device according to an embodiment.

Referring to FIG. 9, an electronic device may include the main part 800 which includes the first antenna 810, the second antenna 820, the signal distributer 830, the H/MB transmitter/receiver circuit 840, the LB transmitter/receiver circuit 850, the H/MB receiver circuit 860, and a switching circuit 870, and the diversity part 900 which includes the third antenna 910, the fourth antenna 920, the signal distributer 930, the LB receiver circuit 940, the H/MB receiver circuit 950, the H/MB receiver circuit 960, and a switching circuit 970.

The electronic device according to an embodiment may receive the high band signal or the middle band signal at the same time through four antennas. For example, a signal received by the first antenna 810 or the second antenna 820 may be transmitted to the H/MB transmitter/receiver circuit 840, the LB transmitter/receiver circuit 850, or the H/MB receiver circuit 860 through the switching circuit 870 and/or the signal distributer 830 depending on a band of the signal. For example, a signal received by the third antenna 910 or the fourth antenna 920 may be transmitted to the LB receiver circuit 940, the H/MB receiver circuit 950, or the H/MB receiver circuit 960 through the switching circuit 970 and/or the signal distributer 930 depending on a band of the signal.

According to an embodiment, the switching circuit 870 of the main part 800 may define a connection of a first communication circuit with the first antenna 810 and the second antenna 820. The switching circuit 870 may be electrically connected with the first antenna 810, the second antenna 820, the signal distributer 830, and the H/MB transmitter/receiver circuit 840. The switching circuit 870 may connect, for example, the first antenna 810 and the H/MB transmitter/receiver circuit 840, and may connect the first antenna 810 and the signal distributer 830. For another example, the switching circuit 870 may connect a component, which is not connected with the first antenna 810, from among the H/MB transmitter/receiver circuit 840 and the signal distributer 830 with the second antenna 820.

According to an embodiment, the first antenna 810 may be electrically connected with a first communication circuit through a first electrical path. The first electrical path may be connected with a first port of the first communication circuit which transmits/receives the high band signal and the middle band signal and a second port of the first communication circuit which transmits/receives the low band signal. The first electrical path may be changed by the switching circuit 870 or the signal distributer 830.

According to an embodiment, the second antenna 820 may be electrically connected with the first communication circuit through a second electrical path. The second electrical path may be connected with the first port of the first communication circuit which transmits/receives the high band signal and the middle band signal and the second port of the first communication circuit which transmits/receives the low band signal. The second electrical path may be changed by the switching circuit 870 or the signal distributer 830.

According to an embodiment, the switching circuit 970 of the diversity part 900 may define a connection of a second communication circuit with the third antenna 910 and the fourth antenna 920. The switching circuit 970 may be electrically connected with the third antenna 910, the fourth antenna 920, the signal distributer 930, and the H/MB receiver circuit 960. The switching circuit 970 may connect, for example, the third antenna 910 and the H/MB receiver circuit 960, and may connect the third antenna 910 and the signal distributer 930. For another example, the switching circuit 970 may connect a component, which is not connected with the third antenna 910, from among the H/MB receiver circuit 960 and the signal distributer 930 with the fourth antenna 920.

According to an embodiment, the third antenna 910 may be electrically connected with the second communication circuit through a third electrical path. The third electrical path may be connected with a first port of the second communication circuit which transmits/receives the high band signal and the middle band signal and a second port of the second communication circuit which transmits/receives the low band signal. The third electrical path may be changed by the switching circuit 970 or the signal distributer 930.

According to an embodiment, the fourth antenna 920 may be electrically connected with the second communication circuit through a fourth electrical path. The fourth electrical path may be connected with the first port of the second communication circuit which transmits/receives the high band signal and the middle band signal and the second port of the second communication circuit which transmits/receives the low band signal. The fourth electrical path may be changed by the switching circuit 970 or the signal distributer 930.

According to an embodiment, the first antenna 810 and the second antenna 820 may be connected with one of the H/MB transmitter/receiver circuit 840, the LB transmitter/receiver circuit 850, and the H/MB receiver circuit 860 included in the first communication circuit by the switching circuit 870. The third antenna 910 and the fourth antenna 920 may be connected with one of the LB receiver circuit 940, the H/MB receiver circuit 950, and the H/MB receiver circuit 960 included in the second communication circuit by the switching circuit 970. In the case where the high band signal and/or the middle band signal is received by the first antenna 810, the second antenna 820, the third antenna 910, and the fourth antenna 920, the switching circuit 870 and the signal distributer 830 may allow the signal received by the first antenna 810 and the second antenna 820 to be transmitted to the H/MB transmitter/receiver circuit 840 and the H/MB receiver circuit 860, and the switching circuit 970 and the signal distributer 930 may allow the signal received by the third antenna 910 and the fourth antenna 920 to be transmitted to the H/MB receiver circuit 950 and the H/MB receiver circuit 960.

Figure 10:
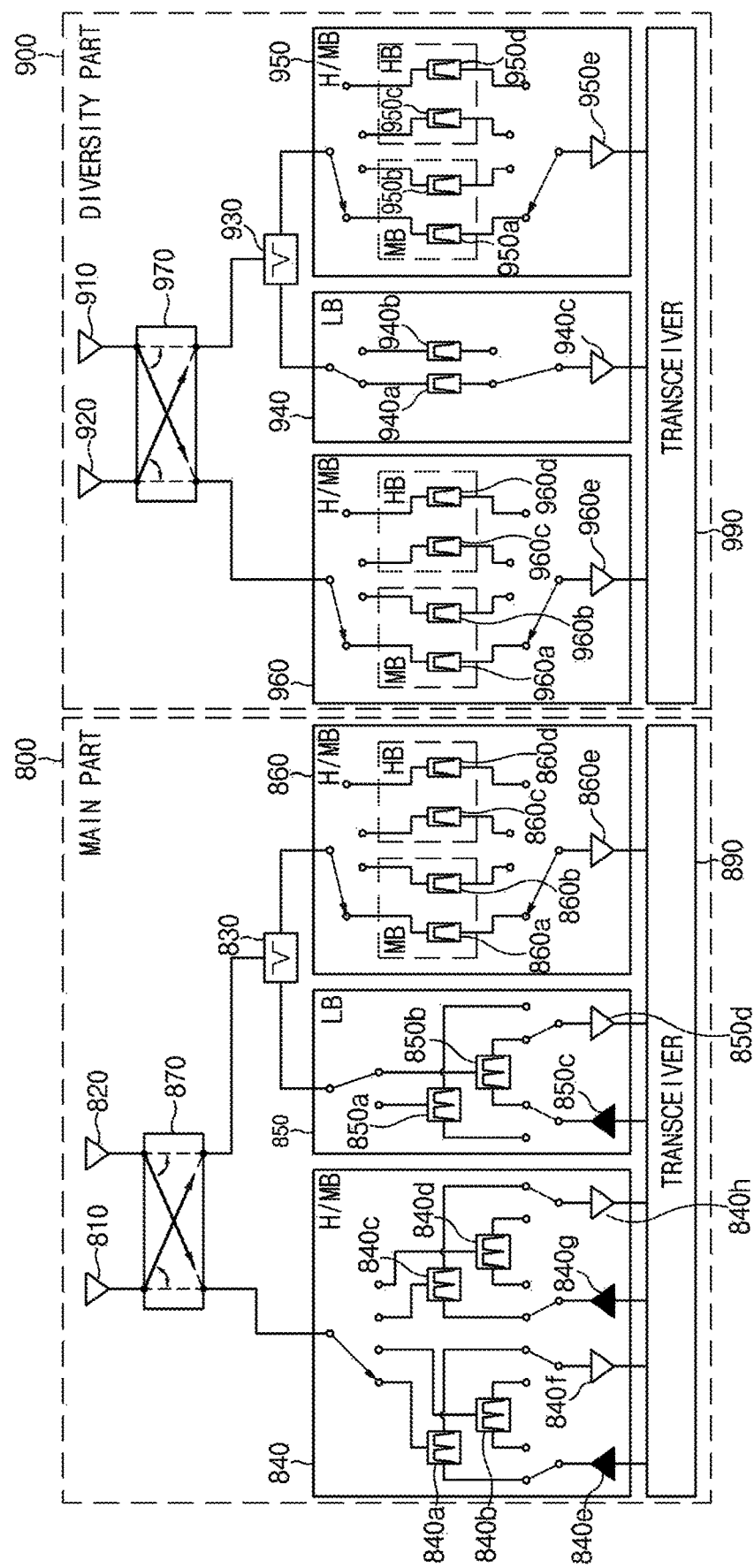
FIG. 10 is a block diagram illustrating a configuration of an antenna and an RF circuit included in an electronic device according to an embodiment.

FIG. 10 is a block diagram illustrating a configuration of an antenna and an RF circuit included in an electronic device according to an embodiment.

Referring to FIG. 10, an electronic device may further include a transceiver 890 of the main part 800 and a transceiver 990 of the diversity part 900.

According to an embodiment, the signal distributer 830 may be implemented with a diplexer. The signal distributer 830 may filter a received signal for each frequency band and may transmit the low band signal to the LB transmitter/receiver circuit 850 and the high band signal and the middle band signal to the H/MB receiver circuit 860.

According to an embodiment, the signal distributer 930 may be implemented with a diplexer. The signal distributer 930 may filter a received signal for each frequency band and may transmit the low band signal to the LB receiver circuit 940 and the high band signal and the middle band signal to the H/MB receiver circuit 950.

According to an embodiment, the H/MB transmitter/receiver circuit 840 may include four duplexers 840*a*, 840*b*, 840*c*, and 840*d*, two power amplifiers 840*e* and 840*g*, and two low noise amplifiers (LNAs) 840*f* and 840*h*. A transmit signal received from the transceiver 890 may be transmitted to the first antenna 810 or the second antenna 820 through the duplexer 840*a*, 840*b*, 840*c*, or 840*d* after being amplified by the power amplifier 840*e* or 840*g*. A receive signal received from the first antenna 810 or the second antenna 820 may be transmitted to the transceiver 890 after being amplified by the LNA 840*f* or 840*h* through the duplexer 840*a*, 840*b*, 840*c*, or 840*d*.

According to an embodiment, the LB transmitter/receiver circuit 850 may include two duplexers 850*a* and 850*b*, a power amplifier 850*c*, and an LNA 850*d*. A transmit signal received from the transceiver 890 may be transmitted to the first antenna 810 or the second antenna 820 through the duplexer 850*a* or 850*b* after being amplified by the power amplifier 850*c*. A receive signal received from the first antenna 810 or the second antenna 820 may be transmitted to the transceiver 890 after passing through the duplexer 850*a* or 850*b* and being amplified by the LNA 850*d*. The duplexer 840*a*, 840*b*, 840*c*, or 840*d* through which a signal passes may be selected by a switch.

According to an embodiment, the H/MB receiver circuit 860 may include four band pass filters (hereinafter referred to as a "BPF) 860*a*, 860*b*, 860*c*, and 860*d* and an LNA 860*e*. A receive signal received from the first antenna 810 or the second antenna 820 may be transmitted to the transceiver 890 after passing through the BPF 860*a*, 860*b*, 860*c*, or 860*d* and being amplified by the LNA 860*e*. The BPF 860*a*, 860*b*, 860*c*, or 860*d* through which a signal passes may be selected by a switch.

According to an embodiment, the transceiver 890 of the main part 800 may convert a receive signal transmitted from the LNA 840*f*, 840*h*, 850*d*, or 860*e* to a baseband signal. The transceiver 890 may transmit the baseband signal to a communication processor (e.g., the communication processor 1730 of FIG. 17A). The transceiver 890 may receive the baseband signal from the communication processor. The transceiver 890 may convert the baseband signal to an RF band signal to generate a transmit signal and may transmit the transmit signal to the power amplifier 840*e*, 840*g*, or 850*c*.

According to an embodiment, the H/MB receiver circuit 960 may include four band pass filters (hereinafter referred to as a "BPF) 960*a*, 960*b*, 960*c*, and 960*d* and an LNA 960*e*. A receive signal received from the third antenna 910 or the fourth antenna 920 may be transmitted to the transceiver 990 after passing through the BPF 960a, 960b, 960c, or 960d and being amplified by the LNA 960e. The BPF 960a, 960b, 960c, or 960d through which a signal passes may be selected by a switch.

According to an embodiment, the LB receiver circuit 940 may include two band pass filters (hereinafter referred to as a "BPF) 940a and 940b and an LNA 940c. A receive signal received from an antenna, which supports the low band signal, from among the third antenna 910 or the fourth antenna 920 may be transmitted to the transceiver 990 after being amplified by the LNA 940c through the BPF 940a or 940b. The BPF 940a or 940b through which a signal passes may be selected by a switch.

According to an embodiment, the H/MB receiver circuit 950 may include four band pass filters (hereinafter referred to as a "BPF) 950a, 950b, 950c, and 950d and an LNA 950e. A receive signal received from the third antenna 910 or the fourth antenna 920 may be transmitted to the transceiver 990 after passing through the BPF 950a, 950b, 950c, or 950d and being amplified by the LNA 950e. The BPF 950a, 950b, 950c, or 950d through which a signal passes may be selected by a switch.

According to an embodiment, the transceiver 990 of the diversity part 900 may convert a receive signal transmitted from the LNA 940c, 950e, or 960e to a baseband signal. The transceiver 990 may transmit the baseband signal to a communication processor (e.g., the communication processor 1730 of FIG. 17A).

Figure 11:
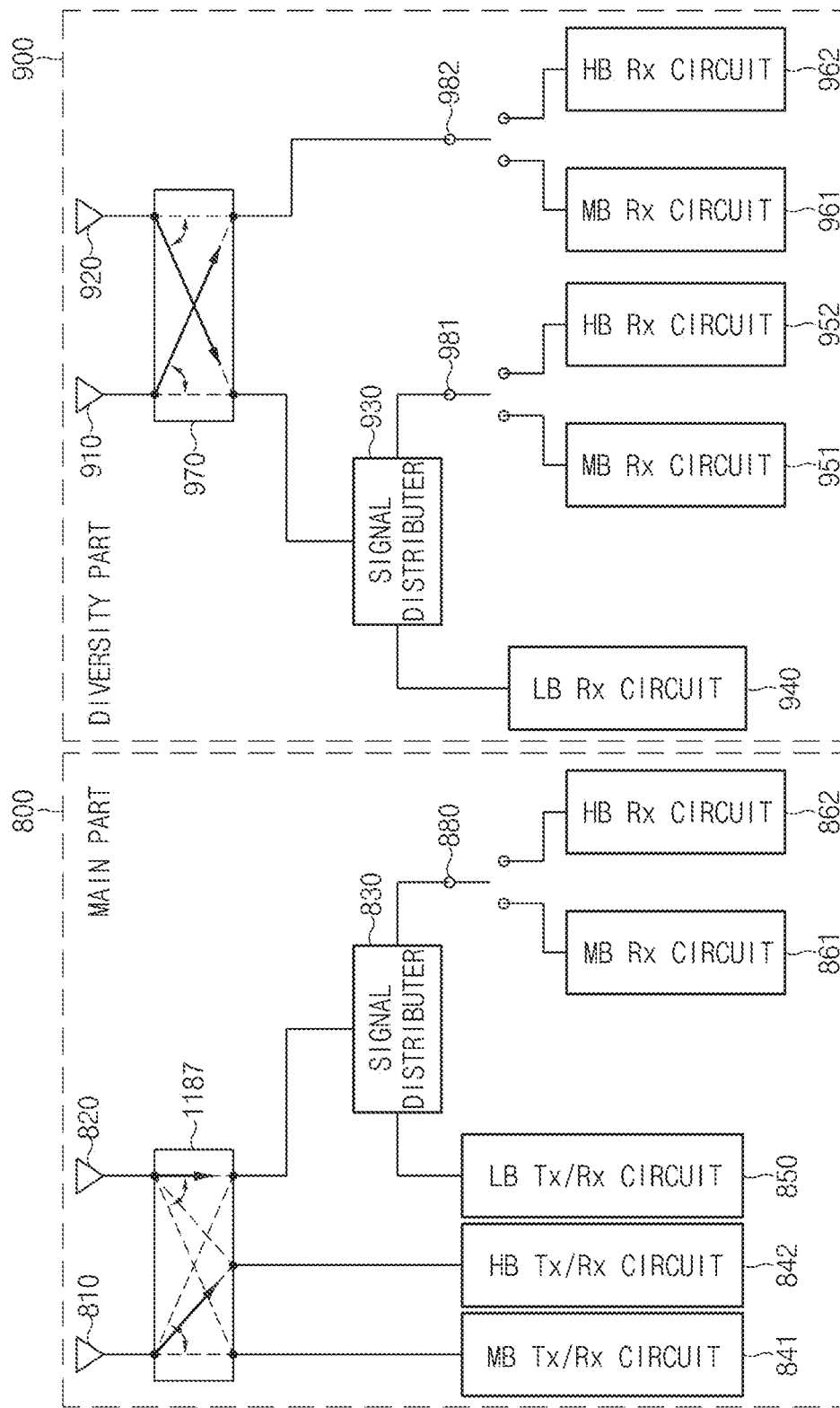
FIG. 11 is a block diagram illustrating a configuration of an antenna and an RF circuit included in an electronic device according to an embodiment.

FIG. 11 is a block diagram illustrating a configuration of an antenna and an RF circuit included in an electronic device according to an embodiment.

The electronic device according to an embodiment may receive the high band signal or the middle band signal at the same time through four antennas. For example, a signal received by the first antenna 810 or the second antenna 820 may be transmitted to one of circuits included in the main part 800 through the switching circuit 1187 and/or the signal distributer 830 depending on a band of the signal. At the same time, a signal received by the third antenna 910 or the fourth antenna 920 may be transmitted to one of circuits included in the diversity part 900 through the switching circuit 970 and/or the signal distributer 930 depending on a band of the signal.

Referring to FIG. 11, the main part 800 according to an embodiment may include an MB transmitter/receiver circuit 841, an HB transmitter/receiver circuit 842, an LB transmitter/receiver circuit 850, an MB receiver circuit 861, an HB receiver circuit 862, a switching circuit 1187, and a first switch 880.

According to an embodiment, the MB transmitter/receiver circuit 841, the HB transmitter/receiver circuit 842, the MB receiver circuit 861, the HB receiver circuit 862, the switching circuit 1187, and the first switch 880 of the main part 400 may be the same as the MB transmitter/receiver circuit 141, the HB transmitter/receiver circuit 142, the MB receiver circuit 161, the HB receiver circuit 162, the switching circuit 170, and the switch 180 of FIG. 2.

According to an embodiment, the diversity part 900 may include an LB receiver circuit 940, an MB receiver circuit 951, an HB receiver circuit 952, an MB receiver circuit 961, an HB receiver circuit 962, a second switch 981, and a third switch 982.

According to an embodiment, the MB receiver circuit 951 may be electrically connected with the signal distributer 930 through the second switch 981. The MB receiver circuit 951 may receive the middle band signal from the third antenna 910 or the fourth antenna 920.

According to an embodiment, the HB receiver circuit 952 may be electrically connected with the signal distributer 930 through the second switch 981. The HB receiver circuit 952 may receive the high band signal from the third antenna 910 or the fourth antenna 920.

According to an embodiment, the second switch 981 may define a connection of the signal distributer 930 with the MB receiver circuit 951 or the HB receiver circuit 952. The second switch 981 may connect, for example, the signal distributer 930 and the MB receiver circuit 951, and may connect the signal distributer 930 and the HB receiver circuit 952. The operation of the second switch 981 may be controlled by, for example, a control circuit, a transceiver (e.g., the transceiver 1720 of FIG. 17A), or a communication processor (e.g., the communication processor 1730 of FIG. 17A).

According to an embodiment, the MB receiver circuit 961 may be electrically connected with the third antenna 910 or the fourth antenna 920 through the third switch 982. The MB receiver circuit 961 may receive the middle band signal from the third antenna 910 or the fourth antenna 920.

According to an embodiment, the HB receiver circuit 962 may be electrically connected with the third antenna 910 or the fourth antenna 920 through the third switch 982. The HB receiver circuit 962 may receive the high band signal from the third antenna 910 or the fourth antenna 920.

According to an embodiment, the third switch 982 may define a connection of the third antenna 910 or the fourth antenna 920 with the MB receiver circuit 961 or the HB receiver circuit 962. The third switch 982 may connect, for example, the third antenna 910 or the fourth antenna 920 with the MB receiver circuit 961, and may connect the third antenna 910 or the fourth antenna 920 with the HB receiver circuit 962. The operation of the third switch 982 may be controlled by, for example, a control circuit, a transceiver (e.g., the transceiver 1720 of FIG. 17A), or a communication processor (e.g., the communication processor 1730 of FIG. 17A).

According to an embodiment, the electronic device may include four circuits (the HB transmitter/receiver circuit 842, the HB receiver circuit 862, the HB receiver circuit 952, and the HB receiver circuit 962) which are simultaneously connected with four respective antennas (e.g., the first antenna 810, the second antenna 820, the third antenna 910, and the fourth antenna 920) and may receive the high band signal at the same time. For another example, the electronic device may include four circuits (the MB transmitter/receiver circuit 841, the MB receiver circuit 861, the MB receiver circuit 951, and the MB receiver circuit 961) which are simultaneously connected with four respective antennas (e.g., the first antenna 810, the second antenna 820, the third antenna 910, and the fourth antenna 920) and may receive the middle band signal at the same time.

According to an embodiment, the MB transmitter/receiver circuit 841, the HB transmitter/receiver circuit 842, the LB transmitter/receiver circuit 850, the MB receiver circuit 861, and the HB receiver circuit 862 may be implemented in a first communication circuit included in the main part 800. For another example, the LB receiver circuit 940, the MB receiver circuit 951, the HB receiver circuit 952, the MB receiver circuit 961, and the HB receiver circuit 962 may be implemented in a second communication circuit included in the diversity part 900. The first communication circuit and the second communication circuit may be configured to simultaneously receive the high band signal from four antennas (the first antenna 810, the second antenna 820, the third antenna 910, and the fourth antenna 920) by using four receiver circuits (the HB transmitter/receiver circuit 842, the HB receiver circuit 862, the HB receiver circuit 952, and the HB receiver circuit 962). For another example, the first communication circuit and the second communication circuit may be configured to simultaneously receive the middle band signal from four antennas (the first antenna 810, the second antenna 820, the third antenna 910, and the fourth antenna 920) by using four receiver circuits (the MB transmitter/receiver circuit 841, the MB receiver circuit 861, the MB receiver circuit 951, and the MB receiver circuit 961). For another example, the first communication circuit and the second communication circuit may be implemented with one integrated module depending on the implementation of the present disclosure.

Figure 12:
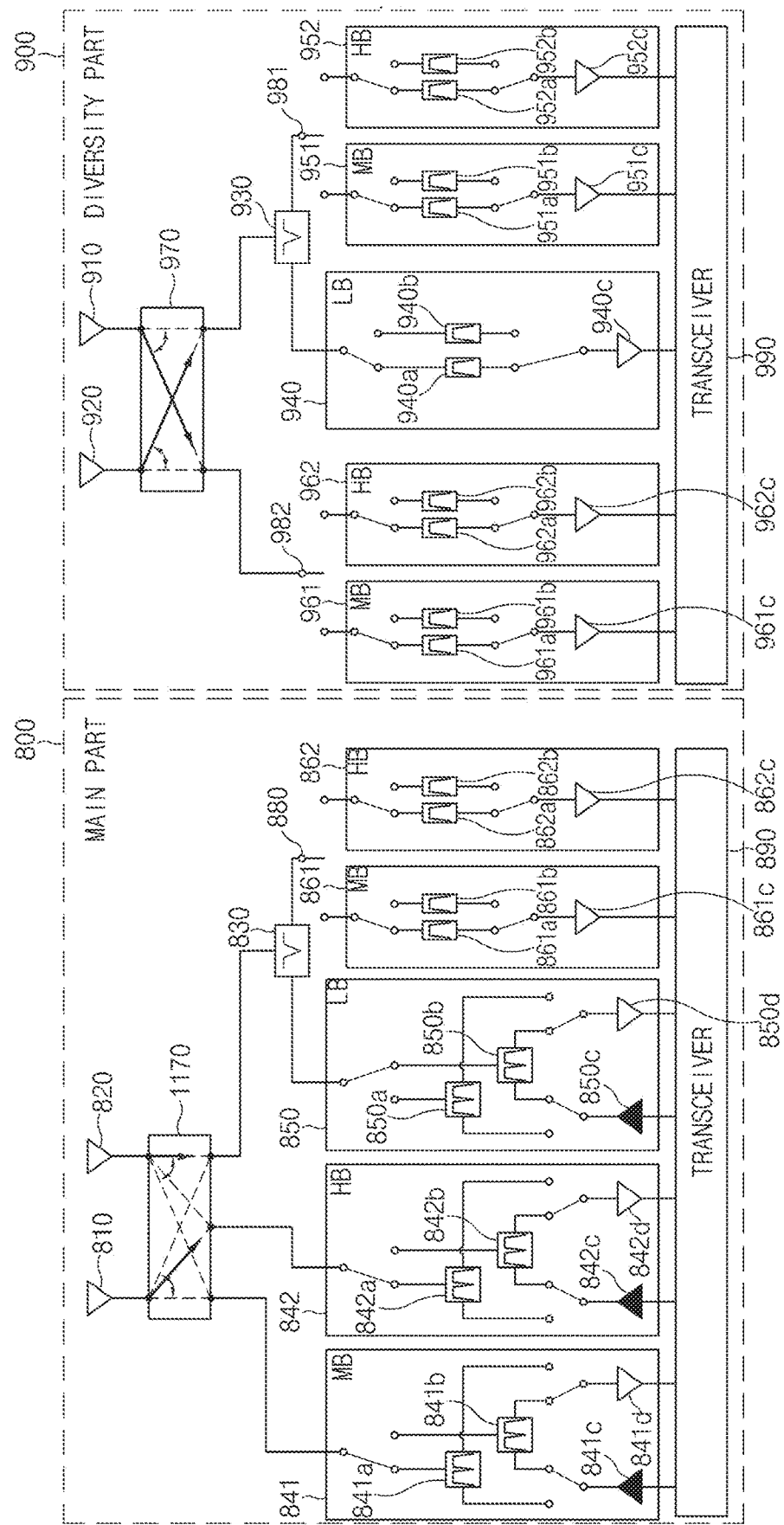
FIG. 12 is a block diagram illustrating a configuration of an antenna and an RF circuit included in an electronic device according to an embodiment.

FIG. 12 is a block diagram illustrating a configuration of an antenna and an RF circuit included in an electronic device according to an embodiment.

Referring to FIG. 12, the MB transmitter/receiver circuit 841 may include two duplexers 841a and 841b, a power amplifier 841c, and an LNA 841d. For example, the MB transmitter/receiver circuit 841 may operate in a manner which is the same as an operation manner of the LB transmitter/receiver circuit 850 described with reference to FIG. 10.

According to an embodiment, the MB receiver circuit 861 may include two BPFs 861a and 861b and an LNA 861c. The MB receiver circuit 861 may operate in a manner which is the same as an operation manner of the LB receiver circuit 940 described with reference to FIG. 10.

According to an embodiment, the HB transmitter/receiver circuit 842 may include two duplexers 842a and 842b, a power amplifier 842c, and an LNA 842d. The HB transmitter/receiver circuit 842 may operate in a manner which is the same as an operation manner of the LB transmitter/receiver circuit 850.

According to an embodiment, the MB receiver circuit 961 may include two BPFs 961a and 961b and an LNA 961c. The MB receiver circuit 961 may operate in a manner which is the same as an operation manner of the LB receiver circuit 940.

According to an embodiment, the HB receiver circuit 962 may include two BPFs 962a and 962b and an LNA 962c. The HB receiver circuit 962 may operate in a manner which is the same as an operation manner of the LB transmitter/receiver circuit 850.

According to an embodiment, the MB receiver circuit 951 may include two BPFs 951a and 951b and an LNA 951c. The MB receiver circuit 951 may operate in a manner which is the same as an operation manner of the LB receiver circuit 940.

According to an embodiment, the HB receiver circuit 952 may include two BPFs 952a and 952b and an LNA 952c. The HB receiver circuit 952 may operate in a manner which is the same as an operation manner of the LB transmitter/receiver circuit 850.

Figure 13:
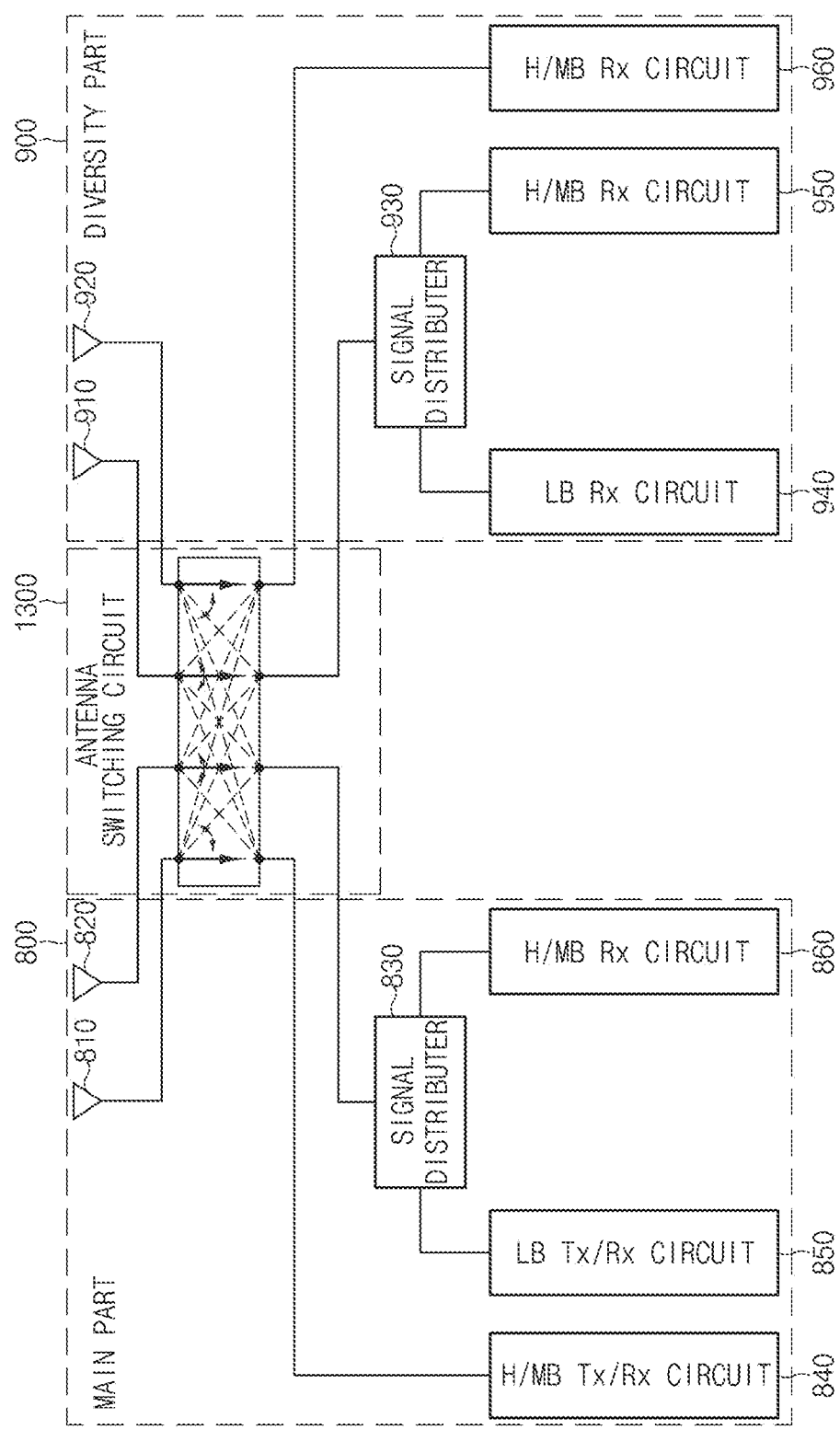
FIG. 13 is a block diagram illustrating a configuration of an antenna and an RF circuit included in an electronic device according to an embodiment.

FIG. 13 is a block diagram illustrating a configuration of an antenna and an RF circuit included in an electronic device according to an embodiment.

The electronic device according to an embodiment may receive the high band signal or the middle band signal at the same time through four antennas. For example, a signal received by the first antenna 810 or the second antenna 820 may be transmitted to one of circuits included in the main part 800 and the diversity part 900 through a switching circuit 1300 and the signal distributer 830 or 930 depending on a band of the signal. A signal received by the third antenna 910 or the fourth antenna 920 may be transmitted to one of circuits included in the main part 800 and the diversity part 900 through the switching circuit 1300 and the signal distributer 830 or 930 depending on a band of the signal.

According to an embodiment, the electronic device may further include the main part 800 which includes the first antenna 810, the second antenna 820, the signal distributer 830, the H/MB transmitter/receiver circuit 840, the LB transmitter/receiver circuit 850, and the H/MB receiver circuit 860, the diversity part 900 which includes the third antenna 910, the fourth antenna 920, the signal distributer 930, the LB receiver circuit 940, the H/MB receiver circuit 950, and the H/MB receiver circuit 960, and the switching circuit 1300. The switching circuit 1300 may define a connection of a communication circuit with the first antenna 810, the second antenna 820, the third antenna 910, and the fourth antenna 920. The switching circuit 1300 may electrically connect, for example, one of the first antenna 810, the second antenna 820, the third antenna 910, or the fourth antenna 920 with one of the H/MB transmitter/receiver circuit 840, the signal distributer 830, the signal distributer 930, or the H/MB receiver circuit 960. The switching circuit 1300 may allow the first antenna 810, the second antenna 820, the third antenna 910, and the fourth antenna 920 not to be connected with the same component. The operation of the switching circuit 1300 may be controlled by, for example, a control circuit, a transceiver (e.g., the transceiver 1720 of FIG. 17A), or a communication processor (e.g., the communication processor 1730 of FIG. 17A).

According to an embodiment, the first antenna 810 or the second antenna 820 may be connected with the second communication circuit of the diversity part 900 through the switching circuit 1300. For another example, the third antenna 910 or the fourth antenna 920 may be connected with the first communication circuit of the main part 800 through the switching circuit 1300.

Figure 14:
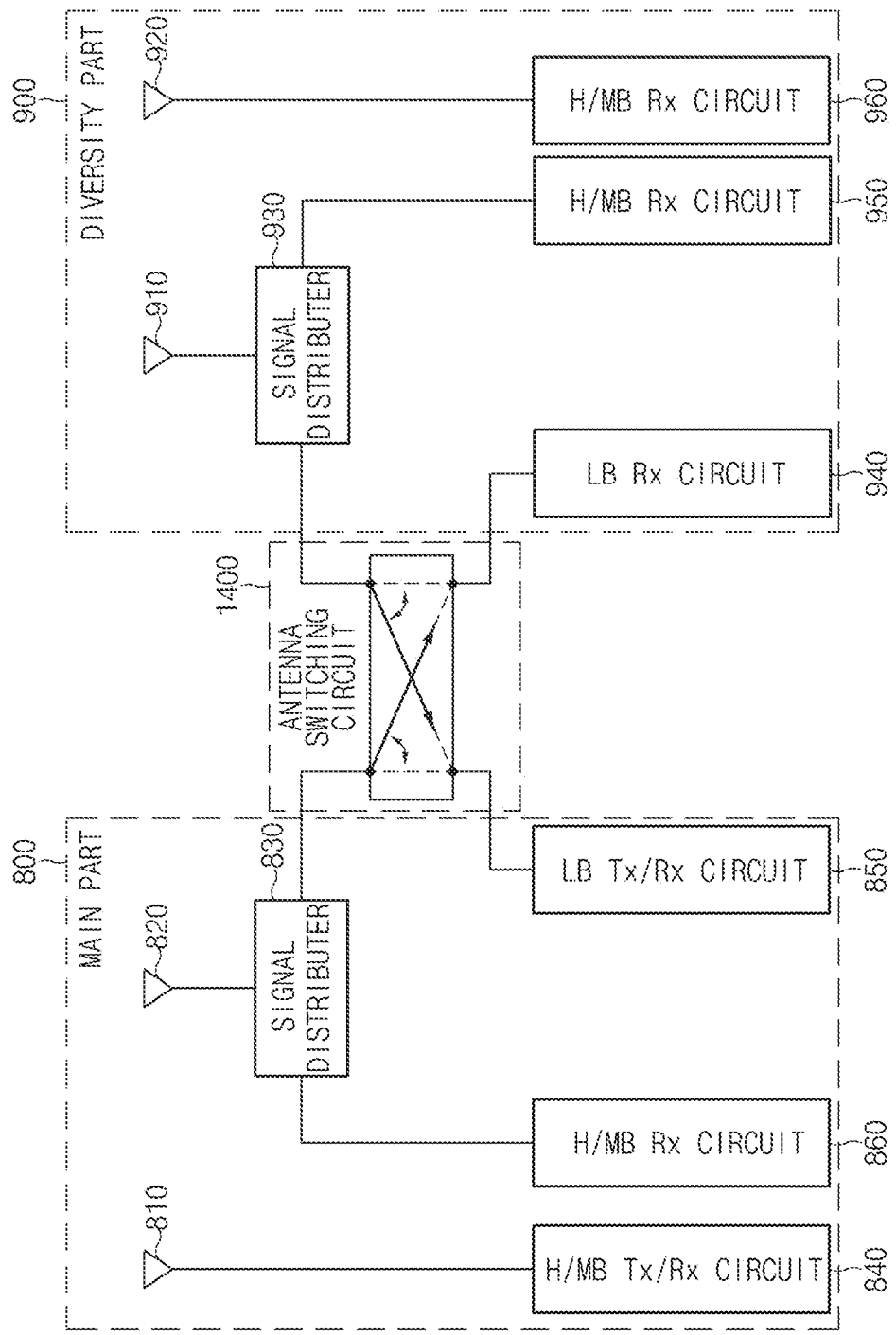
FIG. 14 is a block diagram illustrating a configuration of an antenna and an RF circuit included in an electronic device according to an embodiment.

FIG. 14 is a block diagram illustrating a configuration of an antenna and an RF circuit included in an electronic device according to an embodiment.

The electronic device according to an embodiment may receive the high band signal or the middle band signal at the same time through four antennas. For example, a signal received by the second antenna 820 may be transmitted to one of a circuit included in the main part 800 and a part of a circuit included in the diversity part 900 through a switching circuit 1400 and/or the signal distributer 830 depending on a band of the signal. At the same time, a signal received by the third antenna 910 may be transmitted to one of a part of a circuit included in the main part 800 and a circuit included in the diversity part 900 through the switching circuit 1300 and/or the signal distributer 930 depending on a band of the signal. Signals received by the first antenna 810 and the fourth antenna 920 may be respectively transmitted to the H/MB transmitter/receiver circuit 840 and the H/MB receiver circuit 960. According to an embodiment, the electronic device may further include the main part 800 which includes the first antenna 810, the second antenna 820, the signal distributer 830, the H/MB transmitter/receiver circuit 840, the LB transmitter/receiver circuit 850, and the H/MB receiver circuit 860, the diversity part 900 which includes the third antenna 910, the fourth antenna 920, the signal distributer 930, the LB receiver circuit 940, the H/MB receiver circuit 950, and the H/MB receiver circuit 960, and the switching circuit 1400. The switching circuit 1400 may define a connection of the signal distributer 830 and the signal distributer 930 with the LB transmitter/receiver circuit 850 and the LB receiver circuit 940. The switching circuit 1400 may electrically connect one of the signal distributer 830 or the signal distributer 930 with one of the LB transmitter/receiver circuit 850 or the LB receiver circuit 940. The switching circuit 1400 may allow the signal distributer 830 or the signal distributer 930 not to be connected with the same circuit. The operation of the switching circuit 1400 may be controlled by, for example, a control circuit, a transceiver (e.g., the transceiver 1720 of FIG. 17A), or a communication processor (e.g., the communication processor 1730 of FIG. 17A).

According to an embodiment, the second antenna 820 may be connected with the LB receiver circuit 940 of the diversity part 900 through the signal distributer 830 and the switching circuit 1400. For another example, the third antenna 910 may be connected with the LB transmitter/receiver circuit 850 of the main part 800 through the signal distributer 930 and the switching circuit 1400.

Figure 15:
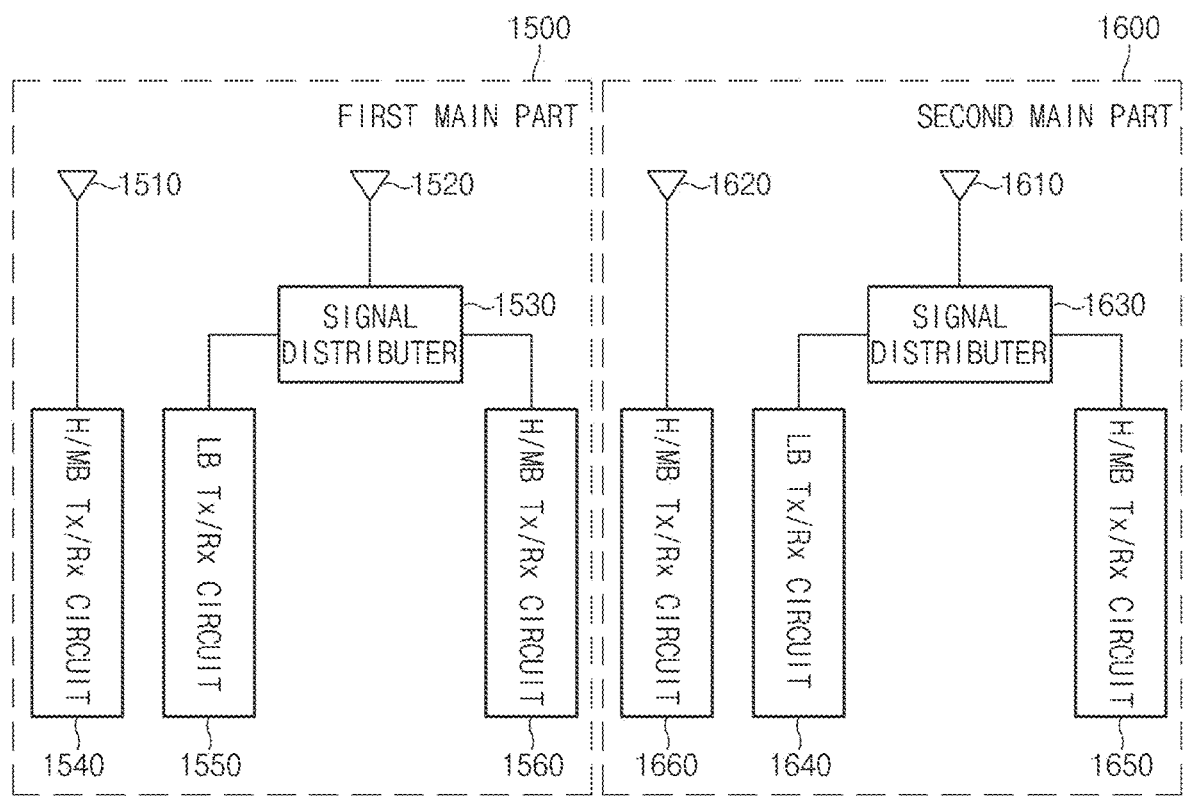
FIG. 15 is a block diagram illustrating a configuration of an antenna and an RF circuit included in an electronic device according to an embodiment.

FIG. 15 is a block diagram illustrating a configuration of an antenna and an RF circuit included in an electronic device according to an embodiment.

Referring to FIG. 15, an electronic device may include a first main part 1500 which includes a first antenna 1510, a second antenna 1520, a signal distributer 1530, an H/MB transmitter/receiver circuit 1540, an LB transmitter/receiver circuit 1550, and an H/MB transmitter/receiver circuit 1560, and a second main part 1600 which includes a third antenna 1610, a fourth antenna 1620, a signal distributer 1630, an LB transmitter/receiver circuit 1640, an H/MB transmitter/receiver circuit 1650, and an H/MB transmitter/receiver circuit 1660.

The electronic device according to an embodiment may transmit or receive the high band signal or the middle band signal at the same time through fourth antennas. For example, a signal received by the first antenna 1510 may be transmitted to the H/MB transmitter/receiver circuit 1540; at the same time, a signal received by the second antenna 1520 may be transmitted to the LB transmitter/receiver circuit 1550 or the H/MB transmitter/receiver circuit 1560 through the signal distributer 1530 depending on a band of the signal. A signal received by the third antenna 1610 may be transmitted to the LB transmitter/receiver circuit 1640 or the H/MB transmitter/receiver circuit 1650 through the signal distributer 1630 depending on a band of the signal, and a signal received by the fourth antenna 1620 may be transmitted to the H/MB transmitter/receiver circuit 1660. For another example, a signal generated by the H/MB transmitter/receiver circuit 1540 may be radiated through the first antenna 1510; at the same time, a signal generated by the LB transmitter/receiver circuit 1550 or the H/MB transmitter/receiver circuit 1560 may be radiated through the second antenna 1520. A signal generated by the LB transmitter/receiver circuit 1640 or the H/MB transmitter/receiver circuit 1650 may be radiated through the third antenna 1610; at the same time, a signal generated by the H/MB transmitter/receiver circuit 1660 may be radiated through the fourth antenna 1620.

According to an embodiment, the first antenna 1510, the second antenna 1520, the signal distributer 1530, the H/MB transmitter/receiver circuit 1540, the LB transmitter/receiver circuit 1550, and the H/MB transmitter/receiver circuit 1560 included in the first main part 1500 may be the same as the first antenna 110, the second antenna 120, the signal distributer 130, the H/MB transmitter/receiver circuit 140, the LB transmitter/receiver circuit 150, and the H/MB transmitter/receiver circuit 190 illustrated in FIG. 3.

According to an embodiment, the third antenna 1610, the fourth antenna 1620, and the signal distributer 1630 of the second main part 1600 may be the same as the first antenna 810, the second antenna 820, and the signal distributer 830 of FIG. 3.

According to an embodiment, the LB transmitter/receiver circuit 1640 may receive the low band signal from the third antenna 1610 and may transmit the low band signal to the third antenna 1610. The H/MB transmitter/receiver circuit 1650 may receive the middle band signal and the high band signal from the third antenna 1610 and may transmit the middle band signal and the high band signal to the third antenna 1610. The H/MB transmitter/receiver circuit 1660 may receive the middle band signal and the high band signal from the fourth antenna 1620 and may transmit the middle band signal and the high band signal to the fourth antenna 1620.

According to an embodiment, the H/MB transmitter/receiver circuit 1540, the LB transmitter/receiver circuit 1550, and the H/MB transmitter/receiver circuit 1560 may be implemented in the first communication circuit included in the first main part 1500. For another example, the LB transmitter/receiver circuit 1640, the H/MB transmitter/receiver circuit 1650, and the H/MB transmitter/receiver circuit 1660 may be implemented in the second communication circuit included in the second main part 1600. The first communication circuit and the second communication circuit may be configured to simultaneously receive the high band signal and/or the middle band signal from four antennas (the first antenna 1510, the second antenna 1520, the third antenna 1610, and the fourth antenna 1620) by using four transmitter/receiver circuits (the H/MB transmitter/receiver circuit 1540, the H/MB transmitter/receiver circuit 1560, the H/MB transmitter/receiver circuit 1650, and the H/MB transmitter/receiver circuit 1660). For another example, the first communication circuit and the second communication circuit may be configured to simultaneously radiate the high band signal and/or the middle band signal from four transmitter/receiver circuits (the H/MB transmitter/receiver circuit 1540, the H/MB transmitter/receiver circuit 1560, the H/MB transmitter/receiver circuit 1650, and the H/MB transmitter/receiver circuit 1660) by using four antennas (the first antenna 1510, the second antenna 1520, the third antenna 1610, and the fourth antenna 1620). For example, in the case where the high band signal and/or the middle band signal is generated in the electronic device, the signal distributer 1530 may allow the high band signal and/or the middle band signal to be transmitted to the second antenna 1520 from the H/MB transmitter/receiver circuit 1560. The signal distributer 1630 may allow the high band signal and/or the middle band signal to be transmitted to the third antenna 1610 from the H/MB transmitter/receiver circuit 1650.

According to an embodiment, the electronic device may include a first main part and a second main part, which are capable of transmitting and receiving signals. Accordingly, the electronic device according to an embodiment of the present disclosure may simultaneously receive or may simultaneously transmit signals by using four antennas (the first antenna 1510, the second antenna 1520, the third antenna 1610, and the fourth antenna 1620).

Figure 16:
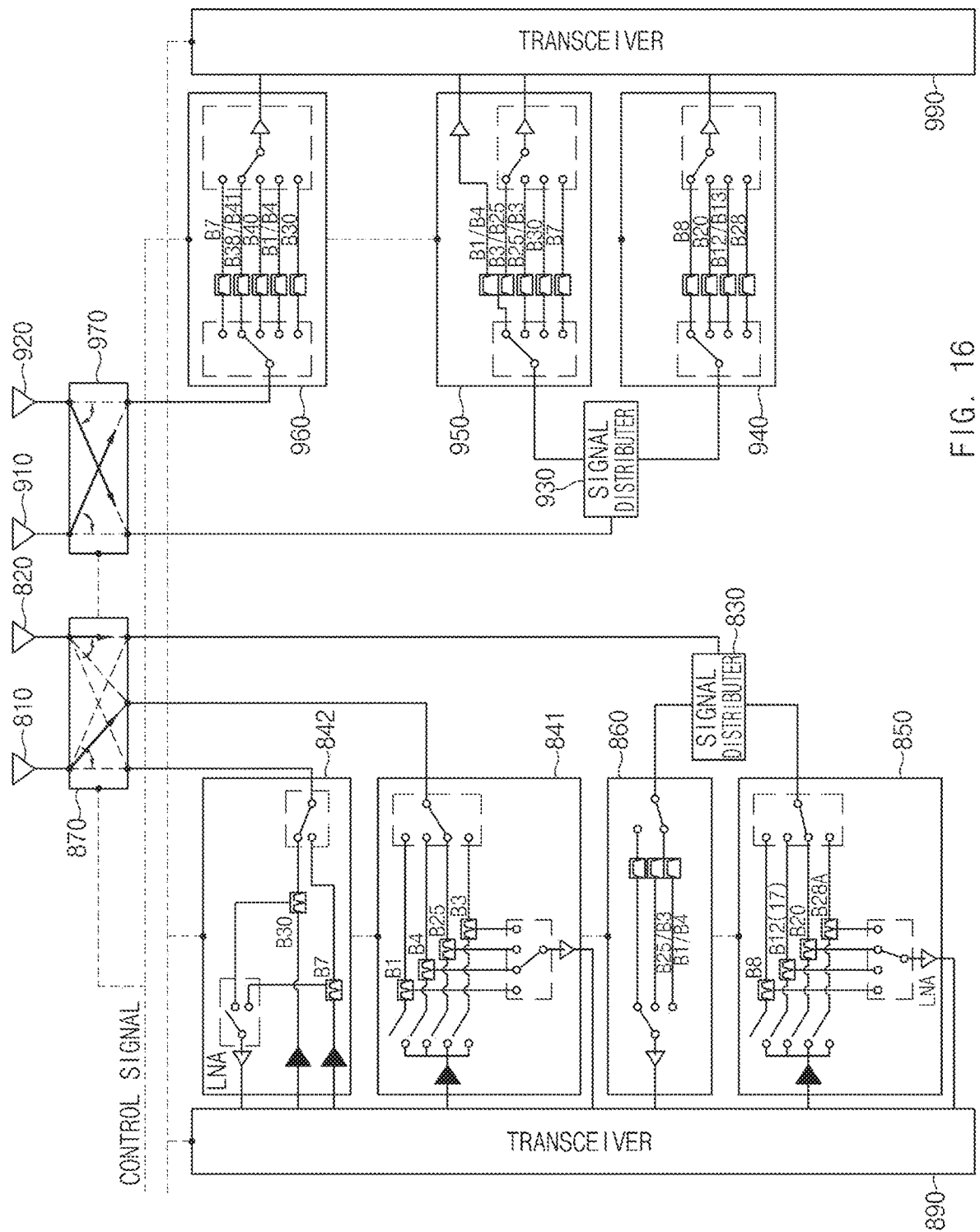
FIG. 16 is a block diagram illustrating a configuration of an antenna and an RF circuit included in an electronic device according to an embodiment.

FIG. 16 is a block diagram illustrating a configuration of an antenna and an RF circuit included in an electronic device according to an embodiment.

Referring to FIG. 16, an electronic device may receive signals in various bands from the outside and may transmit the signals in various bands to the outside.

According to an embodiment, the electronic device may transmit/receive signals in the B7 and B30 bands by using an HB transmitter/receiver circuit 842. The electronic device may transmit/receive signals in the B1, B4, B25, and B3 bands by using an MB transmitter/receiver circuit 841. The electronic device may receive signals in the B1, B4, B3, and B25 bands by using the H/MB receiver circuit 860. The H/MB receiver circuit 860 may include a dual surface acoustic wave (SAW) filter. The signals in the B1, B4, B3, and B25 bands may be filtered by the dual SAW filter depending on a band. For example, the B25 and B3 signals may be output to an upper path of the filter, and the B1 and B4 signals may be output to a lower path of the filter. The electronic device may transmit/receive signals in the B8, B12(17), B20, and B28A bands by using the LB transmitter/receiver circuit 850. The electronic device may receive signals in the B1, B4, B7, B30, B38, B40, and B41 bands by using the H/MB receiver circuit 960. The electronic device may receive signals in the B1, B3, B4, B7, B25, and B30 bands by using the H/MB receiver circuit 950. The electronic device may receive signals in the B8, B12, B13, B20, and B28 bands by using the LB receiver circuit 940.

Figure 17A:
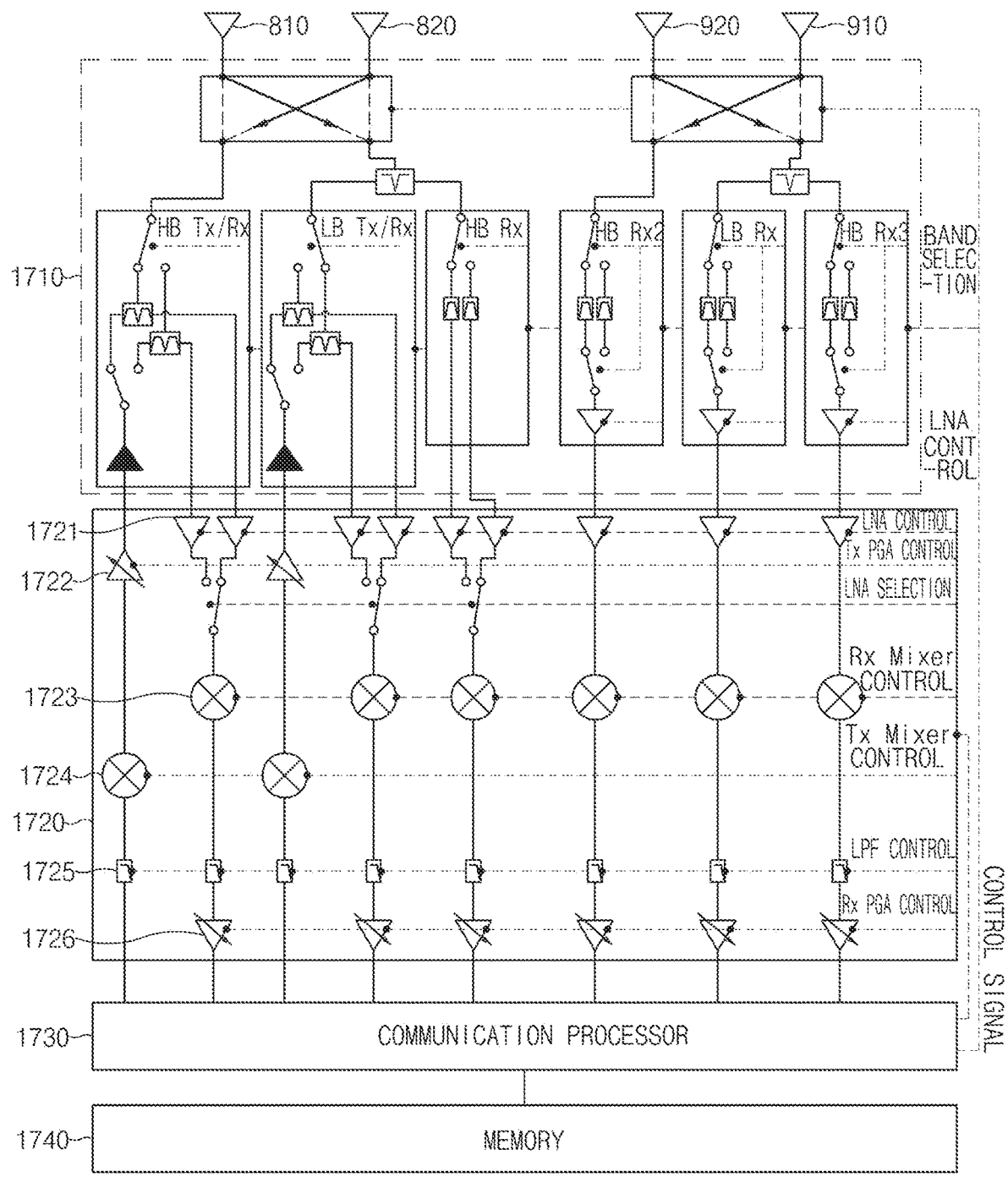
FIG. 17A is a block diagram illustrating a configuration of an electronic device according to an embodiment.

FIG. 17A is a block diagram illustrating a configuration of an electronic device according to an embodiment.

Referring to FIG. 17A, an electronic device may further include a transceiver and a communication processor.

According to an embodiment, an operation in which the electronic device receives a signal may be as follows. An LNA 1721 may amplify a signal provided from a front end 1710 (e.g., a transmitter/receiver circuit or a receiver circuit). An Rx mixer 1723 may convert the amplified signal to a baseband signal. The Rx mixer 1723 may be a quadrature mixer. The baseband signal, for example, an I(in phase)/Q (quadrature) signal may pass through an LPF 1725. For example, the LPF 1725 may change a cutoff frequency. An Rx programmable gain amplifier (PGA) 1726 may amplify a signal filtered by the LPF 1725, and the amplified signal may be transmitted to the communication processor 1730. The communication processor 1730 may demodulate a received I/Q signal.

According to an embodiment, an operation in which the electronic device transmits a signal may be as follows. A baseband signal modulated by the communication processor 1730, for example, an I/Q signal may be transmitted to the transceiver 1720 from the communication processor 1730. The transmitted signal may be filtered by the LPF 1725. A Tx mixer 1724 may convert the filtered signal to an RF band signal. The converted RF band signal may be transmitted to the front end 1710 (e.g., a transmitter/receiver circuit or a transmit circuit) after being amplified through a TX PGA 1722.

According to an embodiment, the communication processor 1730 may control the transceiver 1720 and the front end 1710. A control signal is marked by a dotted line. For convenience, the control signal is illustrated as being simultaneously connected. However, the connection may be made simultaneously for each part, or the connection with the communication processor 1730 may be separately made.

According to an embodiment, a transmission path of a control signal for the transceiver 1720 and the front end 1710 may be separately connected with parts included in a circuit, or may be connected in common with the communication processor 1730 through an interface such as a mobile industry processor interface (MIPI), an SPI, or the like. The communication processor 1730 may connect a desired RF path by controlling a switch through the control signal, and may control and operate a part (e.g., a PA) included in the path.

According to an embodiment, the communication processor 1730 may control the transceiver 1720 through a separate interface. The interface may be an MIPI. The communication processor 1730 may control operations of parts included in the transceiver 1720 based on a selected communication method. For example, an operating frequency of a mixer may be changed based on the selected band and channel, and a gain of a PGA may be adjusted by a selected transmit power.

According to an embodiment, the communication processor 1730 may determine a receive power, quality, or a transmit power or may receive relevant information from a base station. The communication processor 1730 may control an operation by using information about current consumption or the like in the electronic device.

According to an embodiment, a control signal for the front end 1710 may include a control signal for selecting an antenna, a control signal for selecting a band of an HB/LB Tx/Rx circuit, a PA control signal, a control signal for selecting a band of an HB Rx circuit, and a control signal for selecting a band of an LB Rx2, HB Rx2/Rx3 circuit.

According to an embodiment, the control signal for selecting the antenna may control a switching circuit depending on a determined way to use an antenna, thus selectively connecting the first antenna 810 or the second antenna 820 with an LB/HB Tx/Rx circuit or an HB Rx circuit or selectively connecting the third antenna 910 or the fourth antenna 920 with an LB/HB Rx circuit.

According to an embodiment, the control signal for selecting the band in the HB/LB Tx/Rx circuit may control switches before and after a duplexer based on a frequency band for communication, thus connecting to a communication path using the duplexer supporting a relevant communication band.

According to an embodiment, the PA control signal in the HB/LB Tx/Rx circuit may perform a control such as a gain mode, a bias voltage, an enable/disable, or the like of a PA depending on a determined transmit power or whether to use.

According to an embodiment, the control signal for selecting the band in the LB Rx circuit may control a switch connected with a BPF based on a frequency band for communication, thus connecting to a communication path using the BPF supporting a relevant communication band.

According to an embodiment, the control signal for selecting the band in the LB/HB2/HB3 Rx circuit may control switches before and after a BPF based on a frequency band for communication, thus connecting to a communication path using the BPF supporting a relevant communication band.

According to an embodiment, an LNA control signal in an LB/HB2/HB3 Rx circuit may perform a control such as an enable/disable/bypass or the like of an LNA.

According to an embodiment, the control signal of the transceiver 1720 may include a control signal for the LNA 1721, a control signal for the Tx PGA 1722, a control signal for selecting the LNA 1721, a control signal for the Rx mixer 1723, a control signal for the Tx mixer 1724, a control signal for the LPF 1725, a control signal for the Rx PGA 1726, a control signal for a Tx PLL (not illustrated), and a control signal for an Rx PLL (not illustrated). In FIG. 17A, for convenience, a control signal is illustrated as being connected in common to homogeneous parts, but independent connection and control may be made with regard to the parts.

According to an embodiment, the control signal for the LNA 1721 may perform a control such as an enable/disable/bypass or the like of the LNA 1721.

According to an embodiment, the control signal for the Tx PGA 1722 may change a gain of the Tx PGA 1722 depending on a determined transmit power. An enable/disable control may be made depending on whether to use.

According to an embodiment, the control signal for selecting the LNA 1721 may connect the LNA 1721, which supports a relevant frequency band, to a mixer based on a frequency band for communication.

According to an embodiment, the control signal for the Tx mixer 1724 may control an enable/disable, a mixer gain, or the like. The Tx mixer 1724 may generate a transmit signal by upconverting a transmit frequency signal generated from TX PLL and an I/Q signal of the baseband.

According to an embodiment, the control signal for the Rx mixer 1723 may control an enable/disable, a mixer gain, or the like. The Rx mixer 1723 may generate an I/Q signal of the baseband by downconverting a receive frequency signal generated from Rx PLL and a receive signal.

According to an embodiment, the control signal for the LPF 1725 may change a cutoff frequency of the LPF 1725 depending on the communication standard (e.g., LTE, WCDMA, GSM, or the like) to be used.

According to an embodiment, the control signal for the Rx PGA 1726 may change a gain of the Rx PGA 1726 depending on the strength of a received signal. The control signal for the Rx PGA 1726 may control an enable/disable depending on whether to use.

According to an embodiment, the control signal for the Tx PLL may generate a transmit frequency signal in a frequency band for communication. The transmit frequency signal thus generated may be supplied to a mixer. In the case where the electronic device supports uplink carrier aggregation (CA), the transceiver 1720 may include a plurality of Tx PLLs and may supply a plurality of transmit frequencies selectively to the Tx mixer 1724.

According to an embodiment, the control signal for the Rx PLL may generate a receive frequency signal in a frequency band for communication. The receive frequency signal thus generated may be supplied to a mixer. In the case where a terminal supports downlink carrier aggregation (CA), the transceiver 1720 may include a plurality of Rx PLLs and may supply a plurality of receive frequencies selectively to the Rx mixer 1723.

The electronic device of FIG. 17A may simultaneously receive four signals in the same band. For example, fourth-order diversity may be performed. The communication processor 1730 may improve receiving performance by combining the four signals received. For example, the communication processor 1730 may improve the receiving performance by performing maximum ratio combining (MRC).

According to various embodiments, the communication processor 1730 may control a communication circuit such that the communication circuit (the front end 1710 and the transceiver 1720) simultaneously receives a first band signal from a plurality of antennas. For example, a communication processor may control the communication circuit so as to receive a signal in a specified band at least temporarily and simultaneously through the first antenna 810, the second antenna 820, the third antenna 910, and the fourth antenna 920 by controlling at least one of a first electrical path, a second electrical path, a third electrical path, and a fourth electrical path.

According to various embodiments, the electronic device may further include a memory which is electrically connected with the communication processor. The memory may store instructions, which cause the communication processor to perform the operations described with reference to FIGS. 1A to 17A.

Figure 17B:
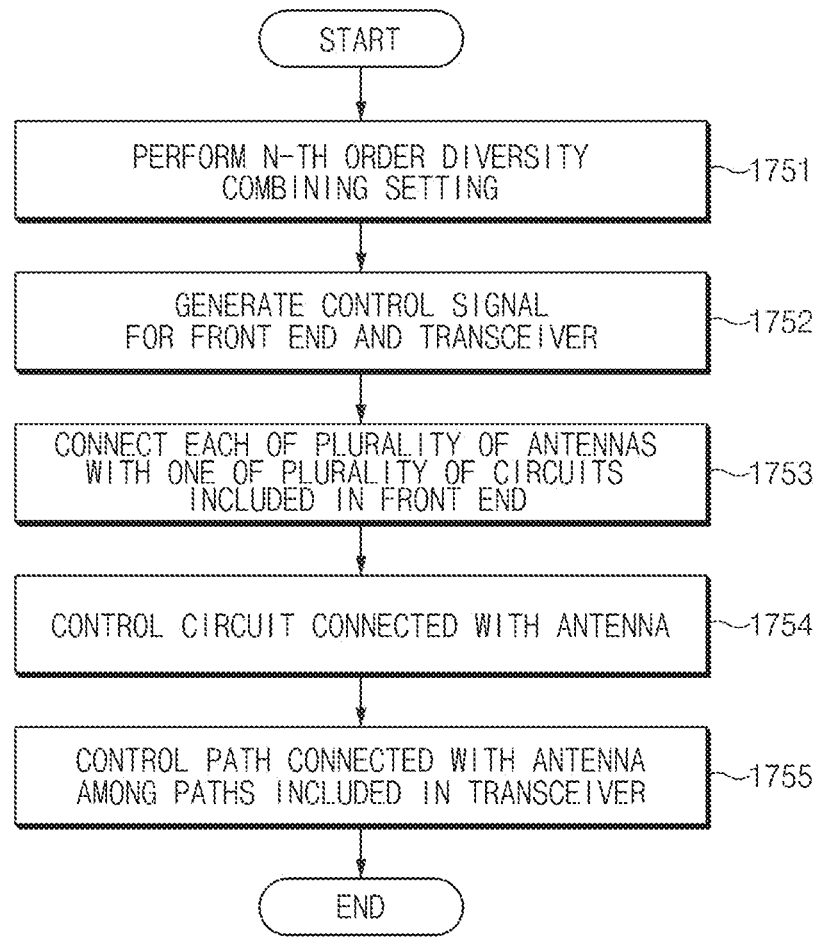
FIG. 17B is a flowchart for describing a method of controlling an antenna of an electronic device according to an embodiment.
Figure 18:
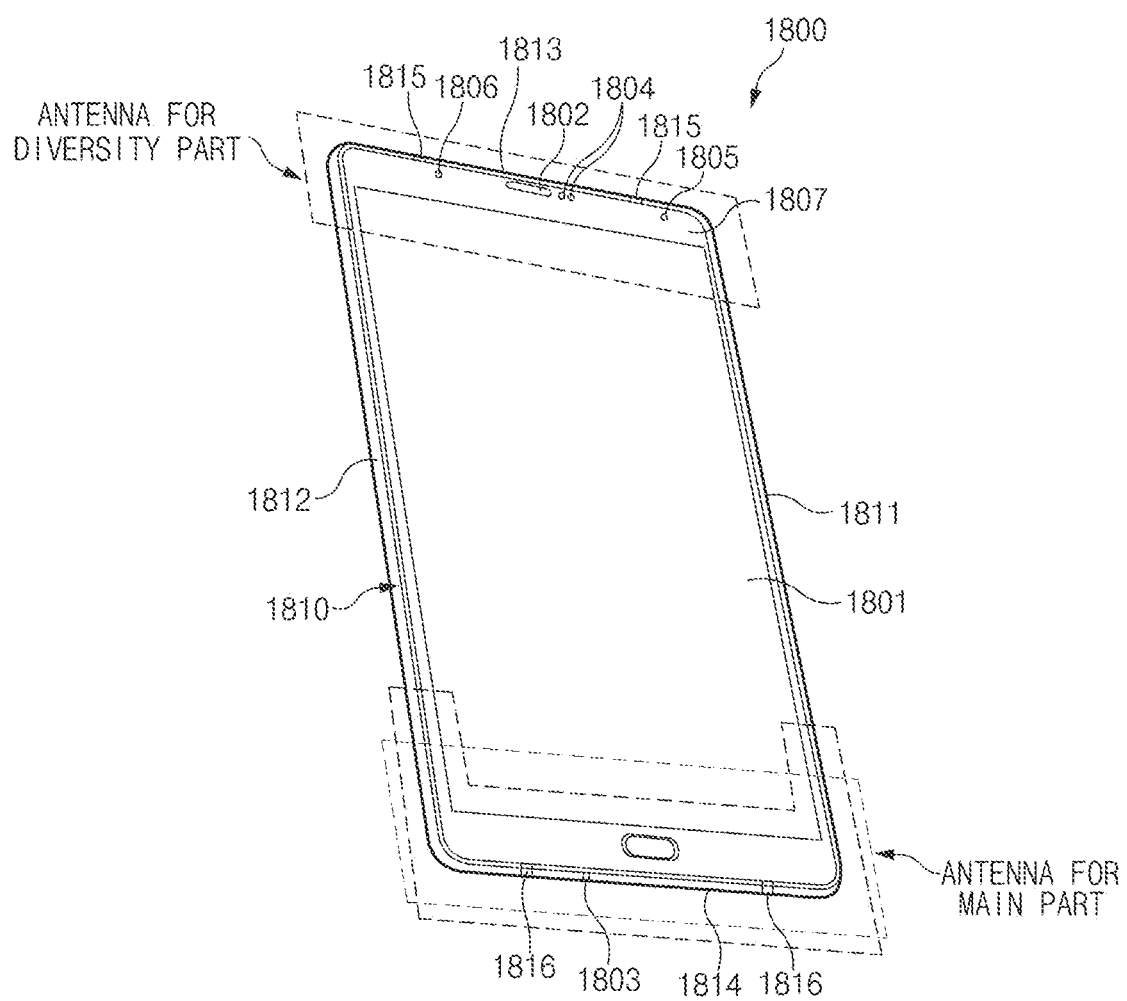
FIG. 18 is a perspective view of an electronic device according to an embodiment.
Figure 19:
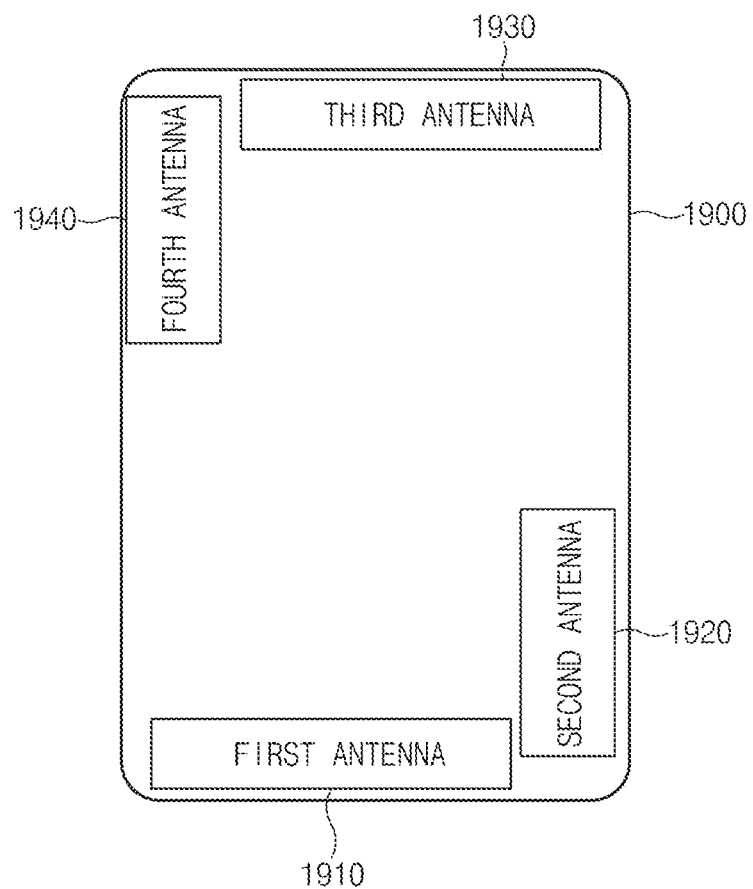
FIG. 19 illustrates a location of an antenna included in an electronic device according to an embodiment.
Figure 20:
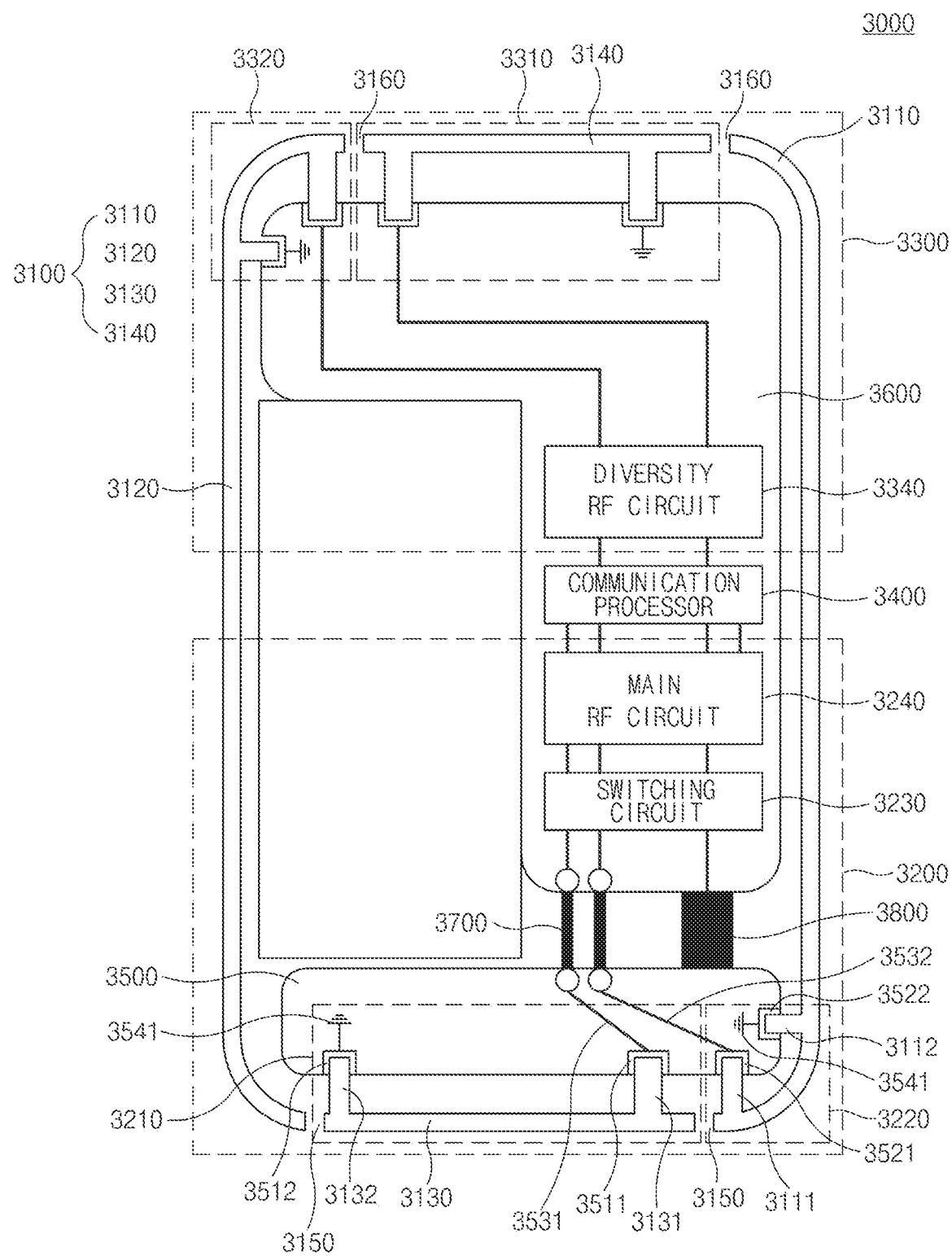
FIG. 20 illustrates an internal structure of an electronic device according to an embodiment.
Figure 26:
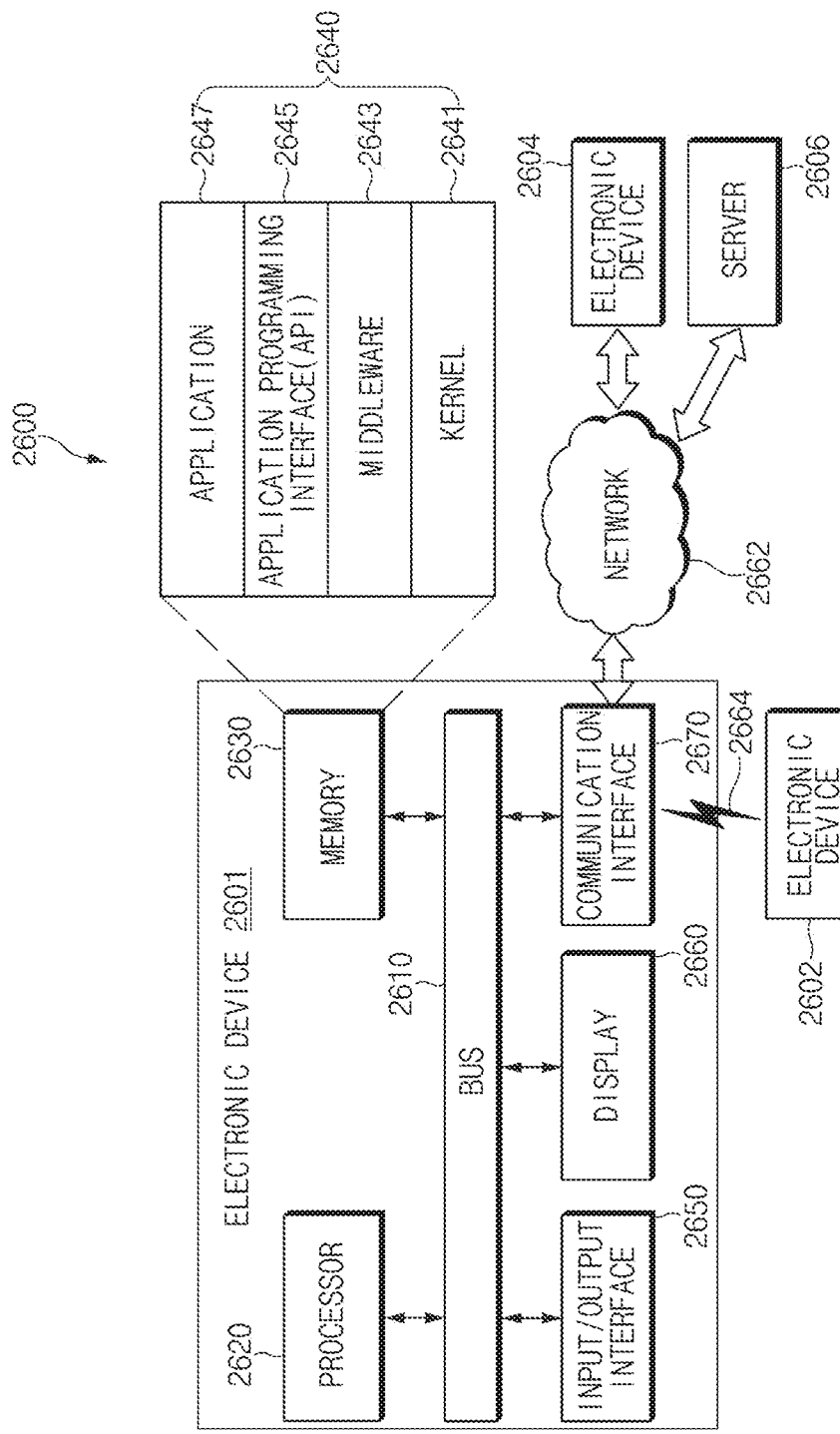
FIG. 26 illustrates the electronic device in a network environment according to various embodiments.
Figure 27:
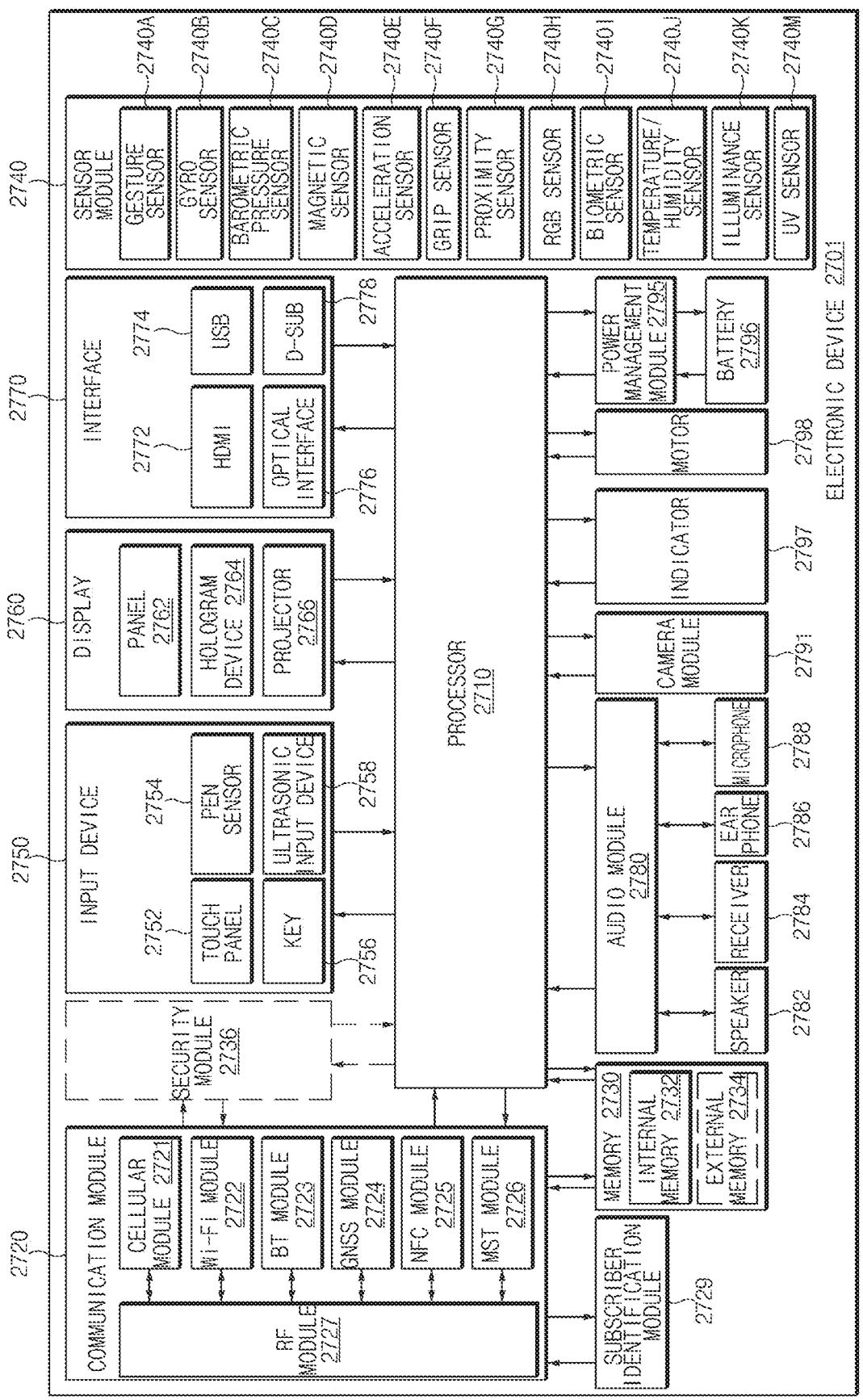
FIG. 27 is a block diagram of the electronic device according to various embodiments.

The electronic device of FIGS. 1A to 17A may be an electronic device 1800 of FIG. 18, an electronic device 1930 of FIG. 19, an electronic device 3000 of FIG. 20, an electronic device 2601 of FIG. 26, or an electronic device 2701 of FIG. 27. The components illustrated in FIGS. 1A to 17A may be included in a communication interface 2670 of FIG. 26 or a communication module 2720 of FIG. 27. Also, the circuits illustrated in FIGS. 1A to 17A may be included in the front end 1710 of FIG. 17A, and may be included in a main RF circuit 3240 or a diversity RF circuit 3340 of FIG. 20.

FIG. 17B is a flowchart for describing a method of controlling an antenna of an electronic device according to an embodiment.

The flowchart illustrated in FIG. 17B may include operations that the electronic device illustrated in FIG. 17A processes. Even though omitted below, the above description of the electronic device given with reference to FIG. 17A may be applied to the flowchart illustrated in FIG. 17B.

In operation 1751, an electronic device may perform an n-th order diversity combining setting operation. For example, the communication processor 1730 may determine the number of antennas, which will be used, from among the first antenna 810, the second antenna 820, the third antenna 910, and the fourth antenna 920 or whether to use any antenna of the first antenna 810, the second antenna 820, the third antenna 910, and the fourth antenna 920. The communication processor 1730 may determine the number of antennas to be used, based on a receive power, quality, a transmit power, current consumption, or the like. The number of antennas to be used may be determined through operations to be described below with reference to FIGS. 24 and 25. The communication processor 1730 may select an antenna to be used among the first antenna 810, the second antenna 820, the third antenna 910, and the fourth antenna 920 based on a transmit power, a support band, and performance of each of the first antenna 810, the second antenna 820, the third antenna 910, and the fourth antenna 920. An antenna to be used may be selected through operations to be described below with reference to FIGS. 21 and 22. For another example, the communication processor 1730 may determine an electrical path through which each antenna and the communication processor 1730 will be connected.

In operation 1752, the electronic device may perform an operation of generating a control signal(s) for the front end 1710 and the transceiver 1720. For example, the communication processor 1730 may generate a control signal for controlling the front end 1710 and the transceiver 1720 such that the selected antenna and the communication processor 1730 are connected through the determined electrical path. Components included in the front end 1710 and the transceiver 1720 may be controlled by the control signal like operation 1754 and operation 1755.

In operation 1753, the electronic device may perform an operation of connecting an antenna and a front circuit based on the control signal. For example, the electronic device may connect each of a plurality of antennas with one of a plurality of circuits included in a front end.

In operation 1754, the electronic device may perform a control operation on a circuit connected with an antenna based on the control signal. For example, an electrical path of a switching circuit, a transmitter/receiver circuit, and/or a receiver circuit included in the front end 1710 may be changed depending on the control signal generated by the communication processor 1730. For example, in the case of receiving the high band signal by using the first antenna 810, the second antenna 820, the third antenna 910, and the fourth antenna 920, a switching circuit, a diplexer, and/or a switch included in the front end 1710 may allow the first antenna 810 to be connected with an HB Tx/Rx circuit, the second antenna 820 to be connected with an HB Rx circuit, the third antenna 910 to be connected with an HB Rx3 circuit, and the fourth antenna 920 to be connected with an HB Rx2 circuit.

In operation 1755, the electronic device may perform a control operation on a path, which is connected with an antenna, from among paths included in the transceiver 1720 based on the control signal. For example, in the case where the HB Tx/Rx circuit, the HB Rx circuit, the HB Rx3 circuit, and the HB Rx2 circuit included in the front end 1710 are respectively connected with the first antenna 810, the second antenna 820, the third antenna 910, and the fourth antenna 920, there may be controlled an LNA, an Rx Mixer, an LPF, and an Rx PGA included in a path connected with the first antenna 810, the second antenna 820, the third antenna 910, and the fourth antenna 920 through the HB Tx/Rx circuit, the HB Rx circuit, the HB Rx3 circuit, and the HB Rx2 circuit among components of the transceiver 1720.

FIG. 18 is a perspective view of an electronic device according to an embodiment.

Referring to FIG. 18, a display 1801 may be included in a front surface 1807 of the electronic device 1800 according to an embodiment. A speaker device 1802 for receiving voice of the other party may be installed on an upper side of the display 1801. A microphone device 1803 for transmitting voice of the user of the electronic device may be installed on a lower side of the display 1801.

According to an embodiment, components for performing various functions of the electronic device 1800 may be positioned around the speaker device 1802 thus installed. The components may include at least one sensor module 1804. The sensor module 1804 may include at least one of an illuminance sensor (e.g., a light sensor), a proximity sensor, an infrared sensor, an ultrasonic sensor, or a grip sensor. According to an embodiment, the components may include a camera device 1805. According to an embodiment, the components may include an LED indicator 1806 for allowing the user to recognize state information of the electronic device 1800.

According to various embodiments, the electronic device 1800 may include a metal bezel 1810 (e.g., may correspond to at least a partial region of a metal housing). According to an embodiment, the metal bezel 1810 may be positioned along an edge of the electronic device 1800, and may be extended and positioned to at least a partial region of a rear surface of the electronic device 1800 extended from the edge. According to an embodiment, the metal bezel 1810 may be formed in a loop form along the edge of the electronic device 1800. However, the present disclosure is not limited thereto. For example, the metal bezel 1810 may be formed to be thinner than the thickness of the electronic device 1800. According to an embodiment, the metal bezel 1810 may be positioned only in at least a partial region of the edge of the electronic device 1800. According to an embodiment, the metal bezel 1810 may include at least one or more segments 1815 and 1816. According to an embodiment, unit bezel portions segmented by each segment 1815 or 1816 may be utilized as antenna radiators operating in at least one frequency band.

According to an embodiment, the metal bezel 1810 may have a loop form along the edge and may be formed to be the same as or thinner than the thickness of the electronic device 1800. According to an embodiment, when viewed from the front of the electronic device 1800, the metal bezel 1810 may include a right bezel portion 1811, a left bezel portion 1812, an upper bezel portion 1813, and a lower bezel portion 1814. Here, the lower bezel portion 1814 may be a unit bezel portion formed by a pair of segments 1816.

According to various embodiments, a main antenna device may be positioned in a lower region (a main antenna region) of the electronic device 1800. According to an embodiment, the lower bezel portion 1814 may be used as a main antenna radiator by the pair of segments 1816. According to an embodiment, the lower bezel portion 1814 may be an antenna radiator which operates in at least two operating frequency bands depending on a feeding location. For example, the lower bezel portion 1814 may be a portion of an antenna supporting LB and H/MB, or H/MB.

According to various embodiments, an antenna device of the present disclosure is only an exemplary component, and the above-described functions of the lower bezel portion 1814 may be performed at the upper bezel portion 1813 segmented by other segments 1815 instead of the lower bezel portion 1814 or may be performed together with the upper bezel portion 1813. In this case, an antenna region of a diversity part of FIG. 18 may be utilized as an antenna for diversity/MIMO. For example, the upper bezel portion 1813 may be a portion of a diversity antenna supporting LB and H/MB, or H/MB.

An embodiment is illustrated in FIG. 18 as antenna of a diversity part is positioned at an upper end of the electronic device 1800 and an antenna of a main part is positioned at a lower end thereof. However, the present disclosure is not limited thereto. For example, the antenna of the main part and the antenna of the diversity part may be positioned at various locations depending on a shape of the electronic device 1800. For example, the electronic device 1800 may include an antenna of a main part positioned at a right end thereof and an antenna of a diversity part positioned at a left end thereof.

According to an embodiment, the right bezel portion 1811 or the left bezel portion 1812 may also operate as an antenna when the right bezel portion 1811 or the left bezel portion 1812 is fed. For example, the right bezel portion 1811 or the left bezel portion 1812 may be a portion of an antenna supporting H/MB, or LB and H/MB. An antenna which includes the right bezel portion 1811 or the left bezel portion 1812 included in the main antenna region may operate as a main antenna. An antenna which includes the right bezel portion 1811 or the left bezel portion 1812 included in the diversity antenna region may operate as a diversity antenna.

FIG. 19 illustrates a location of an antenna included in an electronic device according to an embodiment.

Referring to FIG. 19, an electronic device 1900 according to an embodiment may include a first antenna 1910, a second antenna 1920, a third antenna 1930, and a fourth antenna 1940.

According to an embodiment, the first antenna 1910 and the second antenna 1920 may be positioned on a lower side of the electronic device 1900. For example, the first antenna 1910 may be positioned on the lower middle of the electronic device 1900, and the second antenna 1920 may be positioned on the lower right of the electronic device 1900. The first antenna 1910 and the second antenna 1920 may operate as a main antenna of the electronic device 1900. The first antenna 1910 and the second antenna 1920 may receive a signal from the outside or may transmit a signal to the outside.

According to an embodiment, the third antenna 1930 and the fourth antenna 1940 may be positioned on an upper side of the electronic device 1900. For example, the third antenna 1930 may be positioned on the upper middle of the electronic device 1900, and the fourth antenna 1940 may be positioned on the upper left of the electronic device 1900. The third antenna 1930 and the fourth antenna 1940 may be spaced from the first antenna 1910 and the second antenna 1920 by a preset distance or more. The third antenna 1930 and the fourth antenna 1940 may operate as a diversity antenna of the electronic device 1900. In the case where the third antenna 1930 and the fourth antenna 1940 operate as a diversity antenna, the third antenna 1930 and the fourth antenna 1940 may receive a signal from the outside. The third antenna 1930 and the fourth antenna 1940 may operate as the main antenna of the electronic device 1900. In the case where the third antenna 1930 and the fourth antenna 1940 operate as the main antenna, the third antenna 1930 and the fourth antenna 1940 may transmit a signal to the outside together with the first antenna 1910 and the second antenna 1920.

FIG. 20 illustrates an internal structure of an electronic device according to an embodiment.

Referring to FIG. 20, the electronic device 3000 according to an embodiment may include a metal bezel 3100, and may include a main part 3200, a diversity part 3300, and a communication processor 3400 which are present within the metal bezel 3100 or include a portion of the metal bezel 3100.

According to an embodiment, the metal bezel 3100 may include a right bezel 3110, a left bezel 3120, a lower bezel 3130, and an upper bezel 3140 when viewed from the front of the electronic device 3000. According to an embodiment, the lower bezel 3130 may maintain a state in which the lower bezel 3130 is separated from the right bezel 3110 and the left bezel 3120 by a pair of segments 3150 formed with a specific gap. The upper bezel 3140 may maintain a state in which the upper bezel 3140 is separated from the right bezel 3110 and the left bezel 3120 by a pair of segments 3160 formed with a given gap. According to an embodiment, the pairs of segments 3150 and 3160 may be formed of an insulator. According to an embodiment, the pairs of segments 3150 and 3160 may be formed at the metal bezel 3100 through double-shot injection or insert molding of synthetic resins. However, the present disclosure is not limited thereto. The pairs of segments 3150 and 3160 may be formed of various materials having an insulating property.

According to various embodiments, the lower bezel 3130 may be integrally formed with a first feeding piece 3131, and the first feeding piece 3131 may be fed by a first feeding part of a sub printed circuit board (PCB) 3500. According to an embodiment, the first feeding piece 3131 of the lower bezel 3130 may be connected with the first feeding part of the sub PCB 3500 only through an operation in which the sub PCB 3500 is installed on the electronic device 3000 or may be electrically connected with the first feeding part by a separate electrical connection member (e.g., a C-clip or the like).

According to various embodiments, a first feeding pad 3511 may be positioned on the sub PCB 3500, and the first feeding pad 3511 may be electrically connected with the first feeding piece 3131 of the lower bezel 3130. According to an embodiment, a first electrical path 3531 (e.g., a wiring line) may be formed from the first feeding pad 3511 to the first feeding part. The lower bezel 3130 may be a portion of a first antenna 3210 of the main part 3200 supporting a low band (LB) and high/low band (H/LB), or H/MB. The left bezel 3120 and the right bezel 3110 may also be fed in the same method.

According to various embodiments, the lower bezel 3130 may be integrally formed with a first ground piece 3132 at a location spaced from the first feeding piece 3131 by a given distance, and the first ground piece 3132 may be grounded to a first ground part 3541 of the sub PCB 3500. According to an embodiment, the first ground piece 3132 of the lower bezel 3130 may be grounded to the first ground part 3541 of the sub PCB 3500 only through an operation in which the sub PCB 3500 is installed on the electronic device 3000 or may be electrically connected with the first ground part 3541 by a separate electrical connection member (e.g., a C-clip or the like).

According to various embodiments, a first ground pad 3512 may be positioned on the sub PCB 3500, and the first ground pad 3512 may be electrically connected with the first ground piece 3132 of the lower bezel 3130. According to an embodiment, a second electrical path 3532 (e.g., a wiring line) may be formed from the first ground pad 3512 to the first ground part 3541.

According to various embodiments, the right bezel 3110 may be integrally formed with a second feeding piece 3111, and the second feeding piece 3111 may be fed by a second feeding part of the sub PCB 3500. According to an embodiment, the second feeding piece 3111 of the right bezel 3110 may be connected with the second feeding part of the sub PCB 3500 only through an operation in which the sub PCB 3500 is installed on the electronic device 3000 or may be electrically connected with the second feeding part by a separate electrical connection member (e.g., a C-clip or the like).

According to various embodiments, a second feeding pad 3521 may be positioned on the sub PCB 3500, and the second feeding pad 3521 may be electrically connected with the second feeding piece 3111 of the right bezel 3110. According to an embodiment, a third electrical path 3532 (e.g., a wiring line) may be formed from the second feeding pad 3521 to the second feeding part. The right bezel 3110 may be a portion of a second antenna 3220 of the main part 3200 supporting LB and H/MB, or H/MB.

According to various embodiments, the right bezel 3110 may be integrally formed with a second ground piece 3112 at a location spaced from a segment by a given distance, and the second ground piece 3112 may be grounded to a second ground part 3541 of the sub PCB 3500. According to an embodiment, the second ground piece 3112 of the right bezel 3110 may be grounded to the second ground part 3541 of the sub PCB 3500 only through an operation in which the sub PCB 3500 is installed on the electronic device 3000 or may be electrically connected with the second ground part 3541 by a separate electrical connection member (e.g., a C-clip or the like).

According to various embodiments, a second ground pad 3522 may be positioned on the sub PCB 3500, and the second ground pad 3522 may be electrically connected with the second ground piece 3112 of the right bezel 3110. According to an embodiment, a fourth electrical path (e.g., a wiring line) may be formed from the second ground pad 3522 to the second ground part 3541.

According to an embodiment, a feeding part, a feeding pad, a ground part, and a ground pad of the main part 3200 may be positioned on the sub PCB 3500. The RF circuit 3240 of the main part 3200 and the RF circuit 3340 of the diversity part 3300 may be positioned on a main PCB 3600.

The main PCB 3600 and the sub PCB 3500 may be connected by a flexible PCB 3800. The sub PCB 3500 and the flexible PCB 3800 may be integrally formed.

According to an embodiment, the sub PCB 3500 may be positioned within the electronic device 3000 to be lower than the main PCB 3600 vertically. As such, parts included in the sub PCB 3500 may be further spaced from an antenna. Relatively thick parts such as a USB connector, a speaker, or the like may be positioned on the sub PCB 3500.

According to an embodiment, a transmit/receive signal or a receive signal of the RF circuit 3240 of the main part 3200 may be transmitted to the first feeding part or the second feeding part of the sub PCB 3500 through coaxial lines 3700.

According to various embodiments, a transmit/receive signal of the RF circuit 3240 of the main part 3200 may be transmitted to the first feeding part or the second feeding part of the sub PCB 3500 through the flexible PCB 3800.

According to an embodiment, the diversity part 3300 may include a third antenna 3310 and a fourth antenna 3320. The third antenna 3310 may include a portion of the upper bezel 3140, and the fourth antenna 3320 may include a portion of the left bezel 3120 or the right bezel 3110.

According to an embodiment, the third antenna 3310 may support LB and H/MB, or H/MB, and the fourth antenna 3320 may support H/MB, or LB and H/MB. A feeding part, a feeding pad, a ground part, and ground pads of the diversity part 3300 may be positioned on the main PCB 3600. Electrical paths for connecting the feeding part and the feeding pad of the diversity part 3300 and electrical paths for connecting the ground part and the ground pad thereof may be positioned on the main PCB 3600.

According to various embodiments, for signal separation between antennas, in the case where the main part 3200 uses the right bezel 3110 as the second antenna 3220, the diversity part 3300 may use the left bezel 3120 facing the right bezel 3110 as the fourth antenna 3320. Alternatively, in the case where the main part 3200 uses the left bezel 3120 as the second antenna 3220, the diversity part 3300 may use the right bezel 3110 facing the left bezel 3120 as the fourth antenna 3320.

Figure 21A:
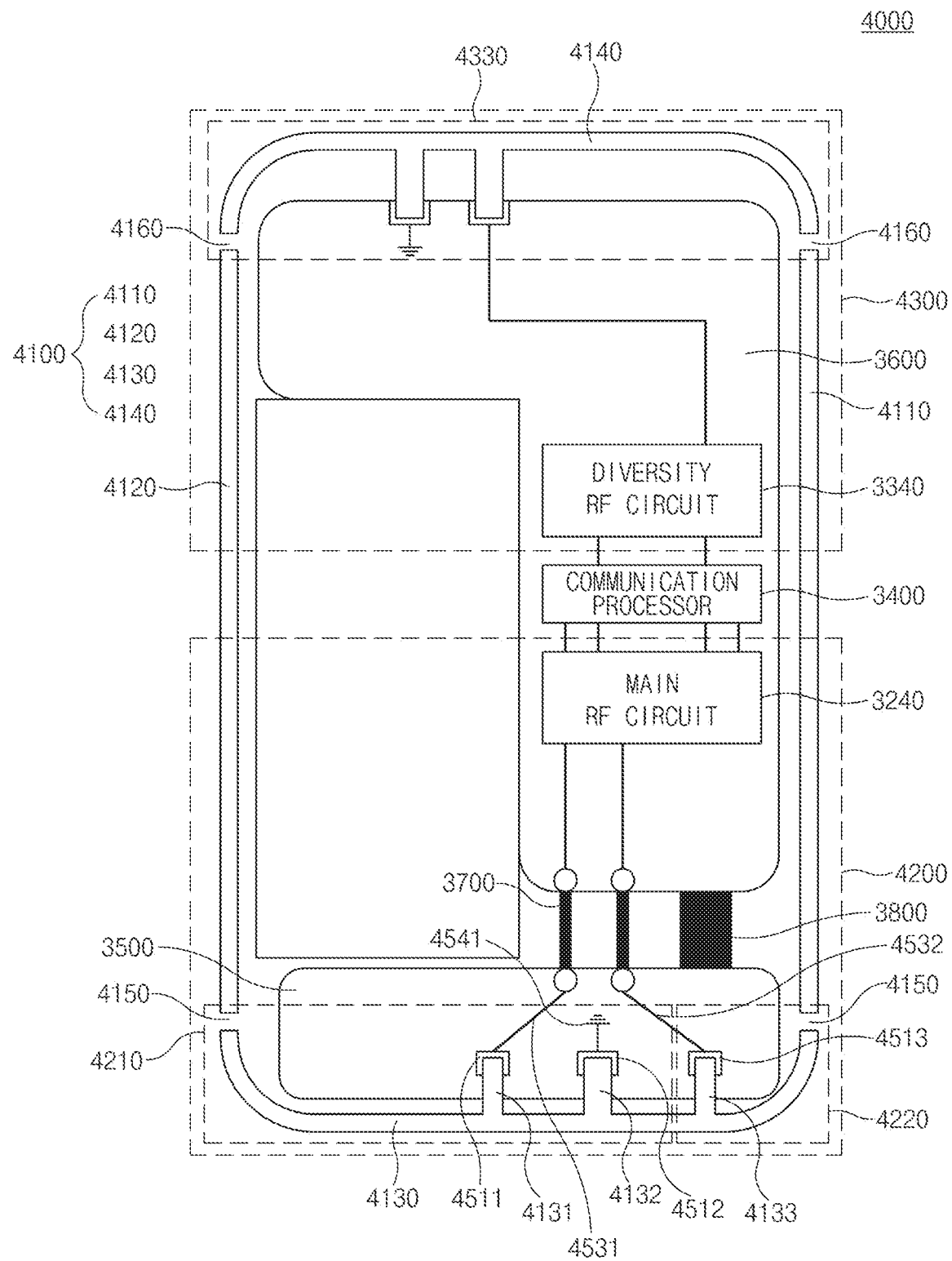
FIGS. 21A to 21C illustrate an internal structure of an electronic device according to an embodiment.
Figure 21B:
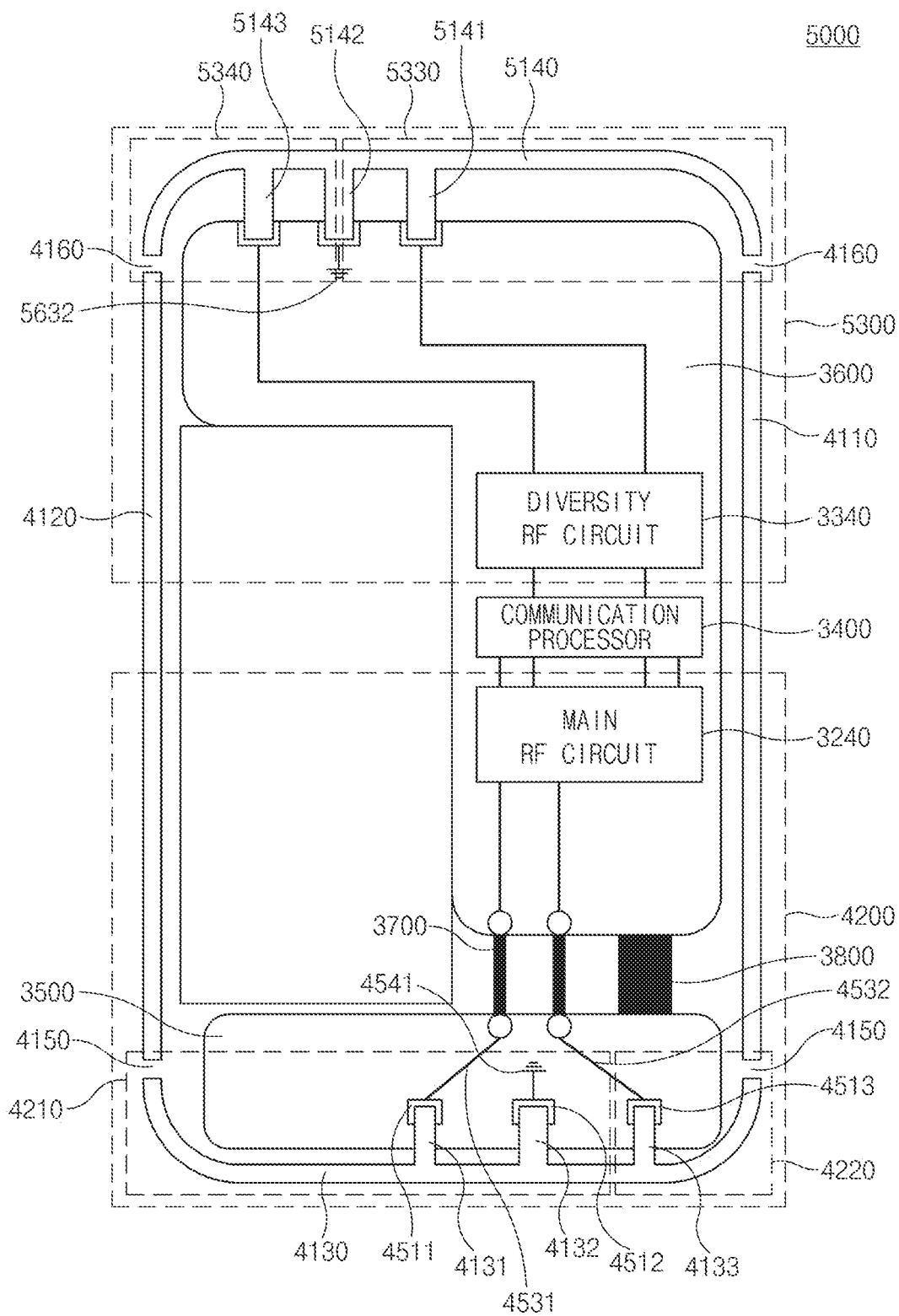
Figure 21C:
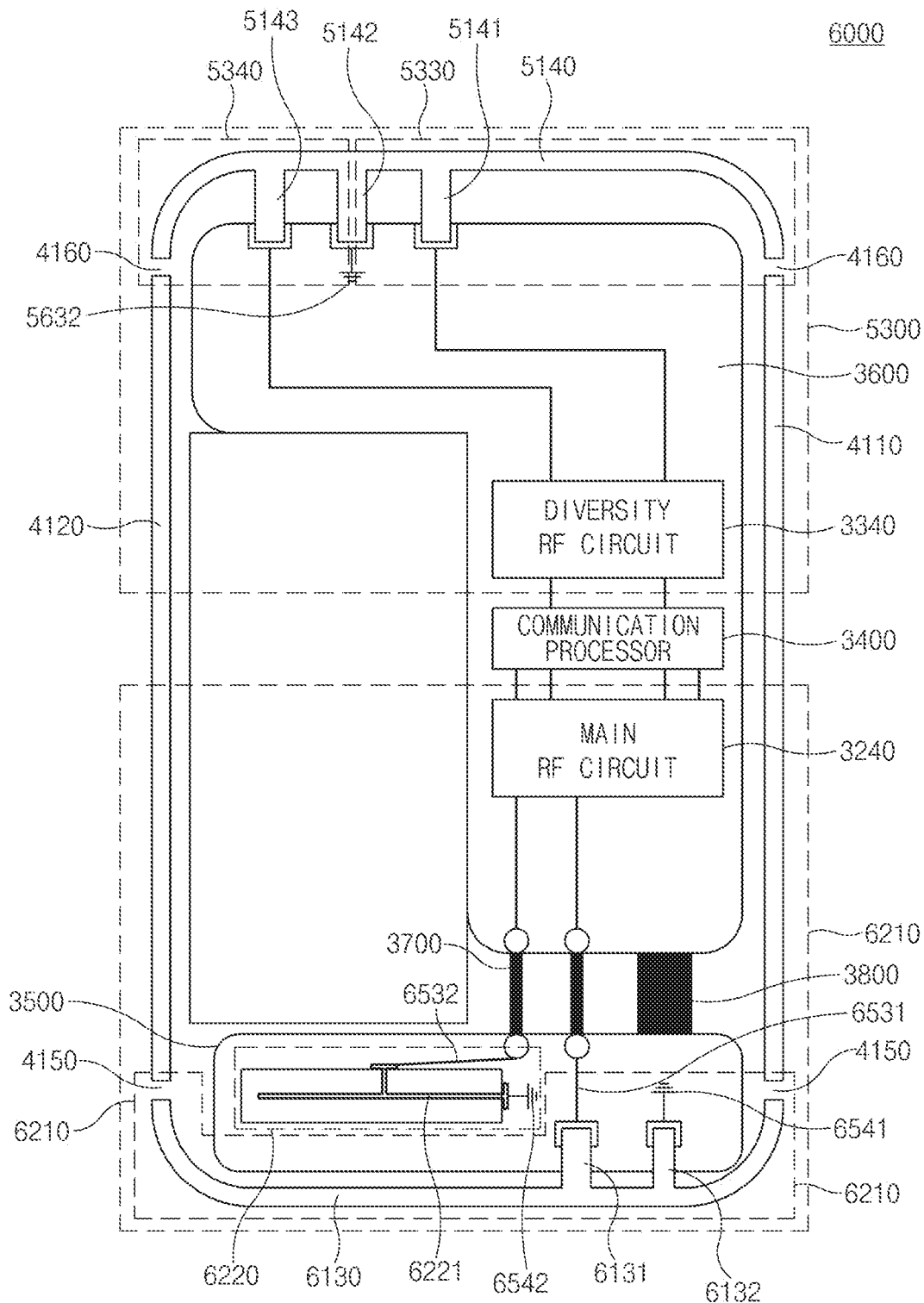

FIGS. 21A to 21C illustrate an internal structure of an electronic device according to an embodiment.

Referring to FIG. 21A, an electronic device may include a metal bezel 4100, and may include a main part 4200, a diversity part 4300, and the communication processor 3400 which are present within the metal bezel 4110 or include a portion of the metal bezel 4110.

According to an embodiment, the metal bezel 4100 may include a right bezel 4110, a left bezel 4120, a lower bezel 4130, and an upper bezel 4140 when viewed from the front of an electronic device 4000. According to an embodiment, the lower bezel 4130 may maintain a state in which the lower bezel 4130 is separated from the right bezel 4110 and the left bezel 4120 by a pair of segments 4150 formed with a given gap. The upper bezel 4140 may maintain a state in which the upper bezel 4140 is separated from the right bezel 4110 and the left bezel 4120 by a pair of segments 4160 formed with a given gap. According to an embodiment, the pairs of segments 4150 and 4160 may be formed of an insulator.

According to various embodiments, the lower bezel 4130 may be integrally formed with a first feeding piece 4131, and the first feeding piece 4131 may be fed by the first feeding part of the sub PCB 3500. According to an embodiment, the first feeding piece 4131 of the lower bezel 4130 may be connected with the first feeding part of the sub PCB 3500 only through an operation in which the sub PCB 3500 is installed on the electronic device 4000 or may be electrically connected with the first feeding part by a separate electrical connection member (e.g., a C-clip or the like).

According to various embodiments, a first feeding pad 4511 may be positioned on the sub PCB 3500, and the first feeding pad 4511 may be electrically connected with the first feeding piece 4131 of the lower bezel 4130. According to an embodiment, a first electrical path 4531 (e.g., a wiring line) may be formed from the first feeding pad 4511 to the first feeding part. A portion of a left side of the lower bezel 4130 may be a first antenna 4210 of the main part 4200 supporting LB or H/MB.

According to various embodiments, the lower bezel 4130 may be integrally formed with a ground piece 4132 at a location spaced from the first feeding piece 4131 by a given distance, and the ground piece 4132 may be grounded to a ground part 4541 of the sub PCB 3500. According to an embodiment, the ground piece 4132 of the lower bezel 4130 may be grounded to the ground part 4541 of the sub PCB 3500 only through an operation in which the sub PCB 3500 is installed on the electronic device 4000 or may be electrically connected with the ground part 4541 by a separate electrical connection member (e.g., a C-clip or the like).

According to various embodiments, the lower bezel 4130 may be integrally formed with a second feeding piece 4133, and the second feeding piece 4133 may be fed by the second feeding part of the sub PCB 3500. According to an embodiment, the second feeding piece 4133 of the lower bezel 4130 may be connected with the second feeding part of the sub PCB 3500 only through an operation in which the sub PCB 3500 is installed on the electronic device 4000 or may be electrically connected with the second feeding part by a separate electrical connection member (e.g., a C-clip or the like).

According to various embodiments, a second feeding pad 4513 may be positioned on the sub PCB 3500, and the second feeding pad 4513 may be electrically connected with the second feeding piece 4133 of the lower bezel 4130. According to an embodiment, a second electrical path 4532 (e.g., a wiring line) may be formed from the second feeding pad 4513 to the second feeding part. A portion of a right side of the lower bezel 4130 may be a second antenna 4220 of the main part 4200 supporting H/MB.

According to various embodiments, a ground pad 4512 may be positioned on the sub PCB 3500, and the ground pad 4512 may be electrically connected with the ground piece 4132 of the lower bezel 4130. According to an embodiment, a third electrical path (e.g., a wiring line) may be formed from the ground pad 4512 to the ground part 4541.

According to an embodiment, the diversity part 4300 may include a third antenna 4330. For example, the third antenna 4330 may include the upper bezel 4140.

According to an embodiment, the third antenna 4330 may support LB and H/MB, or H/MB. A feeding part, a feeding pad, a ground part, and ground pads of the diversity part 4300 may be positioned on the main PCB 3600. Electrical paths for connecting the feeding part and the feeding pad of the diversity part 4300 and electrical paths for connecting the ground part and the ground pad thereof may be positioned on the main PCB 3600.

Referring to FIG. 21B, a diversity part 5300 may include a third antenna 5330 and a fourth antenna 5340. The third antenna 5330 may include a portion of a right side of an upper bezel 5140, and the fourth antenna 5340 may include a portion of a left side of the upper bezel 5140.

According to an embodiment, the upper bezel 5140 may be integrally formed with a first feeding piece 5141, a second feeding piece 5143, and a ground piece 5142. The first feeding piece 5141 and the second feeding piece 5143 may be respectively fed by the first feeding part and the second feeding part of the main PCB 3600. The ground piece 5142 may be grounded to a ground part 5632 of the main PCB 3600. According to an embodiment, the first feeding piece 5141 and the second feeding piece 5143 may be respectively connected with the first feeding part and the second feeding part of the main PCB 3600 only through an operation in which the main PCB 3600 is installed on an electronic device 5000 or may be electrically connected with the first feeding part and the second feeding part by a separate electrical connection member (e.g., a C-clip or the like). According to an embodiment, the ground piece 5142 may be grounded to the ground part 5632 of the main PCB 3600 only through an operation in which the main PCB 3600 is installed on the electronic device 5000 or may be electrically connected with the ground part 5632 by a separate electrical connection member (e.g., a C-clip or the like).

According to an embodiment, the third antenna 5330 may support LB and H/MB, or H/MB, and the fourth antenna 5340 may support H/MB, or LB and H/MB. A feeding part, a feeding pad, a ground part, and ground pads of the diversity part 5300 may be positioned on the main PCB 3600. Electrical paths for connecting the feeding part and the feeding pad of the diversity part 5300 and electrical paths for connecting the ground part and the ground pad thereof may be positioned on the main PCB 3600.

Referring to FIG. 21C, a lower bezel 6130 may be integrally formed with a feeding piece 6131, and the feeding piece 6131 may be fed by the first feeding part of the sub PCB 3500. The feeding piece 6131 may be connected with the first feeding part through a first electrical path 6531 (e.g., a wiring line). According to an embodiment, the feeding piece 6131 of the lower bezel 6130 may be connected with the first feeding part of the sub PCB 3500 only through an operation in which the sub PCB 3500 is installed on an electronic device 6000 or may be electrically connected with the first feeding part by a separate electrical connection member (e.g., a C-clip or the like).

According to various embodiments, the lower bezel 6130 may be integrally formed with a ground piece 6132 at a location spaced from the feeding piece 6131 by a given distance, and the ground piece 6132 may be grounded to a ground part 6541 of the sub PCB 3500. According to an embodiment, the ground piece 6132 of the lower bezel 6130 may be grounded to the ground part 6541 of the sub PCB 3500 only through an operation in which the sub PCB 3500 is installed on the electronic device 6000 or may be electrically connected with the ground part 6541 by a separate electrical connection member (e.g., a C-clip or the like). A portion of a left side of the lower bezel 6130 may be a first antenna 6210 of a main part 6210 supporting LB or H/MB.

According to various embodiments, a conductive pattern 6221 may be fed by the second feeding part of the sub PCB 3500. The conductive pattern 6221 may be connected with the second feeding part through a second electrical path 6532 (e.g., a wiring line). According to an embodiment, the conductive pattern 6221 may be connected with the second feeding part of the sub PCB 3500 only through an operation in which the sub PCB 3500 is installed on the electronic device 6000 or may be electrically connected with the second feeding part by a separate electrical connection member (e.g., a C-clip or the like).

According to various embodiments, the conductive pattern 6221 may be grounded to a ground part 6542 of the sub PCB 3500. According to an embodiment, the conductive pattern 6221 may be grounded to the ground part 6542 of the sub PCB 3500 only through an operation in which the sub PCB 3500 is installed on the electronic device 6000 or may be electrically connected with the ground part 6542 by a separate electrical connection member (e.g., a C-clip or the like). The conductive pattern 6221 may be a second antenna 6220 of the main part 6200 supporting H/MB. The conductive pattern 6221 may be formed on or attached to a dielectric. For example, the conductive pattern 6221 may be attached or formed to or on a structure for supporting a conductive pattern or to or on a housing.

An electronic device according to an embodiment may include a plurality of antennas, and a communication circuit that is electrically connected with the plurality of antennas. The communication circuit may include a plurality of circuits receiving a signal in a first band and may simultaneously receive the signal in the first band through two or more circuits of the plurality of circuits from two or more antennas, which are positioned adjacent to each other, from among the plurality of antennas, and the number of the plurality of antennas may be the same as the number of plurality of circuits.

According to another embodiment, the plurality of circuits may be a plurality of transmitter/receiver circuits which transmit or receive the signal in the first band, the communication circuit may simultaneously transmit or receive the signal in the first band through the plurality of transmitter/receiver circuits from the plurality of antennas, and the number of the plurality of antennas may be the same as the number of plurality of transmitter/receiver circuits.

According to another embodiment, the communication circuit may further include one or more transmitter/receiver circuits that transmit/receive a signal in a second band, and a signal distributer that selectively or simultaneously connects one of the plurality of antennas with one of the plurality of circuits or the one or more transmitter/receiver circuits.

According to another embodiment, the plurality of antennas may include a first antenna and a second antenna, and the communication circuit may include a transmitter/receiver circuit transmitting/receiving the signal in the first band and a receiver circuit receiving the signal in the first band and may simultaneously receive the signal in the first band through the transmitter/receiver circuit and the receiver circuit from the first antenna and the second antenna.

According to another embodiment, the electronic device may further include a switching circuit that defines a connection of the communication circuit with the first antenna and the second antenna.

According to another embodiment, the plurality of antennas may include a first antenna, a second antenna, and a third antenna. The communication circuit may include a first communication circuit electrically connected with the first antenna and the second antenna and a second communication circuit electrically connected with the third antenna. The first communication circuit may include a transmitter/receiver circuit transmitting/receiving the signal in the first band and a receiver circuit receiving the signal in the first band, and may simultaneously receive the signal in the first band through the transmitter/receiver circuit and the receiver circuit of the first communication circuit from the first antenna and the second antenna. The second communication circuit may include a receiver circuit receiving the signal in the first band and may receive the signal in the first band through the receiver circuit of the second communication circuit from the third antenna simultaneously with the first communication circuit.

According to another embodiment, the electronic device may further include a switching circuit that defines a connection of the communication circuit with the first antenna, the second antenna, and the third antenna.

According to another embodiment, the plurality of antennas may include a first antenna, a second antenna, a third antenna, and a fourth antenna. The communication circuit may include a first communication circuit electrically connected with the first antenna and the second antenna and a second communication circuit electrically connected with the third antenna and the fourth antenna. The first communication circuit may include a transmitter/receiver circuit transmitting/receiving the signal in the first band and a receiver circuit receiving the signal in the first band, and may simultaneously receive the signal in the first band through the transmitter/receiver circuit and the receiver circuit from the first antenna and the second antenna. The second communication circuit may include two receiver circuits receiving the signal in the first band and may receive the signal in the first band through the two receiver circuits from the third antenna and the fourth antenna simultaneously with the first communication circuit.

According to another embodiment, the electronic device may further include a switching circuit that defines a connection of the communication circuit with the first antenna, the second antenna, the third antenna, and the fourth antenna.

According to another embodiment, the electronic device may further include a communication processor that controls the communication circuit such that the communication circuit simultaneously receives the signal in the first band from the plurality of antennas.

According to another embodiment, the communication processor may control the communication circuit so as to receive the signal in the first band through one or more antennas of the plurality of antennas based on at least one of a received signal strength indication, a transmit power, or a reflection loss of each of the plurality of antennas.

According to another embodiment, the communication processor may verify the transmit power or the received signal strength indication of each of the plurality of antennas, and may control the communication circuit so as to receive the signal in the first band through one or more antennas of antennas, each of which has the received signal strength indication or the transmit power greater than a specified value.

According to another embodiment, the communication processor may measure a received signal strength indication of an antenna, which is receiving the signal in the first band, from among the plurality of antennas, and may control the communication circuit so as to receive the signal in the first band through the antenna receiving the signal in the first band and another antenna of the plurality of antennas, when the received signal strength indication is smaller than a specified value.

According to another embodiment, the electronic device may further include a grip sensor that detects a contact of an object with the electronic device, and an application processor that is electrically connected with the grip sensor and the communication circuit. The application processor may obtain information about the contact with the electronic device by using the grip sensor, and the communication processor may obtain the information about the contact from the application processor, and may control the communication circuit based on the information about the contact so as to stop a use of an antenna, which is in contact with the object, from among the plurality of antennas.

An electronic device according to an embodiment may include an external housing that includes a first portion, a second portion adjacent to the first portion, a third portion further away from the first portion than the second portion, and a fourth portion adjacent to the third portion, a first antenna radiator that forms at least a portion of the first portion and/or is formed within the housing to be adjacent to the first portion, a second antenna radiator that forms at least a portion of the second portion and/or is formed within the housing to be adjacent to the second portion, a third antenna radiator that forms at least a portion of the third portion and/or is formed within the housing to be adjacent to the third portion, a fourth antenna radiator that forms at least a portion of the fourth portion and/or is formed within the housing to be adjacent to the fourth portion, at least one communication circuit that supports a frequency in a first band and a frequency in a second band lower than the frequency of the first band, a first electrical path that electrically connects the at least one communication circuit and the first antenna radiator and transmits a signal having the frequency in the first band, a second electrical path that electrically connects the at least one communication circuit and the second antenna radiator and simultaneously or selectively transmits a signal having the frequency in the first band or the second band, a third electrical path that electrically connects the at least one communication circuit and the third antenna radiator and simultaneously or selectively transmits a signal having the frequency in the first band or the second band, a fourth electrical path that electrically connects the at least one communication circuit and the fourth antenna radiator and transmits the signal having the frequency in the first band, and a control circuit that receives the signal in the first band through at least two of the first to fourth antenna radiators at least temporarily simultaneously by controlling at least one of the first to fourth electrical paths.

According to another embodiment, a control circuit may receive the signal in the first band at least temporarily simultaneously through at least three of the first to fourth antenna radiators.

According to another embodiment, the second electrical path may be electrically connected with a first port receiving the signal in the first band and a second port transmitting and/or receiving a signal in the second band.

According to another embodiment, the third electrical path may be electrically connected with a third port receiving the signal in the first band and a fourth port receiving the signal in the second band.

According to another embodiment, the communication circuit may support a frequency in a third band that is lower than the frequency in the first band and is higher than the frequency in the second band.

According to another embodiment, the control circuit may control at least one of the first to fourth electrical paths to receive a signal in the third band at least temporarily simultaneously through the first to fourth antenna radiators.

According to another embodiment, the control circuit may include a processor and a memory electrically connected with the processor, and the memory may store instructions that, when executed, cause the processor to control at least one of the first to fourth electrical paths to receive the signal in the first band at least temporarily simultaneously through the first to fourth antenna radiators.

According to another embodiment, the external housing may include a touchscreen display, and may include a first surface having a substantially rectangular shape, a second surface parallel to the first surface, and a side surface surrounding a space between the first surface and the second surface. The side surface may include a first surface which includes a first side extending in a first direction and has a first length, a second side extending in a second direction perpendicular to the first side and having a second length longer than the first length, a third side extending in the first direction and having the first length, and a fourth side extending in the second direction and having the second length. The first portion and the second portion may extend along at least a portion of the first side, and the third portion and the fourth portion may extend along at least a portion of the third side.

According to another embodiment, the first portion may extend from a first point positioned at the first side to a second point positioned at the first side, and the second portion may extend from the second point or a vicinity of the second point to a third point positioned at the fourth side.

According to another embodiment, the third portion may extend from a fourth point positioned at the third side to a fifth point positioned at the third side.

According to another embodiment, the fourth portion may extend from the fifth point or a vicinity of the fifth point to a sixth point positioned at the second side or the fourth side, and the sixth point may be closer to the third side than the third point.

An electronic device according to an embodiment may include an external housing that includes a first portion, a second portion adjacent to the first portion, a third portion further away from the first portion than the second portion, a first antenna radiator that forms at least a portion of the first portion and/or is formed within the housing to be adjacent to the first portion, a second antenna radiator that forms at least a portion of the second portion and/or is formed within the housing to be adjacent to the second portion, a third antenna radiator that forms at least a portion of the third portion and/or is formed within the housing to be adjacent to the third portion, at least one communication circuit that supports a frequency in a first band and a frequency in a second band lower than the frequency of the first band, a first electrical path that electrically connects the at least one communication circuit and the first antenna radiator and transmits a signal having the frequency in the first band, a second electrical path that electrically connects the at least one communication circuit and the second antenna radiator and simultaneously or selectively transmits a signal having the frequency in the first band or the second band, a third electrical path that electrically connects the at least one communication circuit and the third antenna radiator and simultaneously or selectively transmits a signal having the frequency in the first band or the second band, and a control circuit that receives the signal in the first band through at least two of the first to third antenna radiators at least temporarily simultaneously by controlling at least one of the first to third electrical paths.

According to another embodiment, the external housing may include a touchscreen display, and may include a first surface having a substantially rectangular shape, a second surface parallel to the first surface, and a side surface surrounding a space between the first surface and the second surface. The side surface may include a first surface which includes a first side extending in a first direction and has a first length, a second side extending in a second direction perpendicular to the first side and having a second length longer than the first length, a third side extending in the first direction and having the first length, and a fourth side extending in the second direction and having the second length. The first portion and the second portion may extend along at least a portion of the first side, and the third portion may extend along at least a portion of the third side.

According to another embodiment, the first portion may extend from a first point positioned at the second side to a second point positioned at the first side, and the second portion may extend from the second point or a vicinity of the second point to a third point positioned at the fourth side.

According to another embodiment, the third portion may extend from a fourth point positioned at the second side to a fifth point positioned at the fourth side, the fourth portion may be closer to the third side than the first point, and the fifth point may be closer to the third side than the third point.

According to another embodiment, the first portion may extend from a first point positioned at the first side to a second point positioned at the first side, and the second portion may extend from the second point or a vicinity of the second point to a third point positioned at the fourth side.

According to another embodiment, the third portion may extend from a fourth point positioned at the third side to a fifth point positioned at the third point.

According to another embodiment, the first band may range from 2.3 GHz to 2.7 GHz, the second band may range from 600 MHz to 900 MHz, and the third band may range from 1.7 GHz to 2.1 GHz.

According to another embodiment, the first antenna radiator and the second antenna radiator may transmit or receive the signal in the first band at least temporarily simultaneously, and the third antenna radiator may receive the signal in the first band at least temporarily simultaneously with the first antenna radiator and the second antenna radiator.

Figure 22:
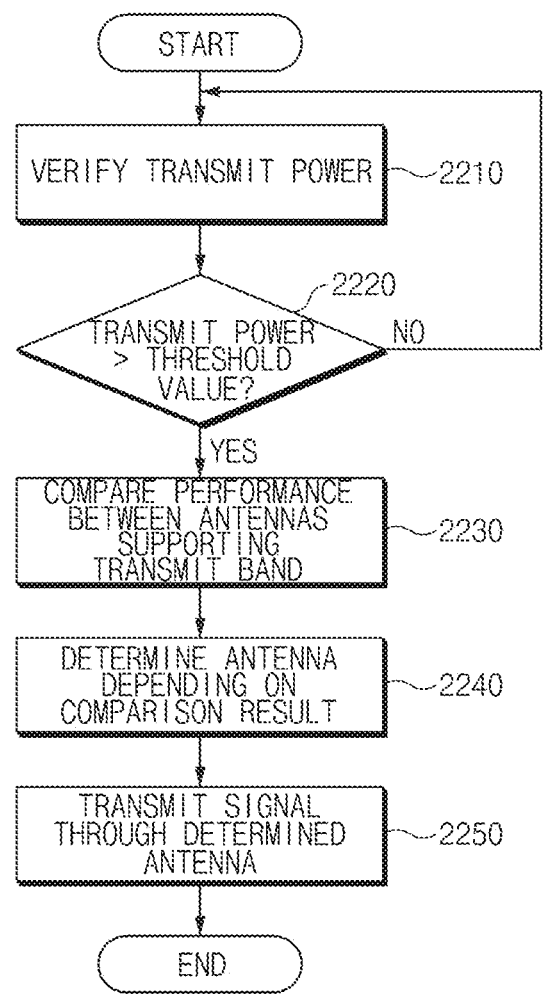
FIG. 22 is a flowchart for describing an antenna selecting method of an electronic device according to an embodiment.

FIG. 22 is a flowchart for describing an antenna selecting method of an electronic device according to an embodiment.

According to various embodiments, an electronic device may receive a signal in a first band through one or more antennas of a plurality of antennas based on performance associated with a received signal strength indication, a transmit power, or a reflection loss of each of the plurality of antennas.

In operation 2210, the electronic device (e.g., a control circuit included in the electronic device 2601 or the electronic device 2701) may verify a transmit power. For example, the electronic device may verify the transmit power associated with a signal to be transmitted by one antenna, which will transmit the signal, from among the plurality of antennas. In operation 2220, the electronic device (e.g., a control circuit included in the electronic device 2601 or the electronic device 2701) may determine whether the transmit power exceeds a threshold value. For example, the electronic device may determine whether a transmit power of an antenna which will transmit a signal exceeds a specified threshold value. In the case where the transmit power of the antenna which will transmit the signal is greater than the threshold value, the electronic device may perform the following operations.

In the case where the verification result of operation 2220 indicates that the transmit power is greater than the threshold value, in operation 2230, the electronic device (e.g., a control circuit included in the electronic device 2601 or the electronic device 2701) may perform an antenna performance comparing operation. For example, the electronic device may compare performance of an antenna which supports a transmit band. For example, the electronic device may compare performance of a first antenna and a third antenna. The electronic device may compare the performance of the first antenna and the third antenna by measuring a received signal strength indication (RSSI), a received signal code power (RSCP), or a reflection loss of first antenna and the third antenna.

In operation 2240, the electronic device (e.g., a control circuit included in the electronic device 2601 or the electronic device 2701) may perform an antenna determining operation. For example, the electronic device may determine an antenna to be used, based on the comparison result. For example, the electronic device may determine an antenna, which has higher performance, from among the first antenna and the third antenna as an antenna to be used. For example, the electronic device may determine the first antenna having a higher RSSI as an antenna to be used.

In operation 2250, the electronic device (e.g., a control circuit included in the electronic device 2601 or the electronic device 2701) may perform a signal transmitting operation. For example, the electronic device may connect the to-be-used antenna thus determined with a communication circuit. For example, the electronic device may electrically connect the first antenna and the communication circuit by controlling a switch, a switching circuit, or the like. Through the first antenna, the electronic device may receive a signal and may transmit a signal.

Operation 2210 to operation 2250 are described as the electronic device verifies the transmit power and determines whether the transmit power is not smaller than the threshold value. However, the present disclosure is not limited thereto. For example, the electronic device may determine whether various factors such as a received signal strength indication, a reflection coefficient, and the like are not smaller than the threshold value.

A lot of power may be consumed to measure a received signal strength indication, reflection loss, or the like for comparing antenna performance. As described above, power consumption for performance comparison may be reduced by performing a comparison operation on only an antenna, the transmit power of which is greater than a specified threshold value.

Figure 23:
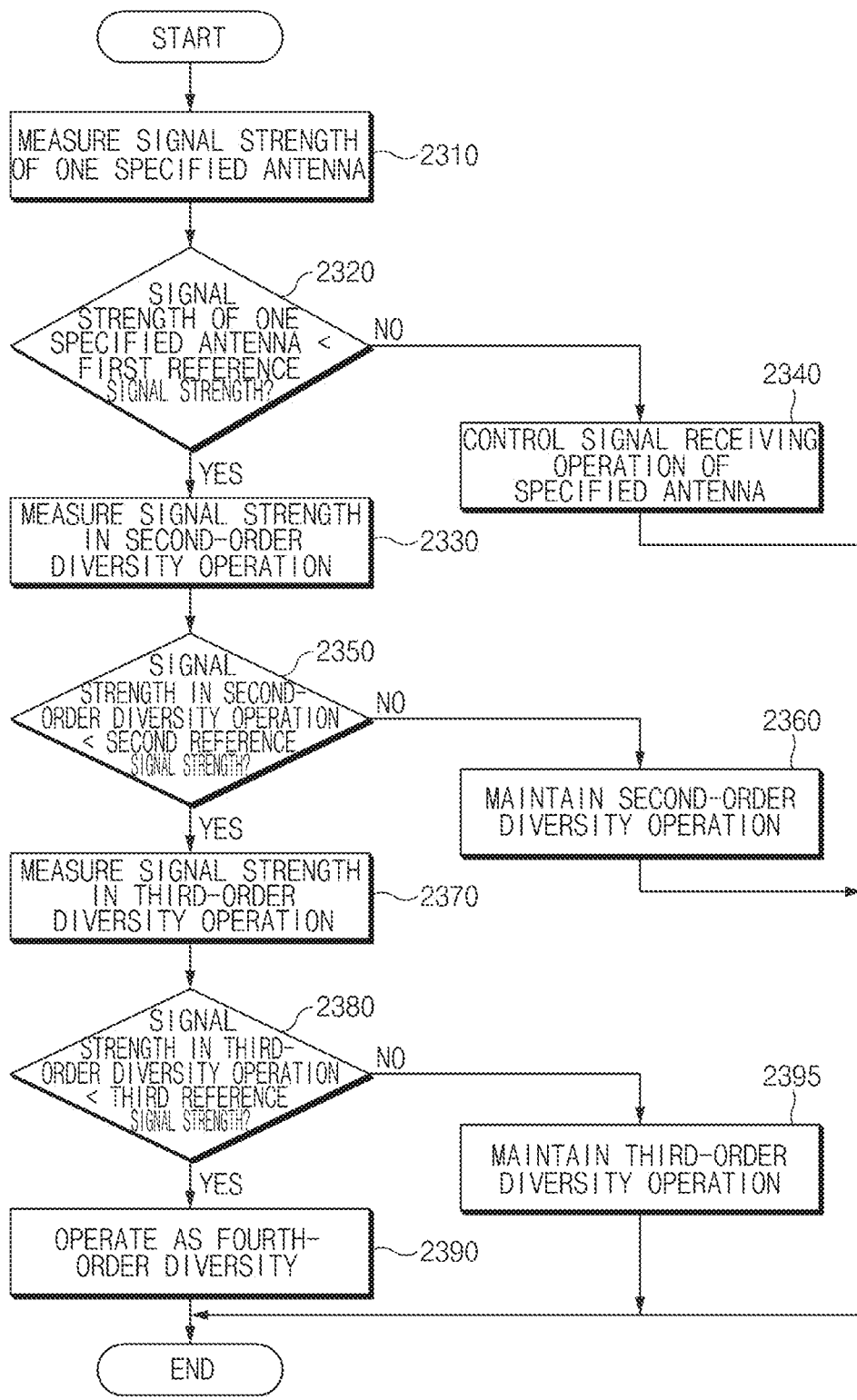
FIG. 23 is a flowchart for describing an antenna selecting method of an electronic device according to an embodiment.

FIG. 23 is a flowchart for describing an antenna selecting method of an electronic device according to an embodiment.

According to various embodiments, an electronic device may measure a received signal strength of an antenna, which is receiving a signal in a first band, from among a plurality of antennas; in the case where the received signal strength is smaller than a specified value, the electronic device may receive the signal in the first band through the antenna receiving the signal in the first band and another antenna of the plurality of antennas.

Referring to FIG. 23, in operation 2310, the electronic device (e.g., a control circuit included in the electronic device 2601 or the electronic device 2701) may perform a signal strength measuring operation. For example, the electronic device may measure the received signal strength of the operating antenna. For example, in the case where the electronic device performs communication by using a first antenna, the electronic device may measure the received signal strength of the first antenna.

In operation 2320, the electronic device (e.g., a control circuit included in the electronic device 2601 or the electronic device 2701) may perform a signal strength comparing operation. For example, the electronic device may determine whether the measured received signal strength is lower than a first reference signal strength. For example, the electronic device may determine whether the measured received signal strength of the first antenna is lower than the first reference signal strength.

In the case where the comparison result of operation 2320 indicates that the received signal strength is lower than the first reference signal strength, in operation 2330, the electronic device (e.g., a control circuit included in the electronic device 2601 or the electronic device 2701) may perform a signal strength measuring operation. For example, the electronic device may measure the received signal strength of the antenna which is operating, after operating the antenna as a second-order diversity. The electronic device may enable two antennas by additionally operating one antenna and may then measure the received signal strength of each of the two antennas. For example, the electronic device may control a communication circuit so as to simultaneously receive signals in the same band through the first antenna and the second antenna. The electronic device may measure the received signal strength of each of the first antenna and the second antenna.

In the case where the comparison result of operation 2320 indicates that the received signal strength is higher than the first reference signal strength, in operation 2340, the electronic device (e.g., a control circuit included in the electronic device 2601 or the electronic device 2701) may perform a signal receiving operation. For example, the electronic device may maintain an operation of an antenna. For example, in the case where the received signal strength of the first antenna is higher than the first reference signal strength, the electronic device may perform communication only by using the first antenna.

In operation 2350, the electronic device (e.g., a control circuit included in the electronic device 2601 or the electronic device 2701) may perform a signal strength comparing operation. For example, the electronic device may determine whether the measured received signal strength is lower than a second reference signal strength. For example, the electronic device may determine whether the measured received signal strength of the first antenna and the second antenna is lower than the second reference signal strength. The second reference signal strength may be, for example, lower than the first reference signal strength.

In the case where the comparison result of operation 2350 indicates that the received signal strength is lower than the second reference signal strength, in operation 2370, the electronic device (e.g., a control circuit included in the electronic device 2601 or the electronic device 2701) may perform a signal strength measuring operation. For example, the electronic device may measure the received signal strength of the antenna which is operating, after operating the antenna as a third-order diversity. For example, the electronic device may control a communication circuit so as to simultaneously receive signals in the same band through the first antenna, the second antenna, and a third antenna. The electronic device may measure the received signal strength of each of the first antenna, the second antenna, and the third antenna.

In the case where the comparison result of operation 2350 indicates that the received signal strength is higher than the second reference signal strength, in operation 2360, the electronic device (e.g., a control circuit included in the electronic device 2601 or the electronic device 2701) may maintain the second-order diversity operation of the antenna.

In operation 2380, the electronic device (e.g., a control circuit included in the electronic device 2601 or the electronic device 2701) may perform a signal strength comparing operation. For example, the electronic device may determine whether the measured received signal strength is lower than a third reference signal strength. For example, the electronic device may determine whether the measured received signal strength of the first antenna, the second antenna, and the third antenna is lower than the third reference signal strength. The third reference signal strength may be, for example, lower than the second reference signal strength.

In the case where the comparison result of operation 2380 indicates that the received signal strength is lower than the third reference signal strength, in operation 2390, the electronic device (e.g., a control circuit included in the electronic device 2601 or the electronic device 2701) may perform a fourth-order diversity operation. For example, the electronic device may measure the received signal strength of the antenna which is operating, after operating the antenna as a fourth-order diversity. For example, the electronic device may control the communication circuit so as to simultaneously receive signals in the same band through the first antenna, the second antenna, the third antenna, and a fourth antenna.

In the case where the comparison result of operation 2380 indicates that the received signal strength is higher than the third reference signal strength, in operation 2395, the electronic device (e.g., a control circuit included in the electronic device 2601 or the electronic device 2701) may maintain the third-order diversity operation of the antenna.

In the case where signals are transmitted or received by using four antennas at the same time, an excessive power may be consumed. As described above, the power may be efficiently used by using an additional antenna after seizing a communication state of an operating antenna by using the received signal strength.

Figure 24:
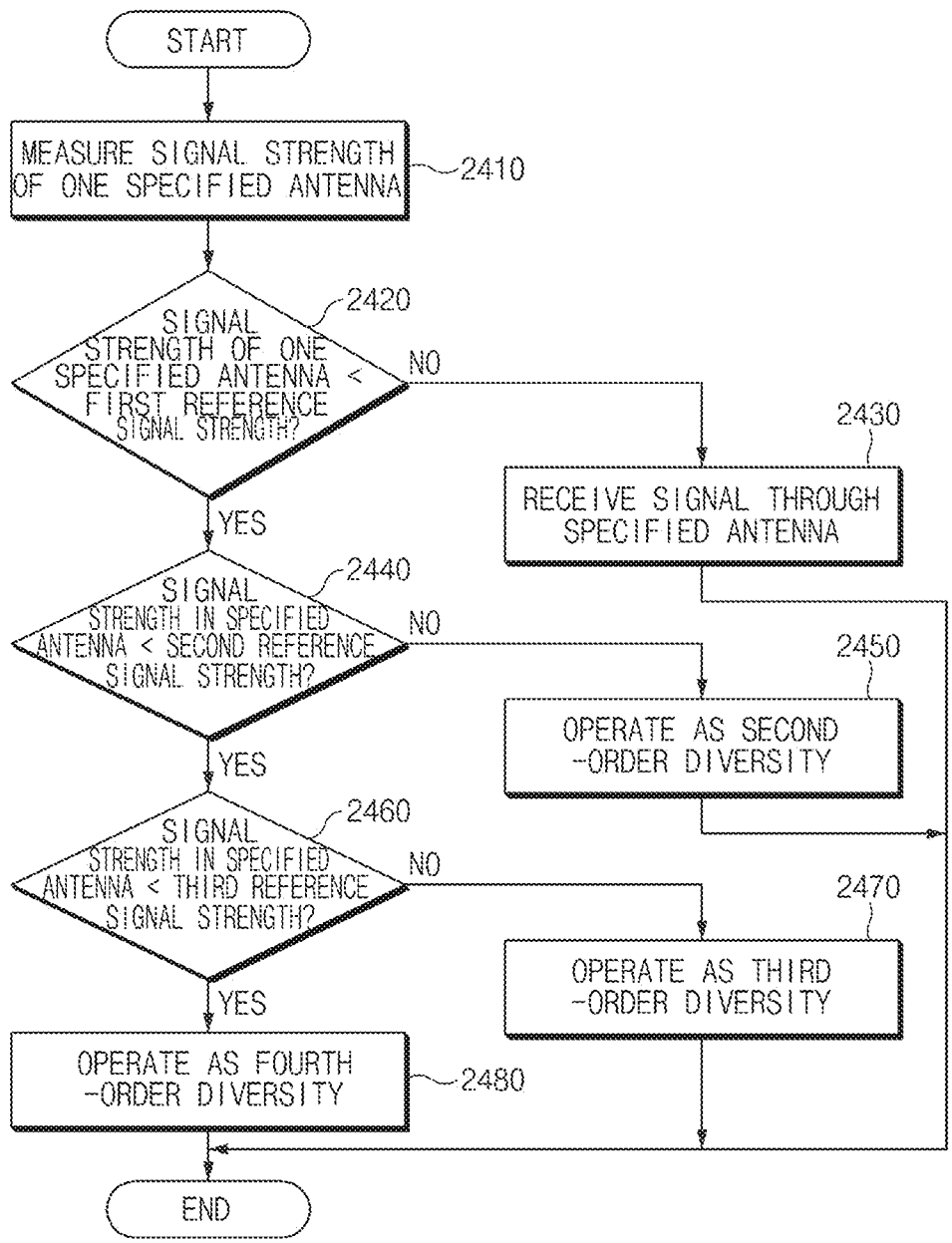
FIG. 24 is a flowchart for describing an antenna selecting method of an electronic device according to an embodiment.

FIG. 24 is a flowchart for describing an antenna selecting method of an electronic device according to an embodiment. For convenience of description, the description given with reference to FIG. 23 will not be repeated here.

Referring to FIG. 24, in operation 2410, an electronic device (e.g., a control circuit included in the electronic device 2601 or the electronic device 2701) may measure a received signal strength of a signal received by a specified antenna. For example, the electronic device may measure the received signal strength of an operating antenna.

In operation 2420, the electronic device (e.g., a control circuit included in the electronic device 2601 or the electronic device 2701) may perform a signal strength comparing operation. For example, the electronic device may determine whether the measured received signal strength is lower than a first reference signal strength.

In the case where the comparison result of operation 2420 indicates that the received signal strength is higher than the first reference signal strength, in operation 2430, the electronic device (e.g., a control circuit included in the electronic device 2601 or the electronic device 2701) may maintain an operation of the antenna.

In the case where the comparison result of operation 2420 indicates that the received signal strength is lower than the first reference signal strength, in operation 2440, the electronic device (e.g., a control circuit included in the electronic device 2601 or the electronic device 2701) may perform a signal strength measuring operation. For example, the electronic device may determine whether the measured received signal strength is lower than a second reference signal strength.

In the case where the comparison result of operation 2440 indicates that the received signal strength is higher than the second reference signal strength, in operation 2450, the electronic device (e.g., a control circuit included in the electronic device 2601 or the electronic device 2701) may operate the antenna as a second-order diversity.

In the case where the comparison result of operation 2440 indicates that the received signal strength is lower than the second reference signal strength, in operation 2460, the electronic device (e.g., a control circuit included in the electronic device 2601 or the electronic device 2701) may perform a signal strength measuring operation. For example, the electronic device may determine whether the measured received signal strength is lower than a third reference signal strength.

In the case where the comparison result of operation 2460 indicates that the received signal strength is higher than the third reference signal strength, in operation 2470, the electronic device (e.g., a control circuit included in the electronic device 2601 or the electronic device 2701) may operate the antenna as a third-order diversity.

In the case where the comparison result of operation 2460 indicates that the received signal strength is lower than the third reference signal strength, in operation 2480, the electronic device (e.g., a control circuit included in the electronic device 2601 or the electronic device 2701) may operate the antenna as a fourth-order diversity.

Figure 25A:
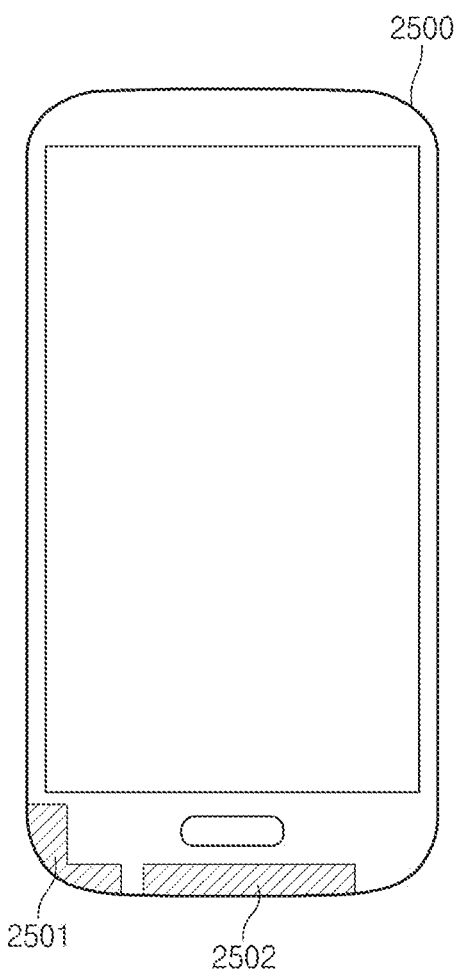
FIG. 25A illustrates a location of an antenna included in an electronic device according to an embodiment.
Figure 25B:
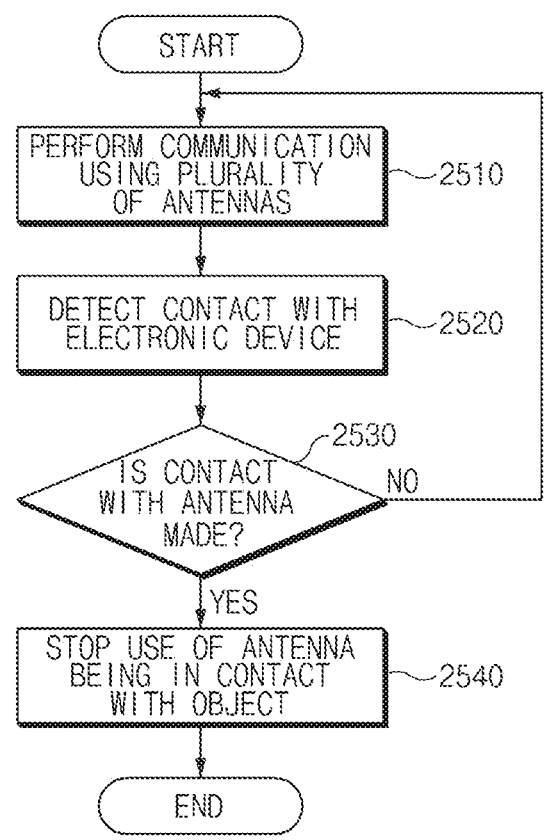
FIG. 25B is a flowchart for describing an antenna selecting method of an electronic device according to an embodiment.

FIG. 25A illustrates a location of an antenna included in an electronic device according to an embodiment. FIG. 25B is a flowchart for describing an antenna selecting method of an electronic device according to an embodiment.

According to various embodiments, an electronic device may include a grip sensor which detects a contact of an object, and an application processor which is electrically connected with the grip sensor and a communication processor. The application processor may obtain information about a contact with the electronic device through the grip sensor. For example, in the case where a skin of the user is in contact with a metal housing being a radiator of a plurality of antennas, the application processor may obtain information about a point, with which the user's skin is in contact, through the grip sensor. The application processor may transmit the information about the contact to the communication processor. The communication processor may obtain the information about the contact from the application processor, and may block a connection of the communication circuit with a part of the plurality of antennas based on the information about the contact. For example, in the case where the point with which the user's skin is in contact corresponds to a radiator of a first antenna, the communication processor may stop communication using the first antenna. For another example, the communication processor may identify an antenna, the communication efficiency of which is reduced at a time when the contact is recognized and may stop communication using the identified antenna.

Referring to FIGS. 25A and 25B, in operation 2510, the electronic device (e.g., a control circuit included in the electronic device 2601 or the electronic device 2701) may perform communication. For example, the electronic device may perform communication by using a plurality of antennas. For example, the electronic device may transmit/receive a signal by using a first antenna 2501 and a second antenna 2502.

In operation 2520, the electronic device (e.g., a control circuit included in the electronic device 2601 or the electronic device 2701) may perform a contact detecting operation. For example, the electronic device may detect a contact of an object with the electronic device by using the grip sensor. The electronic device may obtain information about the contact with the electronic device. For example, the electronic device may obtain information about a point on the electronic device, with which a skin of the user is in contact.

In operation 2530, the electronic device (e.g., a control circuit included in the electronic device 2601 or the electronic device 2701) may perform an operation of determining whether a contact is made. For example, the electronic device may determine whether an object is in contact with one or more antennas of the plurality of antennas, based on the information about the contact. For example, the electronic device may determine whether an object is in contact with the first antenna 2501 and/or the second antenna 2502. For example, the electronic device may determine whether an object is in contact with an antenna positioned at a touched point, based on the information about the touched point. For another example, the electronic device may determine that an object is in contact with an antenna, the communication efficiency of which is reduced at a time when the contact is recognized.

In the case where the determination result of operation 2530 indicates that an object is in contact with one or more antennas of the plurality of antennas, in operation 2540, the electronic device (e.g., a control circuit included in the electronic device 2601 or the electronic device 2701) may perform an operation of stopping the use of an antenna. For example, the electronic device may stop the use of the antenna with which an object is in contact. For example, in the case where the user's skin is in contact with the second antenna 2502 of the first antenna 2501 and the second antenna 2502, the electronic device may stop the use of the second antenna 2502 and may perform communication by using the first antenna 2501.

In the case where the determination result of operation 2530 indicates that an object is not in contact with an antenna, the electronic device may maintain the use of the plurality of antennas.

As described above, as the use of an antenna, the performance of which is reduced by a contact of an object, is stopped, the communication efficiency may not be reduced, and simultaneously, a power needed for communication may be reduced.

FIG. 26 illustrates an electronic device in a network environment system, according to various embodiments.

Referring to FIG. 26, according to various embodiments, an electronic device 2601, 2602, or 2604, or a server 2606 may be connected each other over a network 2662 or a short range communication 2664. The electronic device 2601 may include a bus 2610, a processor 2620, a memory 2630, an input/output interface 2650, a display 2660, and a communication interface 2670. According to an embodiment, the electronic device 2601 may not include at least one of the above-described components or may further include other component(s).

For example, the bus 2610 may interconnect the above-described components 2620 to 2670 and may include a circuit for conveying communications (e.g., a control message and/or data) among the above-described components.

The processor 2620 may include one or more of a central processing unit (CPU), an application processor (AP), or a communication processor (CP). For example, the processor 2620 may perform an arithmetic operation or data processing associated with control and/or communication of at least other components of the electronic device 2601.

The memory 2630 may include a volatile and/or nonvolatile memory. For example, the memory 2630 may store commands or data associated with at least one other component(s) of the electronic device 2601. According to an embodiment, the memory 2630 may store software and/or a program 2640. The program 2640 may include, for example, a kernel 2641, a middleware 2643, an application programming interface (API) 2645, and/or an application program (or "an application") 2647. At least a part of the kernel 2641, the middleware 2643, or the API 2645 may be referred to as an "operating system (OS)".

For example, the kernel 2641 may control or manage system resources (e.g., the bus 2610, the processor 2620, the memory 2630, and the like) that are used to execute operations or functions of other programs (e.g., the middleware 2643, the API 2645, and the application program 2647). Furthermore, the kernel 2641 may provide an interface that allows the middleware 2643, the API 2645, or the application program 2647 to access discrete components of the electronic device 2601 so as to control or manage system resources.

The middleware 2643 may perform, for example, a mediation role such that the API 2645 or the application program 2647 communicates with the kernel 2641 to exchange data.

Furthermore, the middleware 2643 may process task requests received from the application program 2647 according to a priority. For example, the middleware 2643 may assign the priority, which makes it possible to use a system resource (e.g., the bus 2610, the processor 2620, the memory 2630, or the like) of the electronic device 2601, to at least one of the application program 2647. For example, the middleware 2643 may process the one or more task requests according to the priority assigned to the at least one, which makes it possible to perform scheduling or load balancing on the one or more task requests.

The API 2645 may be, for example, an interface through which the application program 2647 controls a function provided by the kernel 2641 or the middleware 2643, and may include, for example, at least one interface or function (e.g., an instruction) for a file control, a window control, image processing, a character control, or the like.

The input/output interface 2650 may play a role, for example, of an interface which transmits a command or data input from a user or another external device, to other component(s) of the electronic device 2601. Furthermore, the input/output interface 2650 may output a command or data, received from other component(s) of the electronic device 2601, to a user or another external device.

The display 2660 may include, for example, a liquid crystal display (LCD), a light-emitting diode (LED) display, an organic LED (OLED) display, a microelectromechanical systems (MEMS) display, or an electronic paper display. The display 2660 may display, for example, various contents (e.g., a text, an image, a video, an icon, a symbol, and the like) to a user. The display 2660 may include a touch screen and may receive, for example, a touch, gesture, proximity, or hovering input using an electronic pen or a part of a user's body.

For example, the communication interface 2670 may establish communication between the electronic device 2601 and an external device (e.g., the first external electronic device 2602, the second external electronic device 2604, or the server 2606). For example, the communication interface 2670 may be connected to the network 2662 over wireless communication or wired communication to communicate with the external device (e.g., the second external electronic device 2604 or the server 2606).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 2664. The short range communication 2664 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 2601 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 2662 may include at least one of telecommunications networks, for example, a computer network (e.g., LAN or WAN), an Internet, or a telephone network.

Each of the first and second external electronic devices 2602 and 2604 may be a device of which the type is different from or the same as that of the electronic device 2601. According to an embodiment, the server 2606 may include a group of one or more servers. According to various embodiments, all or a portion of operations that the electronic device 2601 will perform may be executed by another or plural electronic devices (e.g., the electronic device 2602 or 2604 or the server 2606). According to an embodiment, in the case where the electronic device 2601 executes any function or service automatically or in response to a request, the electronic device 2601 may not perform the function or the service internally, but, alternatively additionally, it may request at least a portion of a function associated with the electronic device 2601 from another device (e.g., the electronic device 2602 or 2604 or the server 2606). The other electronic device may execute the requested function or additional function and may transmit the execution result to the electronic device 2601. The electronic device 2601 may provide the requested function or service using the received result or may additionally process the received result to provide the requested function or service. To this end, for example, cloud computing, distributed computing, or client-server computing may be used.

FIG. 27 illustrates a block diagram of an electronic device, according to various embodiments.

Referring to FIG. 27, an electronic device 2701 may include, for example, all or a part of the electronic device 2601 illustrated in FIG. 26. The electronic device 2701 may include one or more processors (e.g., an application processor (AP)) 2710, a communication module 2720, a subscriber identification module 2729, a memory 2730, a sensor module 2740, an input device 2750, a display 2760, an interface 2770, an audio module 2780, a camera module 2791, a power management module 2795, a battery 2796, an indicator 2797, and a motor 2798.

The processor 2710 may drive, for example, an operating system (OS) or an application to control a plurality of hardware or software components connected to the processor 2710 and may process and compute a variety of data. For example, the processor 2710 may be implemented with a System on Chip (SoC). According to an embodiment, the processor 2710 may further include a graphic processing unit (GPU) and/or an image signal processor. The processor 2710 may include at least a part (e.g., a cellular module 2721) of components illustrated in FIG. 27. The processor 2710 may load a command or data, which is received from at least one of other components (e.g., a nonvolatile memory), into a volatile memory and process the loaded command or data. The processor 2710 may store a variety of data in the nonvolatile memory.

The communication module 2720 may be configured the same as or similar to the communication interface 2670 of FIG. 26. The communication module 2720 may include the cellular module 2721, a Wi-Fi module 2722, a Bluetooth (BT) module 2723, a GNSS module 2724 (e.g., a GPS module, a Glonass module, a Beidou module, or a Galileo module), a near field communication (NFC) module 2725, a MST module 2726 and a radio frequency (RF) module 2727.

The cellular module 2721 may provide, for example, voice communication, video communication, a character service, an Internet service, or the like over a communication network. According to an embodiment, the cellular module 2721 may perform discrimination and authentication of the electronic device 2701 within a communication network by using the subscriber identification module (e.g., a SIM card) 2729. According to an embodiment, the cellular module 2721 may perform at least a portion of functions that the processor 2710 provides. According to an embodiment, the cellular module 2721 may include a communication processor (CP).

Each of the Wi-Fi module 2722, the BT module 2723, the GNSS module 2724, the NFC module 2725, or the MST module 2726 may include a processor for processing data exchanged through a corresponding module, for example. According to an embodiment, at least a part (e.g., two or more) of the cellular module 2721, the Wi-Fi module 2722, the BT module 2723, the GNSS module 2724, the NFC module 2725, or the MST module 2726 may be included within one Integrated Circuit (IC) or an IC package.

For example, the RF module 2727 may transmit and receive a communication signal (e.g., an RF signal). For example, the RF module 2727 may include a transceiver, a power amplifier module (PAM), a frequency filter, a low noise amplifier (LNA), an antenna, or the like. According to another embodiment, at least one of the cellular module 2721, the Wi-Fi module 2722, the BT module 2723, the GNSS module 2724, the NFC module 2725, or the MST module 2726 may transmit and receive an RF signal through a separate RF module.

The subscriber identification module 2729 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 2730 (e.g., the memory 2630) may include an internal memory 2732 or an external memory 2734. For example, the internal memory 2732 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 2734 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 2734 may be operatively and/or physically connected to the electronic device 2701 through various interfaces.

A security module 2736 may be a module that includes a storage space of which a security level is higher than that of the memory 2730 and may be a circuit that guarantees safe data storage and a protected execution environment. The security module 2736 may be implemented with a separate circuit and may include a separate processor. For example, the security module 2736 may be in a smart chip or a secure digital (SD) card, which is removable, or may include an embedded secure element (eSE) embedded in a fixed chip of the electronic device 2701. Furthermore, the security module 2736 may operate based on an operating system (OS) that is different from the OS of the electronic device 2701. For example, the security module 2736 may operate based on java card open platform (JCOP) OS.

The sensor module 2740 may measure, for example, a physical quantity or may detect an operation state of the electronic device 2701. The sensor module 2740 may convert the measured or detected information to an electric signal. For example, the sensor module 2740 may include at least one of a gesture sensor 2740A, a gyro sensor 2740B, a barometric pressure sensor 2740C, a magnetic sensor 2740D, an acceleration sensor 2740E, a grip sensor 2740F, the proximity sensor 2740G, a color sensor 2740H (e.g., red, green, blue (RGB) sensor), a biometric sensor 2740I, a temperature/humidity sensor 2740J, an illuminance sensor 2740K, or an UV sensor 2740M. Although not illustrated, additionally or alternatively, the sensor module 2740 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2740 may further include a control circuit for controlling at least one or more sensors included therein. According to an embodiment, the electronic device 2701 may further include a processor that is a part of the processor 2710 or independent of the processor 2710 and is configured to control the sensor module 2740. The processor may control the sensor module 2740 while the processor 2710 remains at a sleep state.

The input device 2750 may include, for example, a touch panel 2752, a (digital) pen sensor 2754, a key 2756, or an ultrasonic input unit 2758. For example, the touch panel 2752 may use at least one of capacitive, resistive, infrared and ultrasonic detecting methods. Also, the touch panel 2752 may further include a control circuit. The touch panel 2752 may further include a tactile layer to provide a tactile reaction to a user.

The (digital) pen sensor 2754 may be, for example, a part of a touch panel or may include an additional sheet for recognition. The key 2756 may include, for example, a physical button, an optical key, a keypad, or the like. The ultrasonic input device 2758 may detect (or sense) an ultrasonic signal, which is generated from an input device, through a microphone (e.g., a microphone 2788) and may check data corresponding to the detected ultrasonic signal.

The display 2760 (e.g., the display 2660) may include a panel 2762, a hologram device 2764, or a projector 2766. The panel 2762 may be the same as or similar to the display 2660 illustrated in FIG. 26. The panel 2762 may be implemented, for example, to be flexible, transparent or wearable. The panel 2762 and the touch panel 2752 may be integrated into a single module. The hologram device 2764 may display a stereoscopic image in a space using a light interference phenomenon. The projector 2766 may project light onto a screen so as to display an image. For example, the screen may be arranged in the inside or the outside of the electronic device 2701. According to an embodiment, the display 2760 may further include a control circuit for controlling the panel 2762, the hologram device 2764, or the projector 2766.

The interface 2770 may include, for example, a high-definition multimedia interface (HDMI) 2772, a universal serial bus (USB) 2774, an optical interface 2776, or a D-subminiature (D-sub) 2778. The interface 2770 may be included, for example, in the communication interface 2670 illustrated in FIG. 26. Additionally or alternatively, the interface 2770 may include, for example, a mobile high definition link (MHL) interface, a SD card/multi-media card (MMC) interface, or an infrared data association (IrDA) standard interface.

The audio module 2780 may convert a sound and an electric signal in dual directions. At least a component of the audio module 2780 may be included, for example, in the input/output interface 2650 illustrated in FIG. 26. The audio module 2780 may process, for example, sound information that is input or output through a speaker 2782, a receiver 2784, an earphone 2786, or the microphone 2788.

For example, the camera module 2791 may shoot a still image or a video. According to an embodiment, the camera module 2791 may include at least one or more image sensors (e.g., a front sensor or a rear sensor), a lens, an image signal processor (ISP), or a flash (e.g., an LED or a xenon lamp).

The power management module 2795 may manage, for example, power of the electronic device 2701. According to an embodiment, a power management integrated circuit (PMIC), a charger IC, or a battery or fuel gauge may be included in the power management module 2795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 2796 and a voltage, current or temperature thereof while the battery is charged. The battery 2796 may include, for example, a rechargeable battery and/or a solar battery.

The indicator 2797 may display a specific state of the electronic device 2701 or a part thereof (e.g., the processor 2710), such as a booting state, a message state, a charging state, and the like. The motor 2798 may convert an electrical signal into a mechanical vibration and may generate the following effects: vibration, haptic, and the like. Although not illustrated, a processing device (e.g., a GPU) for supporting a mobile TV may be included in the electronic device 2701. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 28:
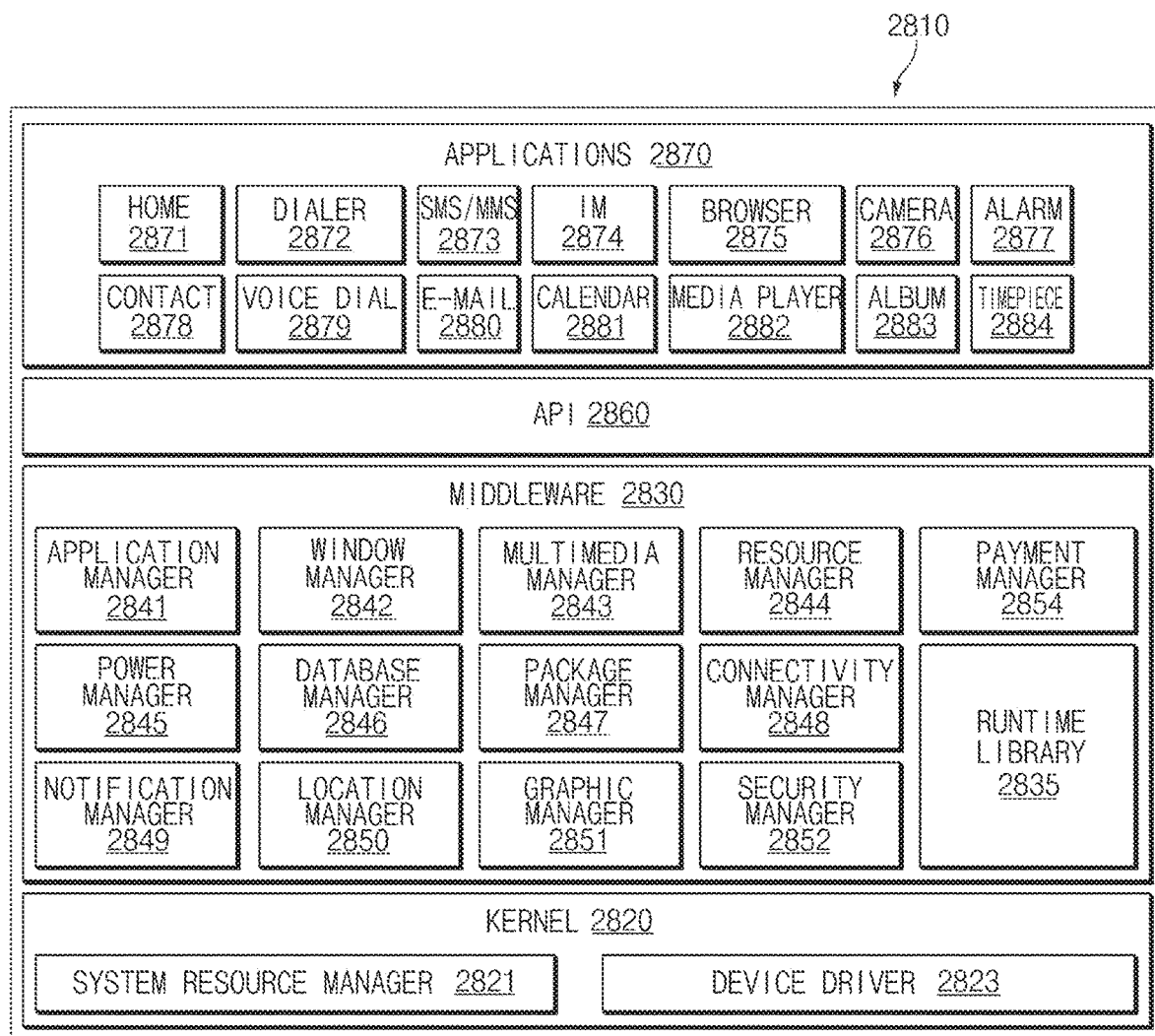
FIG. 28 is a block diagram of a program module according to various embodiments.

FIG. 28 illustrates a block diagram of a program module, according to various embodiments.

According to an embodiment, a program module 2810 (e.g., the program 2640) may include an operating system (OS) to control resources associated with an electronic device (e.g., the electronic device 2601), and/or diverse applications (e.g., the application program 2647) driven on the OS. The OS may be, for example, Android™, iOS™, Windows™, Symbian™ Tizen™, or Bada™.

The program module 2810 may include a kernel 2820, a middleware 2830, an application programming interface (API) 2860, and/or an application 2870. At least a portion of the program module 2810 may be preloaded on an electronic device or may be downloadable from an external electronic device (e.g., the electronic device 2602 or 2604, the server 2606, or the like).

The kernel 2820 (e.g., the kernel 2641) may include, for example, a system resource manager 2821 or a device driver 2823. The system resource manager 2821 may perform control, allocation, or retrieval of system resources. According to an embodiment, the system resource manager 2821 may include a process managing unit, a memory managing unit, or a file system managing unit. The device driver 2823 may include, for example, a display driver, a camera driver, a Bluetooth driver, a shared memory driver, a USB driver, a keypad driver, a Wi-Fi driver, an audio driver, or an inter-process communication (IPC) driver.

The middleware 2830 may provide, for example, a function that the application 2870 needs in common, or may provide diverse functions to the application 2870 through the API 2860 to allow the application 2870 to efficiently use limited system resources of the electronic device. According to an embodiment, the middleware 2830 (e.g., the middleware 2643) may include at least one of a runtime library 2835, an application manager 2841, a window manager 2842, a multimedia manager 2843, a resource manager 2844, a power manager 2845, a database manager 2846, a package manager 2847, a connectivity manager 2848, a notification manager 2849, a location manager 2850, a graphic manager 2851, a security manager 2852, or a payment manager 2854.

The runtime library 2835 may include, for example, a library module that is used by a compiler to add a new function through a programming language while the application 2870 is being executed. The runtime library 2835 may perform input/output management, memory management, or capacities about arithmetic functions.

The application manager 2841 may manage, for example, a life cycle of at least one application of the application 2870. The window manager 2842 may manage a graphic user interface (GUI) resource that is used in a screen. The multimedia manager 2843 may identify a format necessary for playing diverse media files, and may perform encoding or decoding of media files by using a codec suitable for the format. The resource manager 2844 may manage resources such as a storage space, memory, or source code of at least one application of the application 2870.

The power manager 2845 may operate, for example, with a basic input/output system (BIOS) to manage a battery or power, and may provide power information for an operation of an electronic device. The database manager 2846 may generate, search for, or modify database that is to be used in at least one application of the application 2870. The package manager 2847 may install or update an application that is distributed in the form of package file.

The connectivity manager 2848 may manage, for example, wireless connection such as Wi-Fi or Bluetooth. The notification manager 2849 may display or notify an event such as arrival message, appointment, or proximity notification in a mode that does not disturb a user. The location manager 2850 may manage location information about an electronic device. The graphic manager 2851 may manage a graphic effect that is provided to a user, or manage a user interface relevant thereto. The security manager 2852 may provide a general security function necessary for system security, user authentication, or the like. According to an embodiment, in the case where an electronic device (e.g., the electronic device 2601) includes a telephony function, the middleware 2830 may further include a telephony manager for managing a voice or video call function of the electronic device.

The middleware 2830 may include a middleware module that combines diverse functions of the above-described components. The middleware 2830 may provide a module specialized to each OS kind to provide differentiated functions. Additionally, the middleware 2830 may dynamically remove a part of the preexisting components or may add new components thereto.

The API 2860 (e.g., the API 2645) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 2870 (e.g., the application program 2647) may include, for example, one or more applications capable of providing functions for a home 2871, a dialer 2872, an SMS/MMS 2873, an instant message (IM) 2874, a browser 2875, a camera 2876, an alarm 2877, a contact 2878, a voice dial 2879, an e-mail 2880, a calendar 2881, a media player 2882, an album 2883, or a timepiece 2884 or for offering health care (e.g., measuring an exercise quantity, blood sugar, or the like) or environment information (e.g., information of barometric pressure, humidity, temperature, or the like).

According to an embodiment, the application 2870 may include an application (hereinafter referred to as "information exchanging application" for descriptive convenience) to support information exchange between an electronic device (e.g., the electronic device 2601) and an external electronic device (e.g., the electronic device 2602 or 2604). The information exchanging application may include, for example, a notification relay application for transmitting specific information to an external electronic device, or a device management application for managing the external electronic device.

The present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed:

1. A portable communication device comprising:
a plurality of antennas including a first antenna, a second antenna, a third antenna and a fourth antenna; and
communication circuitry including a first receiving (RX) circuit, a second RX circuit, a third RX circuit and a transmitting and receiving (TX/RX) circuit, the first RX circuit configured to receive a first signal in a first specified frequency band via the first antenna, the second RX circuit configured to receive the first signal via the second antenna, the third RX circuit configured to receive the first signal via the third antenna, the TX/RX circuit configured to receive the first signal via the fourth antenna, the receiving of the first signal to be performed using the first RX circuit, the second RX circuit, the third RX circuit and the TX/RX circuit concurrently at least temporarily, and the TX/RX circuit further configured to transmit a second signal in the first specified frequency or a second specified frequency band different from the first specified frequency band at least temporarily while the receiving of the first signal is performed or terminated.

2. The portable communication device of claim 1, further comprising a housing accommodating the communication circuitry, wherein the first antenna forms a first portion of a side frame of the housing, and the second antenna forms a second portion of the side frame, and wherein a first gap is formed at a first end of the first portion, and a second gap is formed between a second end of the first portion and a first end of the second portion.

3. The portable communication device of claim 2, wherein the first portion forms a part of a bottom portion of the side frame, and the second portion forms another part of the bottom of the side frame and at least part of a right portion of the side frame.

4. The portable communication device of claim 3, wherein the third antenna forms a third portion of the side frame, and the fourth antenna forms a fourth portion of the side frame, and wherein a third gap is formed between a second end of the second portion and a first end of the third portion, and a fourth gap is formed between a second end of the third portion and a first end of the fourth portion.

5. The portable communication device of claim 4, wherein the third portion forms a part of a top portion of the side frame, and the fourth portion forms another part of the top of the side frame and at last part of a left portion of the side frame.

6. The portable communication device of claim 1, further comprising a first printed circuit board (PCB) and a second PCB electrically connected with the first PCB via a connecting member, wherein the communication circuitry is formed in the first PCB, and wherein the first antenna is electrically connected with the communication circuitry via a first feeding path at least partially formed in the second PCB, and the second antenna is electrically connected with the communication circuitry via a second feeding path at least partially formed in the second PCB.

7. The electronic device of claim 1, wherein the first antenna and the second antenna are positioned adjacent to each other.

8. The electronic device of claim 1, further comprising:
a switching circuit configured to connect the Tx/Rx circuit with the first antenna or the second antenna, and one of the first Rx circuit or the second Rx circuit with the third antenna or the fourth antenna.

9. The electronic device of claim 1, further comprising:
a switching circuit configured to connect one of the first Rx circuit or the second Rx circuit with the third antenna or the fourth antenna.

10. The electronic device of claim 1, further comprising:
a communication processor configured to control the communication circuitry such that the communication circuitry simultaneously receives a signal in a specified frequency band via the plurality of antennas.

11. The electronic device of claim 10, wherein the communication processor is further configured to:
control the communication circuitry to receive the signal in the specified frequency band via one or more antennas of the plurality of antennas based on at least one of a received signal quality, a received signal strength indication, a transmit power, or a reflection loss of each of the plurality of antennas.

12. The electronic device of claim 10, wherein the communication processor is further configured to:
identify a transmit power or a received signal quality of each of the plurality of antennas; and
control the communication circuitry to receive the signal in the specified frequency band through one or more antennas of the plurality of antennas, each of which having the received signal quality or the transmit power greater than a specified value.

13. The electronic device of claim 10, wherein the communication processor is configured to:
measure a received signal quality of an antenna, which is receiving the signal in the specified frequency band, among the plurality of antennas; and
control the communication circuitry to receive the signal in the first band via the antenna receiving the signal in the first band and another antenna of the plurality of antennas, when the received signal strength indication is less than a specified value.

14. The electronic device of claim 10, further comprising:
a grip sensor configured to detect a contact of an object with the electronic device; and
an application processor electrically connected with the grip sensor and the communication processor,
wherein the application processor is configured to obtain information about the contact with the electronic device using the grip sensor, and
wherein the communication processor is configured to obtain the information about the contact from the application processor and control the communication circuitry based on the information about the contact to stop a use of an antenna, which is in contact with the object, from among the plurality of antennas.

15. An electronic device comprising:
an external housing including a first portion, a second portion adjacent to the first portion, a third portion further away from the first portion than the second portion, and a fourth portion adjacent to the third portion;
a first antenna radiator forming at least a portion of the first portion and/or formed within the housing to be adjacent to the first portion;
a second antenna radiator forming at least a portion of the second portion and/or formed within the housing to be adjacent to the second portion;
a third antenna radiator forming at least a portion of the third portion and/or formed within the housing to be adjacent to the third portion;

a fourth antenna radiator forming at least a portion of the fourth portion and/or formed within the housing to be adjacent to the fourth portion;

at least one communication circuitry configured to support a frequency in a first band and a frequency in a second band lower than the first band;

a first electrical path configured to electrically connect the at least one communication circuitry and the first antenna radiator and to receive a first signal having the frequency in the first band;

a second electrical path configured to electrically connect the at least one communication circuitry and the second antenna radiator and to simultaneously or selectively receive a second signal having the frequency in the first band or the second band;

a third electrical path configured to electrically connect the at least one communication circuitry and the third antenna radiator and to simultaneously or selectively receive a third signal having the frequency in the first band or the second band;

a fourth electrical path configured to electrically connect the at least one communication circuitry and the fourth antenna radiator and to receive a fourth signal having the frequency in the first band; and a control circuit configured to receive the first signal in the first band through at least two of the first to fourth antenna radiators at least temporarily simultaneously by controlling at least one of the first to fourth electrical paths.

16. An electronic device comprising:
a plurality of antennas;
a communication circuitry electrically connected with the plurality of antennas,
wherein the communication circuitry includes a plurality of circuits receiving a signal in a first band and is configured to simultaneously receive the signal in the first band through two or more circuits of the plurality of circuits from two or more antennas, which are positioned adjacent to each other, from among the plurality of antennas, and
a communication processor configured to control the communication circuitry such that the communication circuitry simultaneously receives the signal in the first band from the plurality of antennas,
wherein the communication processor is configured to control the communication circuitry to receive the signal in the first band through one or more antennas of the plurality of antennas based on at least one of a received signal quality, a received signal strength indication, a transmit power, or a reflection loss of each of the plurality of antennas.

17. The electronic device of claim 16, wherein the communication processor is further configured to:
verify one of the transmit power or the received signal strength indication of each of the plurality of antennas; and
control the communication circuitry to receive the signal in the first band through one or more antennas from among the plurality of antennas, each of which has the received signal strength indication or the transmit power greater than a specified value.

18. The electronic device of claim 16, wherein the communication processor is further configured to:
measure a received signal strength indication of an antenna, which is receiving the signal in the first band, from among the plurality of antennas; and
control the communication circuitry to receive the signal in the first band through the antenna receiving the signal in the first band and another antenna of the plurality of antennas, when the received signal strength indication is less than a specified value.

19. The electronic device of claim 16, further comprising:
a grip sensor configured to detect a contact of an object with the electronic device; and
an application processor electrically connected with the grip sensor and the communication processor,
wherein the application processor is configured to obtain information about the contact with the electronic device using the grip sensor, and
wherein the communication processor is configured to obtain the information about the contact from the application processor and control the communication circuitry based on the information about the contact to stop a use of an antenna, which is in contact with the object, from among the plurality of antennas.

* * * * *